(12) United States Patent
Sharifi-Mehr

(10) Patent No.: US 12,453,607 B2
(45) Date of Patent: Oct. 28, 2025

(54) ROTATIONAL TRACKER ADAPTER WITH BIASING MECHANISM

(71) Applicant: Mobius Imaging, LLC, Shirley, MA (US)

(72) Inventor: Amir A. Sharifi-Mehr, Bloomingdale, NJ (US)

(73) Assignee: Mobius Imaging, LLC, Shirley, MA (US)

( * ) Notice: Subject to any disclaimer, the term of this patent is extended or adjusted under 35 U.S.C. 154(b) by 246 days.

(21) Appl. No.: 18/278,854

(22) PCT Filed: Feb. 25, 2022

(86) PCT No.: PCT/US2022/017862
§ 371 (c)(1),
(2) Date: Aug. 25, 2023

(87) PCT Pub. No.: WO2022/182963
PCT Pub. Date: Sep. 1, 2022

(65) Prior Publication Data
US 2024/0130800 A1   Apr. 25, 2024
US 2024/0225747 A9   Jul. 11, 2024

Related U.S. Application Data

(60) Provisional application No. 63/154,303, filed on Feb. 26, 2021.

(51) Int. Cl.
*A61B 34/20* (2016.01)
*A61B 17/16* (2006.01)
(Continued)

(52) U.S. Cl.
CPC .......... *A61B 34/20* (2016.02); *A61B 17/1622* (2013.01); *A61B 17/8875* (2013.01);
(Continued)

(58) Field of Classification Search
CPC ..... A61B 34/20; A61B 17/16; A61B 17/1622; A61B 17/88; A61B 17/8875
See application file for complete search history.

(56) References Cited

U.S. PATENT DOCUMENTS 6,021,343 A   2/2000 Foley et al.
6,556,857 B1  4/2003 Estes et al.
(Continued)

FOREIGN PATENT DOCUMENTS

EP   4141972 A1    3/2023
WO   2021059253 A2 4/2021
(Continued)

OTHER PUBLICATIONS

International Search Report for Application No. PCT/US2022/017862 dated Sep. 2, 2022, 2 pages.
(Continued)

*Primary Examiner* — Christopher J Beccia
(74) *Attorney, Agent, or Firm* — Howard & Howard Attorneys PLLC

(57) ABSTRACT

A surgical navigation tracker assembly including a rotational adapter for removably attaching a tracker to a surgical instrument assembly including a surgical handpiece. The adapter may be coupled to an end effector of the surgical instrument and configured to allow the end effector to actuate relative to the adapter. The end effector may comprise a stop, the adapter configured to abut the stop when coupled to the end effector. The adapter may comprise a mount for releasably securing the tracker to the adapter. The adapter may also comprise a biasing element, and the biasing element may comprise an abutment interface configured to engage either of the surgical handpiece or the stop when the end effector is coupled to the surgical handpiece. The biasing element is configured to limit rotation of the
(Continued)

adapter relative to the surgical handpiece when the abutment interface is engaged with the surgical handpiece or the stop.

23 Claims, 25 Drawing Sheets

(51) Int. Cl.
*A61B 17/88* (2006.01)
*A61B 17/00* (2006.01)
(52) U.S. Cl.
CPC ............... *A61B 2017/00486* (2013.01); *A61B 2034/2055* (2016.02); *A61B 2034/2072* (2016.02)

(56) References Cited

U.S. PATENT DOCUMENTS

| | | | |
|---|---|---|---|
| 7,153,308 B2 | 12/2006 | Peterson |
| 7,166,114 B2 | 1/2007 | Moctezuma De La Barrera et al. |
| 7,314,048 B2 | 1/2008 | Couture et al. |
| 7,725,162 B2 | 5/2010 | Malackowski et al. |
| 7,877,890 B2 | 2/2011 | Weber |
| 7,993,353 B2 | 8/2011 | Roeßner et al. |
| 8,118,488 B2 | 2/2012 | Gregerson |
| 8,800,939 B2 | 8/2014 | Karsak et al. |
| 9,008,757 B2 | 4/2015 | Wu |
| 9,111,379 B2 | 8/2015 | Gregerson et al. |
| 9,119,655 B2 | 9/2015 | Bowling et al. |
| 9,393,039 B2 | 7/2016 | Lechner et al. |
| 9,451,999 B2 | 9/2016 | Simpson et al. |
| 9,468,427 B2 | 10/2016 | Dicorleto et al. |
| 9,801,592 B2 | 10/2017 | Stanton et al. |
| 9,962,132 B2 | 5/2018 | Gregerson |
| 10,034,713 B2 | 7/2018 | Yang et al. |
| 10,151,810 B2 | 12/2018 | Gregerson et al. |
| 10,198,978 B2 | 2/2019 | Richards et al. |
| 10,285,715 B2 | 5/2019 | Peters et al. |
| 10,292,778 B2 | 5/2019 | Kostrzewski et al. |
| 10,335,247 B2 | 7/2019 | Lechner et al. |
| 10,405,929 B1 | 9/2019 | Seltmann et al. |
| 10,449,005 B2 | 10/2019 | Christian et al. |
| 10,456,207 B2 | 10/2019 | Flatt |
| 10,537,395 B2 | 1/2020 | Perez |
| 10,709,508 B2 | 7/2020 | Barnes et al. |
| 10,722,248 B2 | 7/2020 | Xu et al. |
| 10,765,480 B2 | 9/2020 | Srimohanarajah et al. |
| 10,779,893 B2 | 9/2020 | Elliott et al. |
| 10,792,108 B2 | 10/2020 | Yang et al. |
| 10,792,109 B2 | 10/2020 | Bonny et al. |
| 10,989,890 B1 | 4/2021 | Ando et al. |
| 11,071,596 B2 | 7/2021 | Ryan et al. |
| 11,117,197 B2 | 9/2021 | Lindenmann et al. |
| 11,172,994 B1 | 11/2021 | Seltmann et al. |
| 11,529,199 B2 | 12/2022 | Elliot et al. |
| 11,547,497 B2 | 1/2023 | Yang et al. |
| 2004/0171930 A1 | 9/2004 | Grimm et al. |
| 2008/0045972 A1 | 2/2008 | Wanger et al. |
| 2011/0263971 A1 | 10/2011 | Nikou et al. |
| 2013/0261609 A1 | 10/2013 | Dicorleto et al. |
| 2014/0275953 A1 | 9/2014 | Gregerson et al. |
| 2016/0302871 A1 | 10/2016 | Gregerson et al. |
| 2018/0028266 A1 | 2/2018 | Barnes et al. |
| 2018/0344304 A1 | 12/2018 | Lindenmann et al. |
| 2019/0231408 A1 | 8/2019 | DiCorleto |
| 2019/0231447 A1 | 8/2019 | Ebbitt et al. |
| 2019/0321108 A1 | 10/2019 | Ghanam et al. |
| 2019/0388161 A1 | 12/2019 | Cicchini et al. |
| 2020/0078097 A1 | 3/2020 | Gregerson et al. |
| 2020/0188034 A1 | 6/2020 | Lequette et al. |
| 2020/0323521 A1 | 10/2020 | Wehrli et al. |
| 2020/0375669 A1 | 12/2020 | Elliot et al. |
| 2021/0026146 A1 | 1/2021 | Harder et al. |
| 2021/0177479 A1 | 6/2021 | DiCorleto |
| 2021/0186527 A1 | 6/2021 | Biedermann et al. |
| 2021/0251717 A1 | 8/2021 | Healy et al. |
| 2021/0369290 A1 | 12/2021 | Palazzolo et al. |
| 2022/0062006 A1 | 3/2022 | Cowan et al. |

FOREIGN PATENT DOCUMENTS

| | | | |
|---|---|---|---|
| WO | 2021084484 A2 | 5/2021 |
| WO | 2021225931 A1 | 11/2021 |
| WO | 2021251717 A1 | 12/2021 |
| WO | 2022006248 A1 | 1/2022 |

OTHER PUBLICATIONS

English language abstract for WO 2021/251717 A1 extracted from espacenet.com database on Dec. 4, 2023, 1 page.

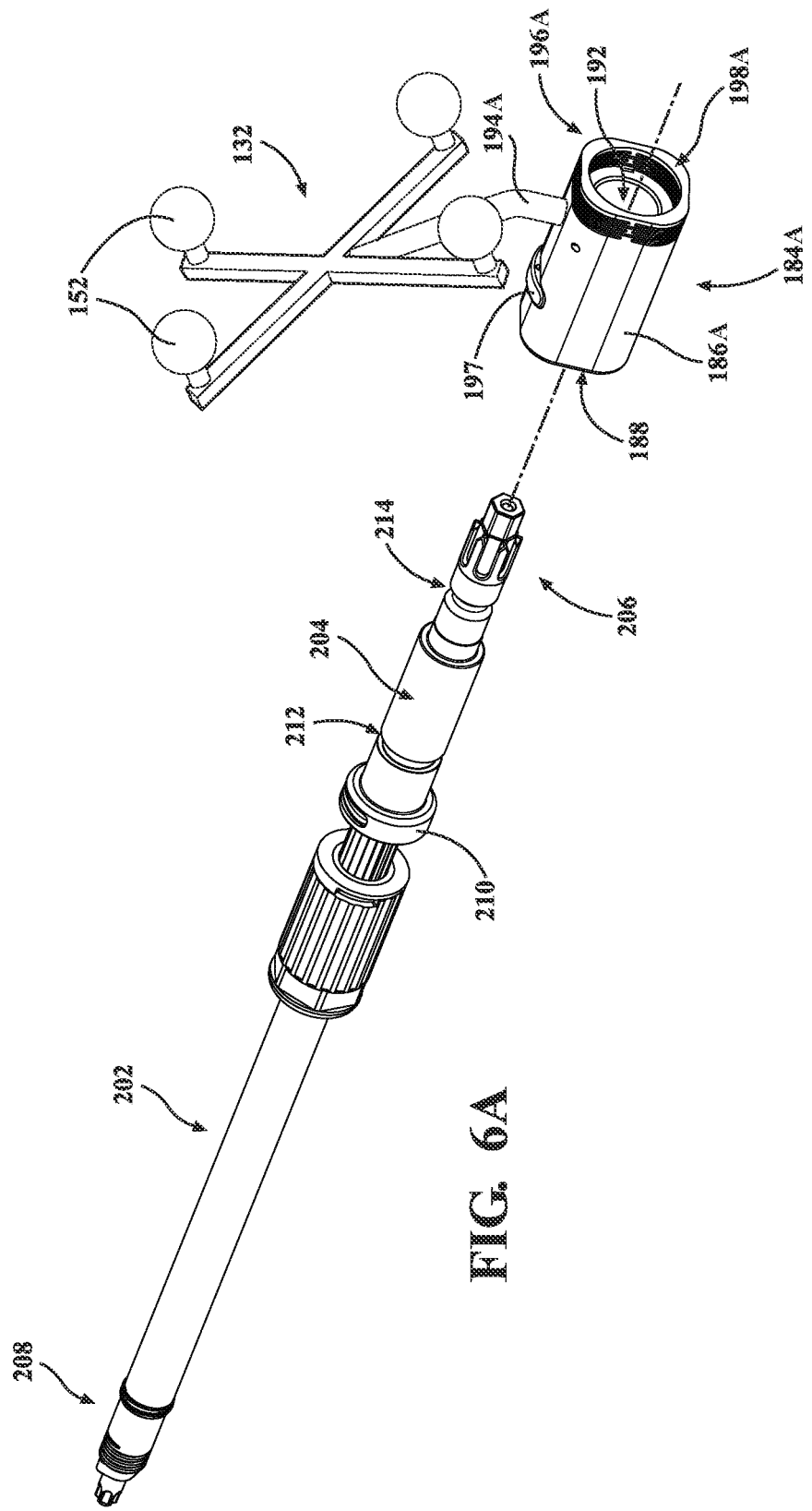

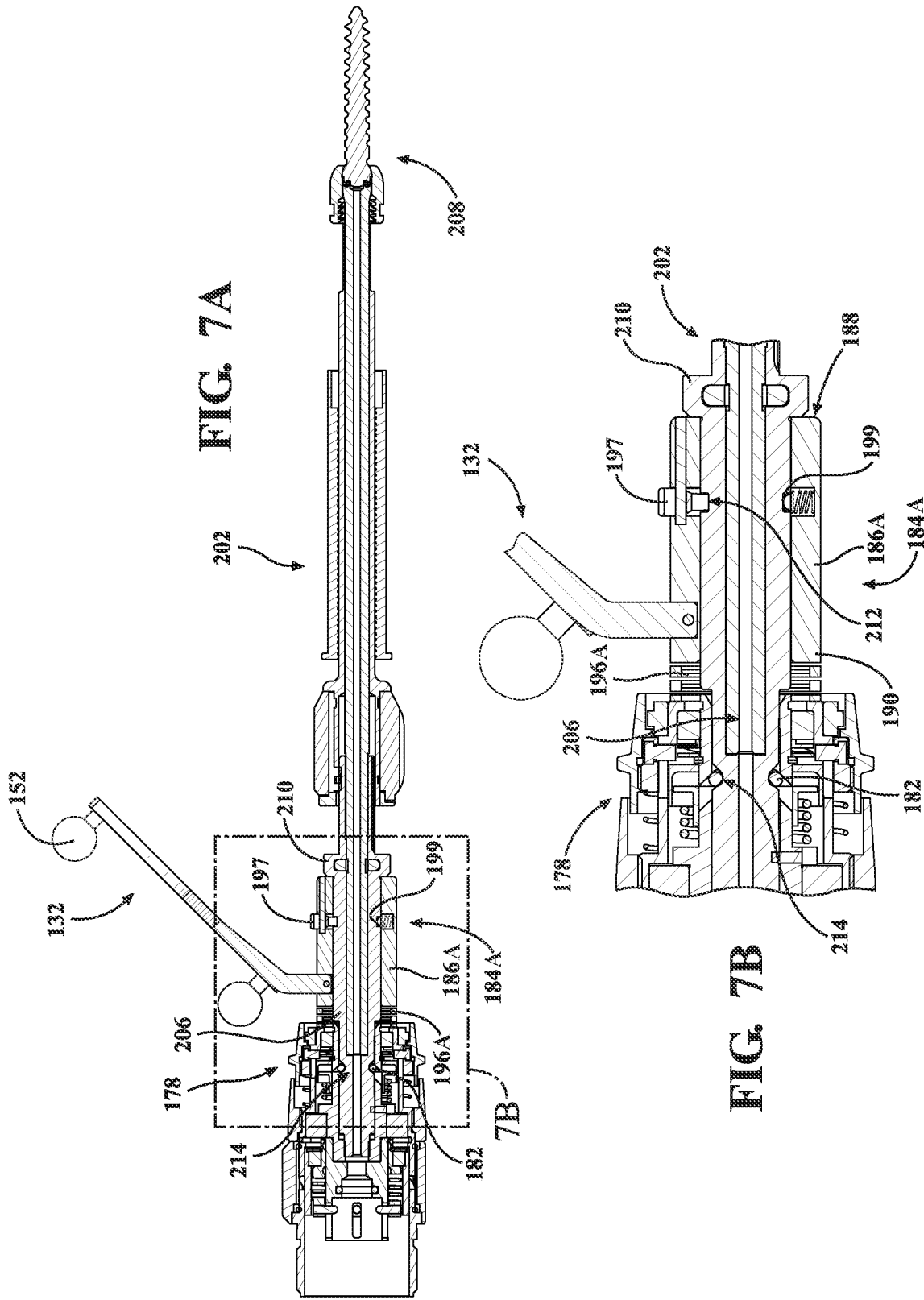

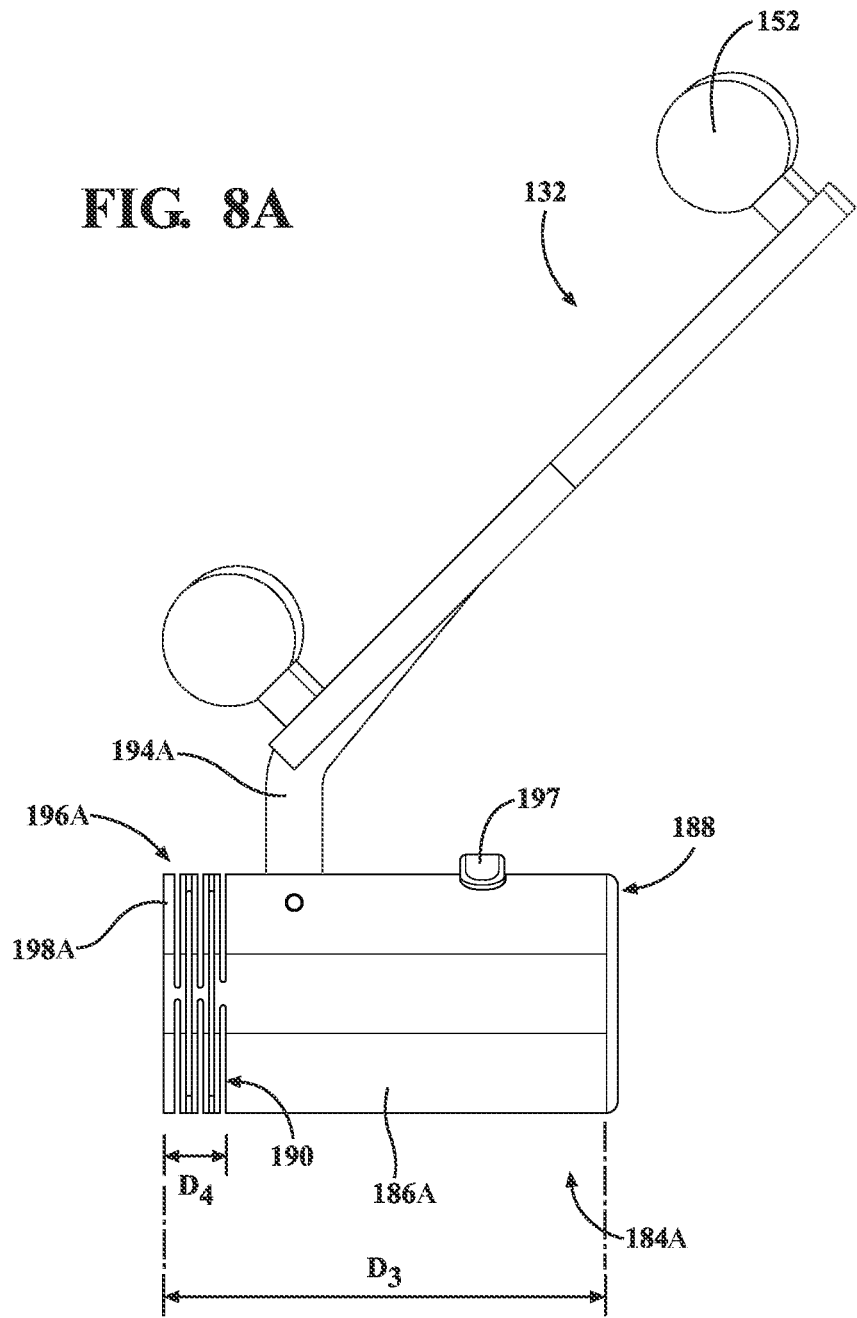

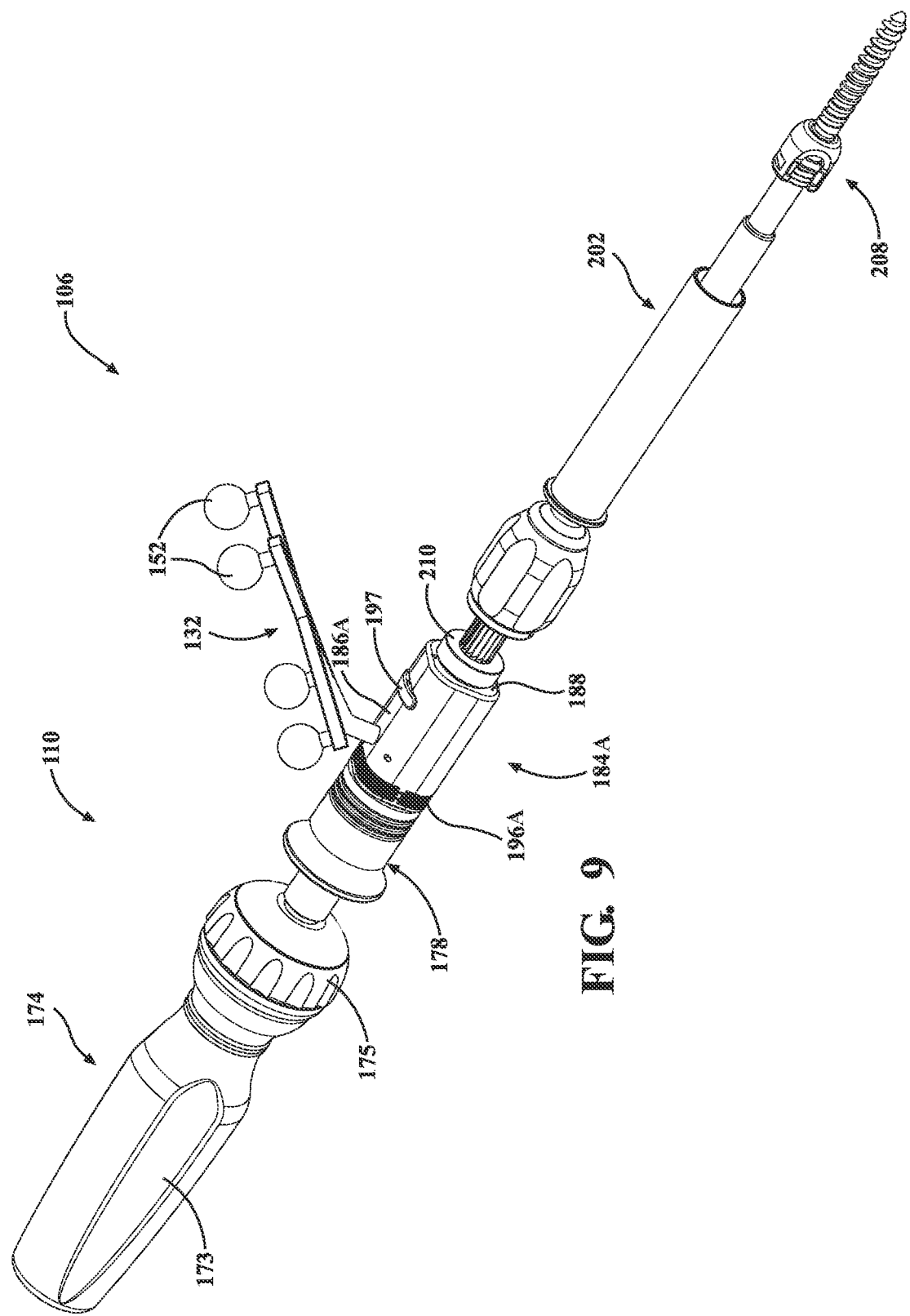

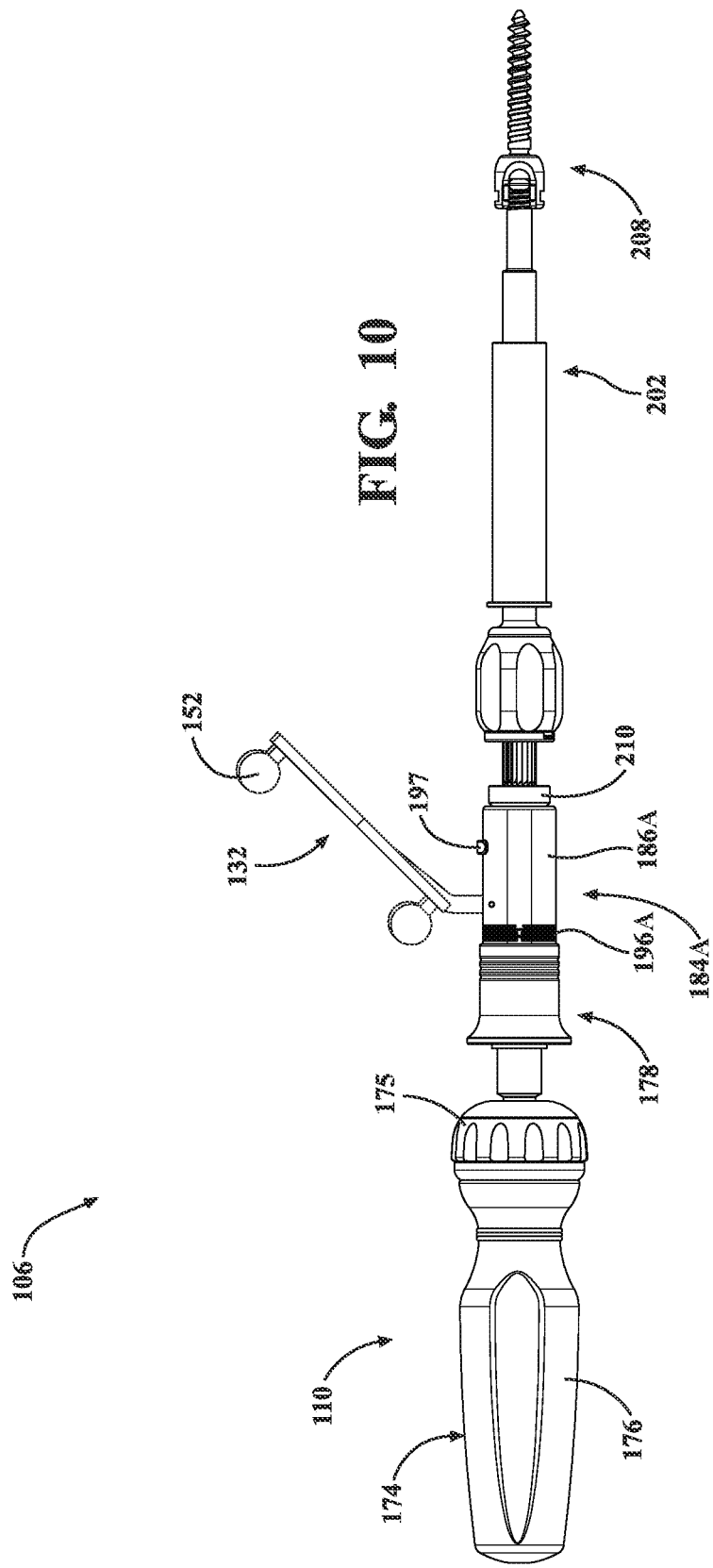

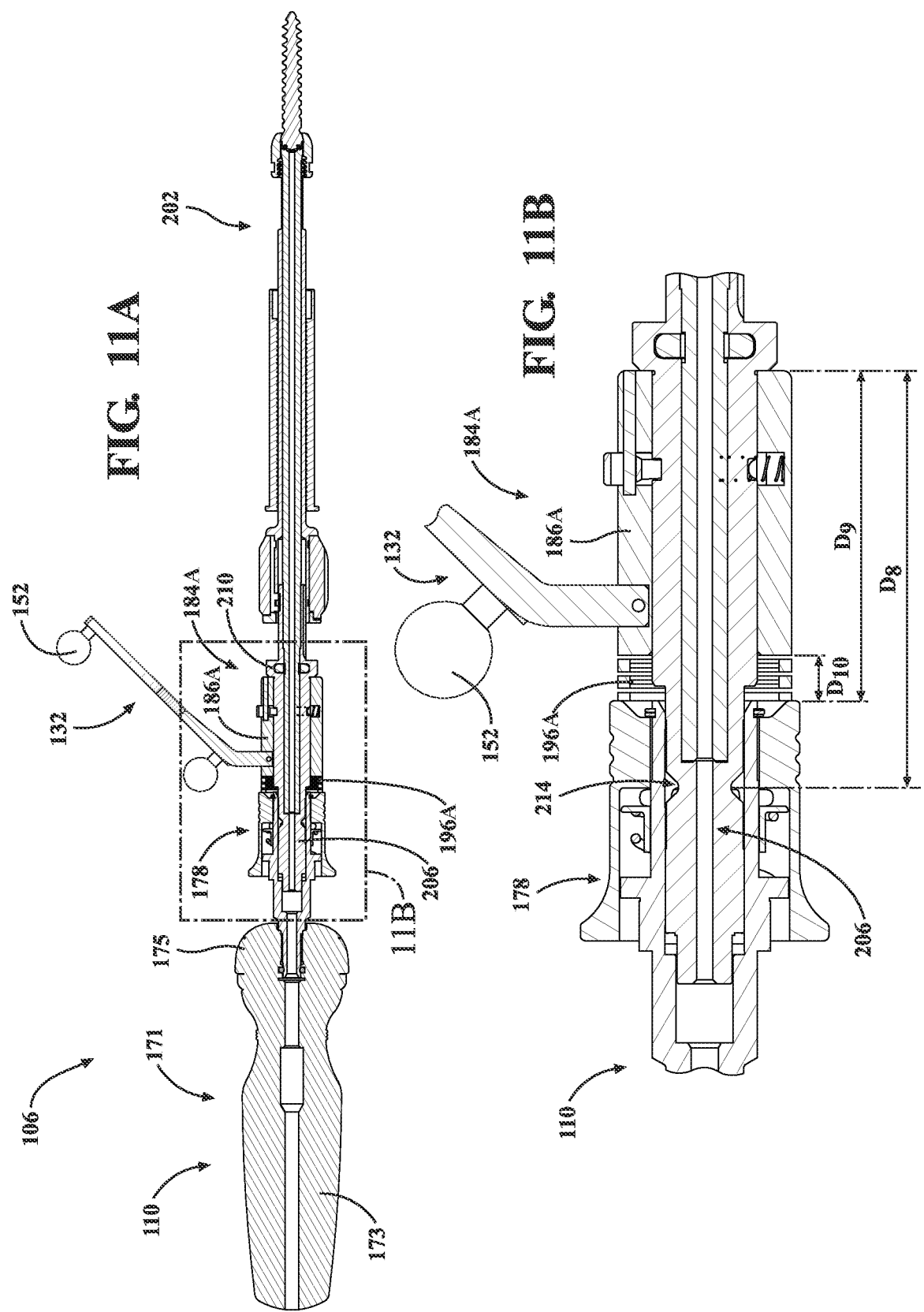

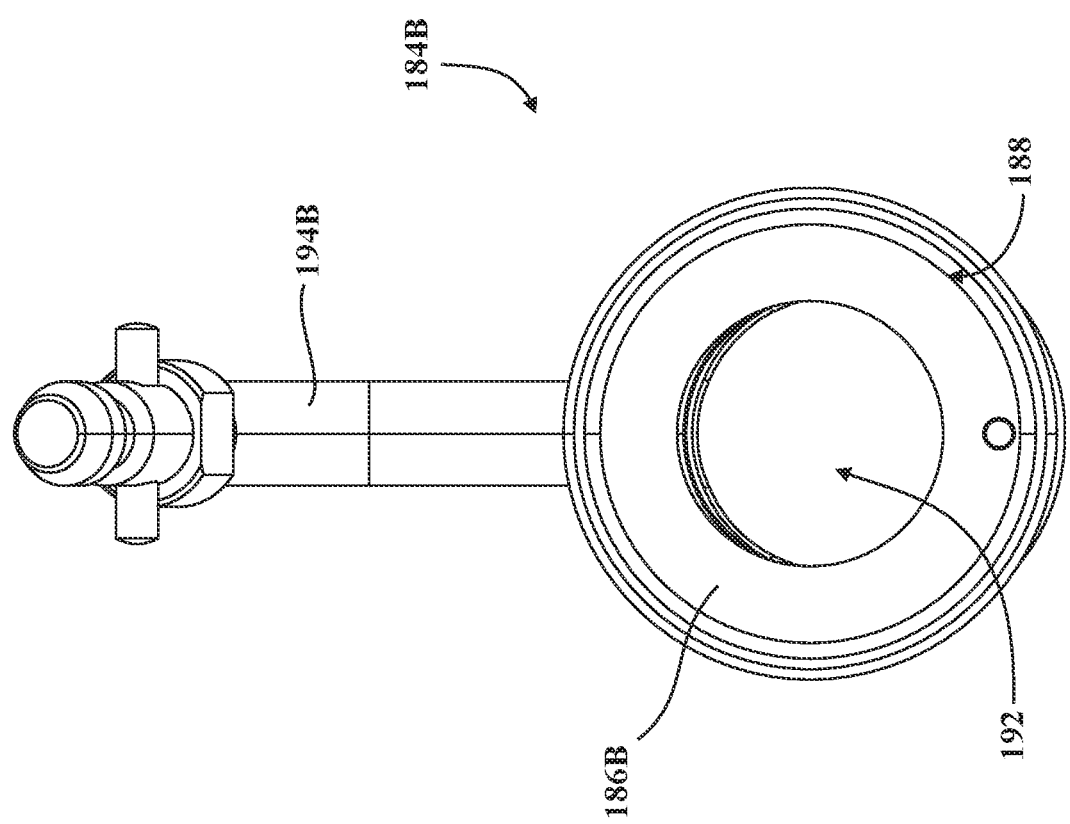

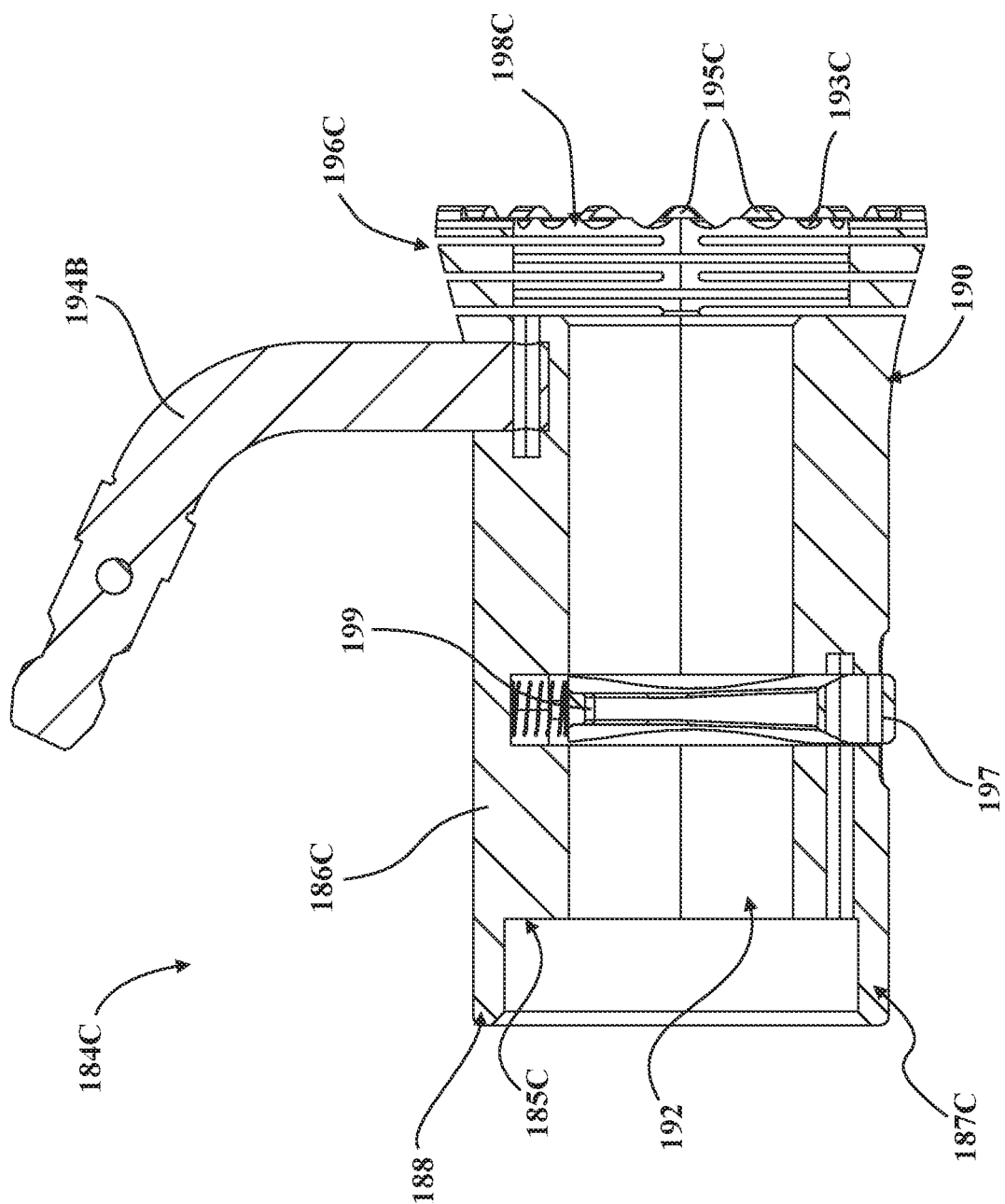

ROTATIONAL TRACKER ADAPTER WITH BIASING MECHANISM

CROSS-REFERENCE TO RELATED APPLICATION

The subject patent application claims priority to and all the benefits of U.S. Provisional Patent Application No. 63/154,303, filed on Feb. 26, 2021, the entire contents and disclosure of which is hereby incorporated by reference in its entirety.

BACKGROUND

Navigation systems are frequently utilized to assist medical professionals in carrying out various types of surgical procedures, including neurosurgical and orthopedic procedures. To this end, a surgeon may utilize a navigation system to track, monitor, or otherwise locate one or more tools, surgical instruments, and/or portions of a patient's anatomy within a common reference frame. Typically, tools and/or surgical instruments are tracked together with the anatomy, and their relative movement is depicted on a display.

Conventional navigation systems may employ light signals, sound waves, magnetic fields, radio frequency signals, and the like, in order to track the position and/or orientation of objects, such as a surgical instrument or surgical robot relative to the patient and/or surgical site. Often, trackers are attached or otherwise integrated into the object being tracked. A localizer cooperates with tracking elements (e.g., fiducials, markers, and the like) coupled to the tracker to monitor the tracker, and ultimately to determine a position and/or orientation of the object being tracked.

For certain procedures, patient-specific imaging data may be acquired intraoperatively using one or more types of imaging systems to help assist the surgeon in visualizing, navigating relative to, and/or treating the anatomy. To this end, navigation systems may cooperate with imaging systems and/or other parts of surgical systems (e.g., surgical tools, instruments, surgical robots, and the like) to track objects relative to a target site of the anatomy.

In certain surgical procedures, such as those performed using a surgical instrument and/or a surgical robot to manipulate biological tissue and/or place an implant in the patient, trackers may be secured to the surgical instrument and/or surgical robot to track the pose of the surgical instrument or surgical robot relative to the target site of the anatomy.

For many types of navigation systems, the surgeon generally considers the visibility of the tracker to the localizer. This can be especially true when the navigation system relies on the optical visibility of the tracking elements of the tracker by the localizer to determine the position and/or orientation of the object being tracked. Many instrument trackers are mounted in a fixed or static position to the surgical instrument. However, mounting the tracker to the surgical instrument in a fixed or static manner, there may be a relatively high likelihood an object could become positioned between the localizer and the tracker, inhibiting the localizers visibility of the tracking elements. Accordingly, it may be advantageous for the tracker to be repositionable about the object to allow the localizer to maintain visibility with the tracking elements irrespective of the position of the object. Mounting a repositionable tracker to a surgical instrument with moving components that still allows the navigation system to accurately determine the position and/or orientation of the surgical instrument irrespective of the position of the tracker is not without its difficulties. For example, device utilized to mount the tracker to the surgical instrument typically requires a large number of components that can add weight, making the surgical instrument heavy and more difficult for the surgeon to manipulate. Furthermore, in order to maintain spatial positioning of the tracker relative to the surgical instrument as it is repositioned generally requires that the device for mounting the track includes a complex arrangement of components that can be difficult to manufacture and/or assemble, adding cost and time.

Accordingly, while trackers and navigation systems have generally worked well for their intended purpose, there remains a need in the art to overcome one or more of the deficiencies described above.

SUMMARY

The present disclosure provides an adapter for mounting a tracker to a surgical instrument for use with a surgical navigation system to track the pose of the surgical instrument.

The present disclosure also provides a surgical instrument assembly for removably coupling a tracker to a surgical handpiece. The surgical instrument assembly also includes an end effector including: a shaft extending between a distal portion for manipulating tissue and proximal portion defining a retainer for removably attaching the end effector to the surgical handpiece, and a stop arranged between the proximal portion and the distal portion. The assembly also includes an adapter including: a base defining a proximal end and opposing distal end with the distal end arranged to abut the stop of the end effector; an aperture defined extending through base to receive the shaft of the end effector therethrough; a mount coupled to the base for releasably securing the tracker to the adapter; and a biasing element extends from one of the proximal end and the distal end of the base to an abutment interface arranged for engaging the surgical handpiece, with the biasing element configured to compress in response to attachment of the retainer to the surgical handpiece with abutment occurring between the distal end of the base and the stop of the end effector to limit movement of the adapter relative to the end effector.

In another aspect, an adapter for use with an end effector including a stop and a retainer for coupling the end effector to a surgical handpiece is disclosed. The adapter also includes a base may include a proximal end and opposing distal end. The adapter also includes a biasing element to urge the base away from the surgical handpiece, the biasing element extending from the proximal end of the base and defining an abutment interface arranged for engaging the surgical handpiece. The adapter also includes a mount coupled to the base for releasably securing a tracker to the adapter. The adapter also includes a coupler disposed on the base and configured to removably secure the adapter to the end effector such that the end effector can rotate relative to the base and the biasing element. The adapter also includes where the biasing element is configured to compress in response to attachment of the retainer to the surgical handpiece with abutment occurring between the distal end of the base and the stop of the end effector to limit movement of the adapter relative to the end effector.

In another aspect, a surgical instrument tracking system for use with a surgical handpiece is disclosed. The surgical instrument tracking system also includes a first end effector including: a first shaft extending between a distal portion for manipulating tissue and a proximal portion defining a first retainer for removably attaching the first end effector to the surgical handpiece, and a first stop arranged between the proximal portion and the distal portion of the first end effector. The system also includes a second end effector including: a second shaft extending between a distal portion and a proximal portion defining a second retainer for removably attaching the second end effector to the surgical handpiece, and a second stop arranged between the proximal portion and the distal portion of the second end effector. The system also includes an adapter configured to removably couple to one of the first end effector and the second end effector, the adapter including: a base may include a proximal end and opposing distal end; a coupler disposed on the base and configured to removably coupled the adapter to the proximal portion of one of the first end effector or the second end effector; and a biasing element to urge the base away from the surgical handpiece, the biasing element extending from the proximal end of the base and defining an abutment interface arranged for engaging the surgical handpiece. The system also includes where the biasing element is configured to compress in response to attachment of one of the first retainer or the second retainer to the surgical handpiece with abutment occurring between the distal end of the base and the first stop of the first end effector or the second stop of the second end effector to limit movement of the adapter relative to the first or second stop.

In another aspect, a method of calibrating an adapter with a navigation system is disclosed. The method of calibrating also includes coupling an adapter including a tracker to a calibration body; observing the calibration body with a surgical navigation system while the tracker is in view of the surgical navigation system to calibrate a position of tracker relative to the adapter; removing the adapter from the calibration body; coupling the adapter, including the tracker, to an end effector. The calibrating also includes coupling the end effector to a surgical handpiece causing a biasing element of the adapter to compress and urge the adapter away from the surgical handpiece and toward a stop of the end effector and creating a frictional force limiting rotational movement of the adapter relative to the end effector. Other embodiments of this aspect include corresponding computer systems, apparatus, and computer programs recorded on one or more computer storage devices, each configured to perform the actions of the methods.

In another aspect, a surgical instrument assembly for navigating a surgical end effector is disclosed. The surgical instrument assembly also includes a surgical handpiece. The assembly also includes an end effector may include: a shaft extending between a distal portion for manipulating tissue and a proximal portion defining a retainer for removably attaching the end effector to a surgical handpiece, and a stop arranged between the proximal portion and the distal portion. The assembly also includes an adapter including: a base defining a distal end and an opposing proximal end with the distal end arranged to abut the stop of the end effector; an aperture defined extending through base to receive the shaft of the end effector therethrough; and a biasing element to urge the base away from the surgical handpiece, the biasing element extending from the proximal end of the base to an abutment interface arranged for engaging the surgical handpiece. The assembly also includes where the surgical handpiece is configured to engage the abutment interface of the biasing element when the end effector is coupled to the surgical handpiece and cause the biasing element to compress and urge the distal end of the base to abut the stop thereby positioning the mount at a known distance from the distal portion of the end effector.

In another aspect, a surgical instrument assembly for removably coupling a tracker to a surgical handpiece is disclosed. The surgical instrument assembly also includes a surgical handpiece. The assembly also includes an end effector may include: a shaft extending between a distal portion for manipulating biological tissue and a proximal portion defining a retainer for removably attaching the end effector to the surgical handpiece; and a stop arranged between the proximal portion and the distal portion, the stop spaced a defined distance from the retainer. The assembly also includes an adapter including: a base a distal end and an opposing proximal end with the distal end arranged to abut the stop of the end effector, an aperture defined extending through base to receive the shaft of the end effector therethrough, and a biasing element positioned to urge the base distally relative to surgical handpiece. The assembly also includes where the surgical handpiece is configured to engage an abutment interface of the biasing element when the adapter is disposed on the end effector and the end effector is coupled to the surgical handpiece and the biasing element is configured to cause the base to abut the stop positioning the adapter at a known distance from the distal portion of the end effector.

In another aspect, an adapter for use with an end effector including a stop and a retainer for coupling the end effector to a surgical handpiece is disclosed. The adapter also includes a base. The adapter also includes a biasing element to urge the base away from the surgical handpiece, the biasing element extending from a proximal end of the base to an abutment interface arranged for engaging the surgical handpiece. The adapter also includes a mount coupled to the base. The adapter also includes a coupler disposed on the base and configured to removably secure the adapter to the end effector such that the end effector can rotate freely relative to the base and biasing element. The adapter also includes where the biasing element is configured position the base adjacent the stop of the end effector when the abutment interface of the biasing element engages the surgical handpiece to position the adapter and mount at a known position on the end effector.

In another aspect, a surgical instrument assembly is disclosed for removably coupling a tracker to a surgical handpiece. The surgical instrument assembly also includes an end effector including: a shaft extending between a distal portion for manipulating tissue and proximal portion defining a retainer for removably attaching the end effector to the surgical handpiece, and a stop arranged between the proximal portion and the distal portion. The assembly also includes an adapter including: a base defining a proximal end and opposing distal end with the distal end arranged to abut the stop of the end effector; an aperture defined extending through base to receive the shaft of the end effector therethrough; a mount coupled to the base for releasably securing the tracker to the adapter; and a biasing element extending from one of the proximal end and the distal end of the base, the biasing element may include an abutment interface including one or more protrusions arranged for engaging a detent of the surgical handpiece or the stop, with the biasing element configured to compress in response to attachment of the retainer to the surgical handpiece and causing the one or more protrusions to engage the detent to limit movement of the adapter relative to the end effector.

In another aspect, a surgical instrument assembly is disclosed for removably coupling a tracker to a surgical handpiece. The surgical instrument assembly also includes a surgical handpiece including a detent. The assembly also includes an end effector may include: a shaft extending between a distal portion for manipulating biological tissue and a proximal portion defining a retainer for removably attaching the end effector to the surgical handpiece; and a stop arranged between the proximal portion and the distal portion, the stop spaced a defined distance from the retainer. The assembly also includes an adapter including: a base a distal end and an opposing proximal end with the distal end arranged to abut the stop of the end effector; an aperture defined extending through base to receive the shaft of the end effector therethrough; and a biasing element including an abutment interface having one or more protrusions, the biasing element positioned to urge the base distally relative to surgical handpiece. The assembly also includes where the detent of the surgical handpiece is configured to engage the one or more protrusions of the abutment interface of the biasing element when the adapter is disposed on the end effector and the end effector is coupled to the surgical handpiece and the biasing element is configured to cause the base to abut the stop positioning the adapter at a known distance from the distal portion of the end effector.

In some implementations, the stop is spaced a defined distance from the retainer.

In some implementations, the biasing element extends from the proximal end and is configured to urge the base away from the surgical handpiece.

In some implementations, the retainer and the stop of the end effector are spaced along the shaft of the end effector such that the surgical handpiece engages the biasing element of the adapter and the stop engages the base of the adapter in response to coupling the end effector to the surgical handpiece with the biasing element urging the base against the stop creating a friction force between the adapter, the stop, and the surgical handpiece to limit free rotation of the base relative to the surgical handpiece in absence of an applied external force.

In some implementations, the base further may include a coupler configured to removably secure the adapter to the proximal portion of the shaft of the end effector.

In some implementations, the biasing element applies a compressive force between the base and the surgical instrument when the adapter is coupled to the end effector with the abutment interface of the biasing element engaging the surgical handpiece.

In some implementations, the abutment interface may include one or more protrusions configured to mate with a reciprocal feature on the surgical handpiece when the adapter is coupled to the end effector.

In some implementations, the base is axially movable relative to the stop of the end effector between: an engaged position where the abutment interface of the biasing element engages the surgical handpiece, with the biasing element compressed to create a frictional force between the base of the adapter and the stop of the end effector to limit free rotation of the base relative to the surgical handpiece in an absence of an applied external force; and a free position where the abutment interface disengages the surgical handpiece, with the biasing element decompressed to permit free rotation of the base relative to the stop.

In some implementations, the biasing element may include a spring defined by a plurality of wave elements including a distal wave element and a proximal wave element; where the distal wave element may include a first thickness, and the proximal wave element may include a second thickness larger than the first thickness.

In some implementations, the biasing element may include a compressive material including a plurality of slits.

In some implementations, the abutment interface may include one or more protrusions arranged for engaging a detent on the surgical handpiece.

Other features and advantages of the embodiments of the present disclosure will be readily appreciated, as the same becomes better understood, after reading the subsequent description taken in conjunction with the accompanying drawings.

BRIEF DESCRIPTION OF THE DRAWINGS

FIG. 6A is a partially-exploded perspective view of the end effector and the rotation adapter of the surgical instrument of FIGS. 2-5.

FIG. 7A is a sectional view of the rotational adapter supporting a tracker coupled to an end effector of the surgical instrument FIGS. 2-4.

FIG. 7B is a partial sectional view of the rotational adapter supporting a tracker coupled to an end effector of FIG. 7A.

FIG. 8A is a side view of the rotational adapter for use with the surgical instrument of FIGS. 2-5, the rotational adapter illustrated in a decompressed state when not coupled the surgical instrument.

FIG. 9 is a perspective view of another configuration of a surgical instrument including a rotational adapter supporting a tracker for navigating the surgical instrument.

FIG. 10 is a side view of the surgical instrument including the rotational adapter supporting a tracker for navigating the surgical instrument of FIG. 9.

FIG. 11A is a section view of the surgical instrument including the rotational adapter supporting a tracker for navigating the surgical instrument of FIGS. 9-10.

FIG. 11B is a partial sectional view of the rotational adapter supporting a tracker coupled to an end effector of FIG. 11A.

FIG. 12 is a front view of a second exemplary configuration of a rotational adapter for coupling to a surgical instrument.

FIG. 16B is a sectional view of the third exemplary configuration of the rotational adapter of FIG. 14-16A.

It will be appreciated that one or more of the embodiments depicted throughout the drawings may have certain components, structural features, and/or assemblies removed, depicted schematically, and/or shown in phantom for illustrative purposes.

DETAILED DESCRIPTION

Figure 1A:
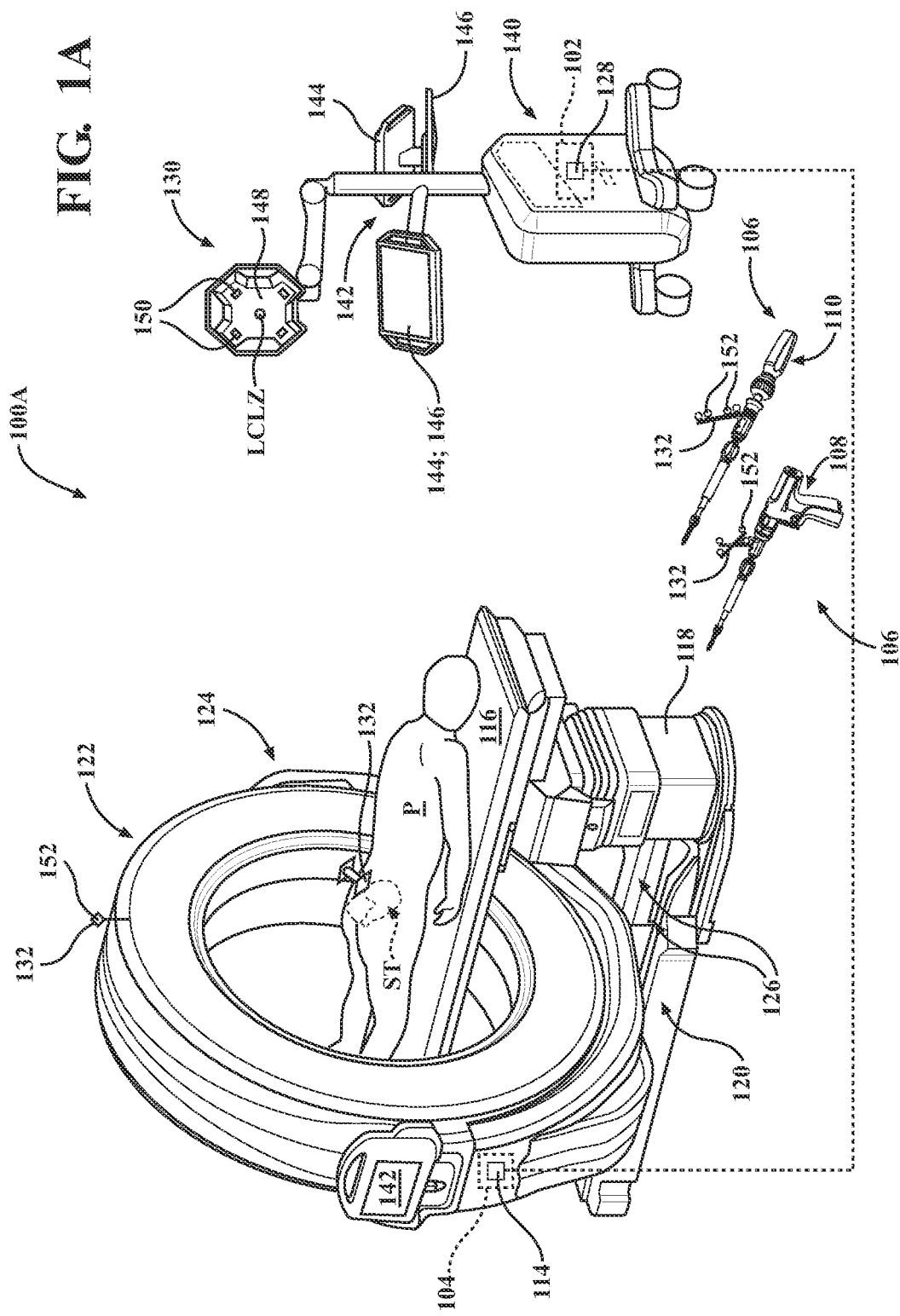
FIG. 1A is a perspective view of a surgical system shown comprising a navigation system and an imaging system supporting a patient with rotation adapter secured to a surgical instrument according to embodiments of the present disclosure.
Figure 1B:
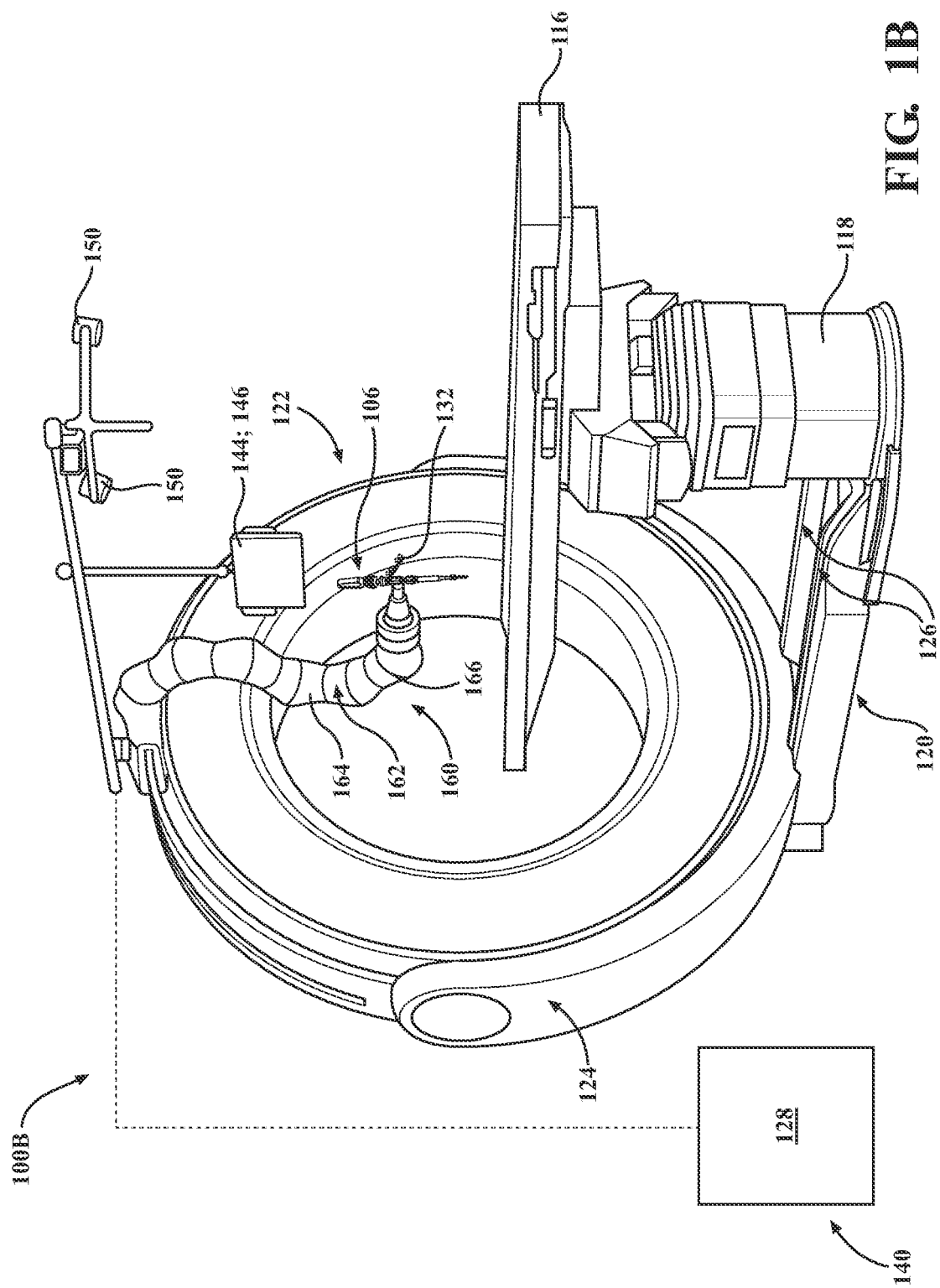
FIG. 1B is a perspective view of a surgical system shown comprising a navigation system and an imaging system supporting a patient with rotation adapter secured to an end effector of a surgical robot according to embodiments of the present disclosure.

Referring now to the drawings, wherein like numerals indicate like or corresponding parts throughout the several views, a surgical system 100 is shown in FIGS. 1A and 1B for treating a patient P. To this end, the illustrated surgical system 100 generally includes a navigation system 102, an imaging system 104, and one or more types of surgical instruments 106. As will be appreciated from the subsequent description below, the surgical system 100 is configured to, among other things, allow the surgeon to visualize, approach, and treat or otherwise manipulate anatomy of a patient P at a target site ST with a high level of control. To this end, imaging data ID of the target site ST may be acquired via the imaging system 104, and can be used to assist the surgeon in visualizing the patient's P anatomy at or otherwise adjacent to the target site ST. Here, the imaging data ID may also be utilized by the navigation system 102 to, among other things, facilitate navigation of surgical instruments 106 relative to the target site ST. Each of the components of the surgical system 100 introduced above will be described in greater detail below.

In FIG. 1A, an operating room is shown with a patient P undergoing an exemplary surgical procedure performed using the surgical system 100. In this illustrative example, a minimally-invasive spinal surgical procedure, such as a posterior interbody spinal fusion, is being performed. It will be appreciated that this example is intended to be illustrative, and that other types of surgical procedures are contemplated. During the surgical procedure, one or more handheld surgical instruments 106, such as a powered surgical handpiece 108 and/or a manual surgical tool 110, may be used by the surgeon. As noted above and as is described in greater detail below, the navigation system 102 may be configured to track states of one or more of the surgical instruments 106 relative to the target site ST. In this exemplary surgical procedure, powered surgical handpiece 108 may be employed as a cutting or drilling tool to remove tissue, form pilot holes (e.g., in the ilium, in vertebrae, and the like), or otherwise approach the target site ST. The powered surgical handpiece 108 may also be used to drive or otherwise install implantable components (e.g., pedicle screws, anchors, and the like).

For illustrative purposes, generically-depicted surgical instruments 106 configured for hand-held use are shown in FIG. 1. However, as will be appreciated from the subsequent description below, aspects of the surgical system 100 may be used with any suitable type of surgical instrument 106 without departing from the scope of the present disclosure. Furthermore, referring to FIG. 1B, in addition to hand-held surgical instruments 106 of various types and configurations, aspects of the surgical system 100 may also be employed in connection with surgical instruments 106 that may be controlled, guided, positioned, or otherwise manipulated with one or more types of surgical robots AA. Certain types of surgical robots AA are disclosed in U.S. Pat. No. 9,119,655, entitled "Surgical Robotic arm Capable of Controlling a Surgical Instrument in Multiple Modes;" U.S. Pat. No. 10,456,207, entitled "Systems and Tools for use with Surgical Robotic Manipulators;" U.S. Patent Application Publication No. 2019/0231447, entitled "End Effectors And Methods For Driving Tools Guided By Surgical Robotic Systems;" U.S. Patent Application Publication No. 2016/0302871, entitled "Integrated Medical Imaging and Surgical Robotic System;" and U.S. Patent Application Publication No. 2020/0078097, entitled "Methods and Systems for Robot-Assisted Surgery," the disclosures of each of which are hereby incorporated by reference in their entirety.

As noted above, the imaging system 104 may be used to obtain imaging tata ID of the patient, which may be a human or animal patient. In the representative embodiment illustrated in FIG. 1A, the imaging system 104 is realized as an x-ray computed tomography (CT) imaging device. Here, the patient P may be positioned within a central bore 112 of the imaging system 104 and an x-ray source and detector may be rotated around the central bore 112 to obtain raw x-ray imaging data ID of the patient P. The imaging data ID may be processed using an imaging system controller 114, or another suitable controller, in order to construct three-dimensional imaging data ID, two-dimensional imaging data ID, and the like, which may be transmitted to or otherwise utilized by the navigation system 102 or other components of the surgical system 100.

In some embodiments, imaging data ID may be obtained preoperatively (e.g., prior to performing a surgical procedure) or intraoperatively (e.g., during a surgical procedure) by positioning the patient P within the central bore 112 of the imaging system 104. In order to obtain imaging data ID, a portion of the imaging system 104 may be moved relative to a patient support 116 (e.g., a surgical table) on which the patient P is disposed while the patient P remains stationary. Here, the patient support 116 is secured to the imaging system 104, such as via a column 118 which is mounted to a base 120 of the imaging system 104. A portion of the imaging system 104 (e.g., an O-shaped imaging gantry 122) which includes at least one imaging component may be supported by an articulable support 124 that can translate along the length of the base 120 on rails 126 to perform an imaging scan of the patient P, and may translate away from the patient P to an out-of-the-way position for performing a surgical procedure on the patient P.

An example imaging system 104 that may be used in various embodiments is the AIRO® intra-operative CT system manufactured by Mobius Imaging, LLC. Examples of x-ray CT imaging devices that may be used according to various embodiments of the present disclosure are described in U.S. Pat. No. 10,151,810, entitled "Pivoting Multi-directional X-ray Imaging System with a Pair of Diametrically Opposite Vertical Support Columns Tandemly Movable Along a Stationary Base Support;" U.S. Pat. No. 9,962,132, entitled "Multi-directional X-ray Imaging System with Single Support Column;" U.S. Pat. No. 9,801,592, entitled "Caster System for Mobile Apparatus;" U.S. Pat. No. 9,111,379, entitled "Method and System for X-ray CT Imaging;" U.S. Pat. No. 8,118,488, entitled "Mobile Medical Imaging System and Methods;" and U.S. Patent Application Publication No. 2014/0275953, entitled "Mobile X-ray Imaging System," the disclosures of each of which are hereby incorporated by reference in their entirety.

While the illustrated imaging system 104 is realized as an x-ray CT imaging device as noted above, in other embodiments, the imaging system 104 may comprise one or more of an x-ray fluoroscopic imaging device, a magnetic resonance (MR) imaging device, a positron emission tomography (PET) imaging device, a single-photon emission computed tomography (SPECT), or an ultrasound imaging device. Other configurations are contemplated. In some embodiments, the imaging system 104 may be a mobile CT device that is not attached to the patient support 116 and may be wheeled or otherwise moved over the patient P and the patient support 116 to perform a scan. Examples of mobile CT devices include the BodyTom® CT scanner from Samsung Electronics Co., Ltd. and the O-arm® surgical imaging system form Medtronic, plc. The imaging system 104 may also be a C-arm x-ray fluoroscopy device. In other embodiments, the imaging system 104 may be a fixed-bore imaging device, and the patient P may be moved into the bore of the device, either on a patient support 116 or on a separate patient table that is configured to slide in and out of the central bore 112. Further, although the imaging system 104 shown in FIG. 1 is located close to the patient P within the operating room, the imaging system 104 may be located remotely, such as in another room or building (e.g., in a hospital radiology department).

The surgical system 100 employs the navigation system 102 to, among other things, track movement of various objects, such as the surgical instruments 106 and parts of the patient's P anatomy (e.g., tissue at the surgical site ST), as well as portions of the imaging system 104 in some embodiments. To this end, the navigation system 102 comprises a navigation controller 128 coupled to a localizer 130 that is configured to sense the position and/or orientation of trackers 132 within a localizer coordinate system LCLZ. As is described in greater detail below, the trackers 132 (also referred to herein as "navigable trackers") are fixed, secured, or otherwise attached to specific objects, and are configured to be monitored by the localizer 130.

The navigation controller 128 is disposed in communication with the localizer 130 and gathers position and/or orientation data for each tracker 132 sensed by the localizer 130 in the localizer coordinate system LCLZ. The navigation controller 128 may be disposed in communication with the imaging system controller 114 (e.g., to receive imaging data ID) and/or in communication with other components of the surgical system 100B (e.g., robotic arm controllers, tool controllers, and the like; not shown). However, other configurations are contemplated. The controllers 114, 128 may be realized as computers, processors, control units, and the like, and may be discrete components, may be integrated, and/or may otherwise share hardware.

It will be appreciated that the localizer 130 can sense the position and/or orientation of multiple trackers 132 to track correspondingly multiple objects within the localizer coordinate system LCLZ. By way of example, and as is depicted in FIG. 1A, trackers 132 may comprise a tool tracker 132T, an imaging system tracker 132I, a first patient tracker 132A, and/or a second patient tracker 132B, as well as additional patient trackers, trackers for additional medical and/or surgical tools, and the like.

In FIG. 1A, the tool tracker 132T and the imaging system tracker 132I are each depicted generically and are mounted to the surgical instrument 106 and the gantry 122 of the imaging system 104, respectively. The patient trackers 132A, 132B may be removably coupled to mount assemblies 134 to define tracker assemblies 136 which facilitate selective movement of the trackers 132A, 132B relative to their mount assemblies 134 according to embodiments of the present disclosure, as described in greater detail below. Here, the tracker assemblies 136 are firmly fixed to different portions of the patient's P anatomy (e.g., to opposing lateral sides of the ilium) via anchors 138 which are configured to releasably engage tissue (e.g., bone). It will be appreciated that trackers 132 may be firmly affixed to different types of tracked objects (e.g., discrete bones, tools, pointers, and the like) in a number of different ways.

The position of the patient trackers 132A, 132B relative to the anatomy of the patient P to which they are attached can be determined by known registration techniques, such as point-based registration in which the tool tracker 132T is attached to a calibration tool 280, which will be described in greater detail below, and the calibration is then used to touch off on a known object, such as a calibration block, touch off on bony landmarks on bone, or to touch off on several points across the bone for surface-based registration. Conventional registration techniques can be employed to correlate the pose of the patient trackers 132A, 132B to the patient's anatomy. Other types of registration are also possible.

Position and/or orientation data may be gathered, determined, or otherwise handled by the navigation controller 128 using conventional registration/navigation techniques to determine coordinates of each tracker 132 within the localizer coordinate system LCLZ. These coordinates may be utilized by various components of the surgical system 100 (e.g., to facilitate control of the surgical instruments 106, to facilitate navigation based on imaging data ID, and the like).

In the representative embodiment illustrated in FIG. 1A, the navigation controller 128 and the localizer 130 are supported on a mobile cart 140 which is movable relative to the base 120 of the imaging system 104. The mobile cart 140 also supports a user interface, generally indicated at 142, to facilitate operation of the navigation system 102 by displaying information to, and/or by receiving information from, the surgeon or another user. The user interface 142 may be disposed in communication with other components of the surgical system 100 (e.g., with the imaging system 104), and may comprise one or more output devices 144 (e.g., monitors, indicators, display screens, and the like) to present information to the surgeon (e.g., images, video, data, a graphics, navigable menus, and the like), and one or more input devices 146 (e.g., buttons, touch screens, keyboards, mice, gesture or voice-based input devices, and the like). It will be appreciated that other types, arrangements, and configurations are contemplated. By way of non-limiting example, in some embodiments, certain components of the navigation system 102 may be arranged in other ways, such as with the localizer 130 mounted or otherwise coupled to the imaging system 104 (see FIG. 1B).

In some embodiments, the surgical system 100 is capable of displaying a virtual representation of the relative positions and orientations of tracked objects to the surgeon or other users of the surgical system 100, such as with images and/or graphical representations of the anatomy of the patient P and the surgical instrument 106 presented on one or more output devices 144 (e.g., a display screen). The navigation controller 128 may also utilize the user interface 142 to display instructions or request information from the surgeon or other users of the surgical system 100. Other configurations are contemplated. One type of mobile cart 140 and user interface 142 of this type of navigation system 102 is described in U.S. Pat. No. 7,725,162, entitled "Surgery System," the disclosure of which is hereby incorporated by reference in its entirety.

Because the mobile cart 140 and the gantry 122 of the imaging system 104 can be positioned relative to each other and also relative to the patient P in the representative embodiment illustrated in FIG. 1A, the navigation system 102 can transform the coordinates of each tracker 132 from the localizer coordinate system LCLZ into other coordinate systems (e.g., defined by different trackers 132, localizers 130, and the like), or vice versa, so that navigation relative to the target site ST (or control of surgical instruments 106) can be based at least partially on the relative positions and orientations of multiple trackers 132 within a common coordinate system (e.g., the localizer coordinate system LCLZ). Coordinates can be transformed using a number of different conventional coordinate system transformation techniques. It will be appreciated that the localizer 130 or other components of the navigation system 102 could be arranged, supported, or otherwise configured in other ways without departing from the scope of the present disclosure. By way of non-limiting example, the localizer 130 could be coupled to the imaging system 104 in some embodiments (e.g., to the gantry 122). Other configurations are contemplated.

In the illustrated embodiment, the localizer 130 is an optical localizer and includes a camera unit 148 with one or more optical position sensors 150. The navigation system 102 employs the optical position sensors 150 of the camera unit 148 to sense the position and/or orientation of the trackers 132 within the localizer coordinate system LCLZ. To this end, the trackers 132 each employ one or more markers 152 (also referred to as "fiducials" in some embodiments) that are supported on an array 154 in a predetermined arrangement. However, as will be appreciated from the subsequent description below, trackers 132 may have different configurations, such as with different quantities of markers 152 that can be secured to or otherwise formed in other structures besides the arrays 154 illustrated throughout the drawings (e.g., various types of housings, frames, surfaces, and the like). Other configurations are contemplated.

In the representative embodiment illustrated herein, the trackers 132 each employ "passive" markers 152 (e.g., reflective markers such as spheres, cones, and the like) which reflect emitted light that is sensed by the optical position sensors 150 of the camera unit 148. In some embodiments, trackers 132 could employ "active" markers 152 (e.g., light emitting diodes "LEDs"), which emit light that is sensed by the optical position sensors 150 of the camera unit 148. Examples of navigation systems 102 of these types are described in U.S. Pat. No. 9,008,757, entitled "Navigation System Including Optical and Non-Optical Sensors," the disclosure of which is hereby incorporated by reference in its entirety.

Although one embodiment of the mobile cart 140 and localizer 130 of the navigation system 102 is illustrated in FIG. 1A, it will be appreciated that the navigation system 102 may have any other suitable configuration for monitoring trackers 132 which, as will be appreciated from the subsequent description below, may be of various types and configurations and could employ various types of markers 152. Thus, for the purposes of clarity and consistency, the term "marker 152" is used herein to refer to a portion of a tracker 132 (e.g., a passive marker 152 mounted to an array 154) that can be monitored by a localizer 130 to track (e.g., states, motion, position, orientation, and the like) of the object to which the tracker 132 is secured, irrespective of the specific type or configuration of the localizer 130 and/or tracker 132.

In some embodiments, the navigation system 102 and/or the localizer 130 could be radio frequency (RF) based. For example, the navigation system 102 may comprise an RF transceiver coupled to the navigation controller 128. Here, the trackers 132 may comprise markers 152 realized as RF emitters or transponders, which may be passive or may be actively energized. The RF transceiver transmits an RF tracking signal, and the RF emitters respond with RF signals such that tracked states are communicated to (or interpreted by) the navigation controller 128. The RF signals may be of any suitable frequency. The RF transceiver may be positioned at any suitable location to track the objects using RF signals effectively. Furthermore, it will be appreciated that embodiments of RF-based navigation systems may have structural configurations that are different than the navigation system 102 illustrated throughout the drawings.

In some embodiments, the navigation system 102 and/or localizer 130 may be electromagnetically (EM) based. For example, the navigation system 102 may comprise an EM transceiver coupled to the navigation controller 128. Here, the trackers 132 may comprise markers 152 realized as EM components (e.g., various types of magnetic trackers, electromagnetic trackers, inductive trackers, and the like), which may be passive or may be actively energized. The EM transceiver generates an EM field, and the EM components respond with EM signals such that tracked states are communicated to (or interpreted by) the navigation controller 128. The navigation controller 128 may analyze the received EM signals to associate relative states thereto. Here too, it will be appreciated that embodiments of EM-based navigation systems may have structural configurations that are different than the navigation system 102 illustrated throughout the drawings.

Those having ordinary skill in the art will appreciate that the navigation system 102 and/or localizer 130 may have any other suitable components or structure not specifically recited herein. Furthermore, any of the techniques, methods, and/or components described above with respect to the camera-based navigation system 102 shown throughout the drawings may be implemented or provided for any of the other embodiments of the navigation system 102 described herein. For example, the navigation system 102 may also be based on one or more of inertial tracking, ultrasonic tracking, image-based optical tracking (e.g., with markers 152 are defined by patterns, shapes, edges, and the like that can be monitored with a camera), or any combination of tracking techniques. Other configurations are contemplated.

Referring now to FIGS. 1A and 1B, as noted above, the patient trackers 132A, 132B are supported on respective mount assemblies 134 according to embodiments of the present disclosure which, in turn, are secured to different portions of the patient's P anatomy (e.g., on opposing lateral sides of the ilium). In the representative embodiments of the patient trackers 132A, 132B illustrated throughout the drawings, each of the patient trackers 132A, 132B comprises a respective array 154 to which four markers 152 are secured. As noted above, the markers 152 in the illustrative embodiments are realized as "passive" reflective spheres that can be removably secured to the array 154. However, those having ordinary skill in the art will appreciate that other configurations are contemplated, and the patient trackers 132A, 132B could be of various styles, types, and/or configurations, and could employ any suitable quantity, type, and/or arrangement of markers 152 without departing from the scope of the present disclosure.

In the representative embodiment illustrated in FIG. 1B, the surgical robot 160 is realized as a multi joint robotic arm 162 that includes a plurality of linkages 164 connected by joints 166 having actuator(s) and optional encoder(s) to enable the linkages 164 to rotate, bend and/or translate relative to one another in response to control signals from a robot control system (not shown in detail). The robotic arm 162 may be fixed to a support structure (e.g., to the imaging system 104) at one end, and may have a robotic end effector 168 at the other end of the robotic arm 162 that is configured to hold, receive, guide, or otherwise position one or more types of surgical instruments 106. In the representative embodiment illustrated herein, the robotic end effector 168 is realized as a guide tube configured to receive surgical instruments 106 along a fixed axis that can be arranged relative to the surgical site ST via the robotic arm 162. It will be appreciate that the surgical robot 160 could be of various types, styles, configurations, and the like without departing from the scope of the present disclosure.

Figure 2:
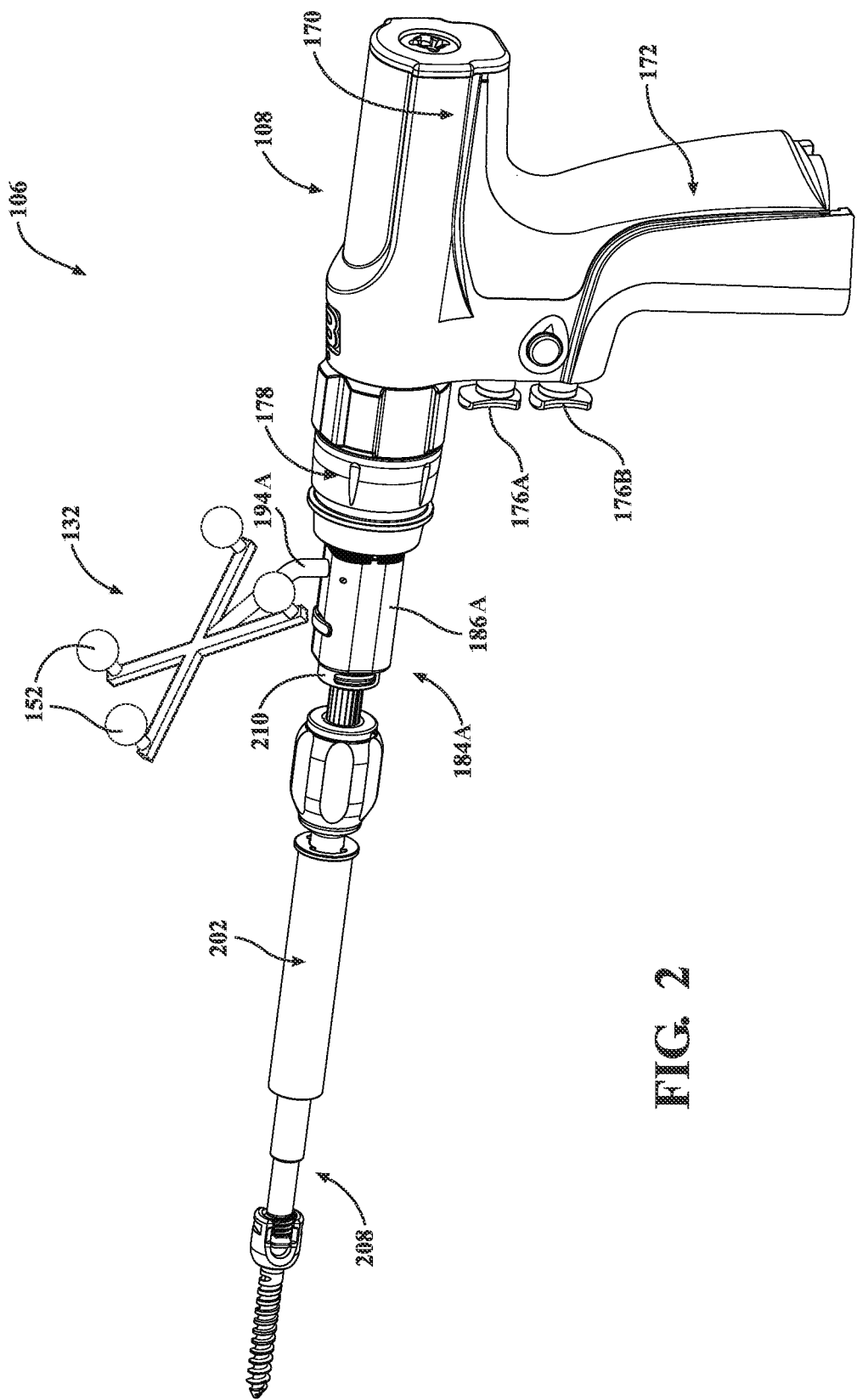
FIG. 2 is a perspective view of a surgical instrument including a rotational adapter supporting a tracker for navigating the surgical instrument.
Figure 3:
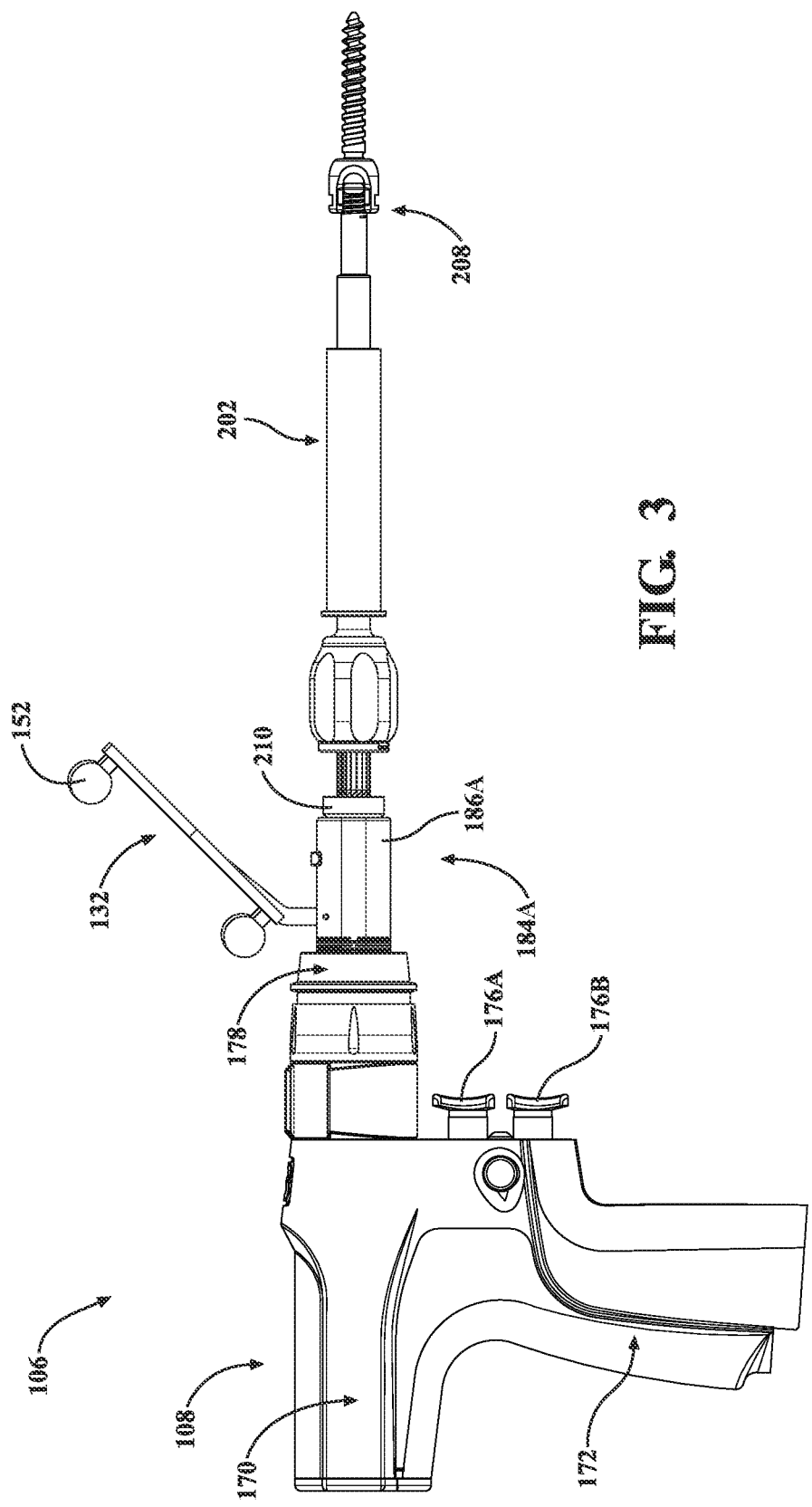
FIG. 3 is a side view of the surgical instrument including the rotational adapter supporting a tracker for navigating the surgical instrument of FIG. 2.
Figure 4:
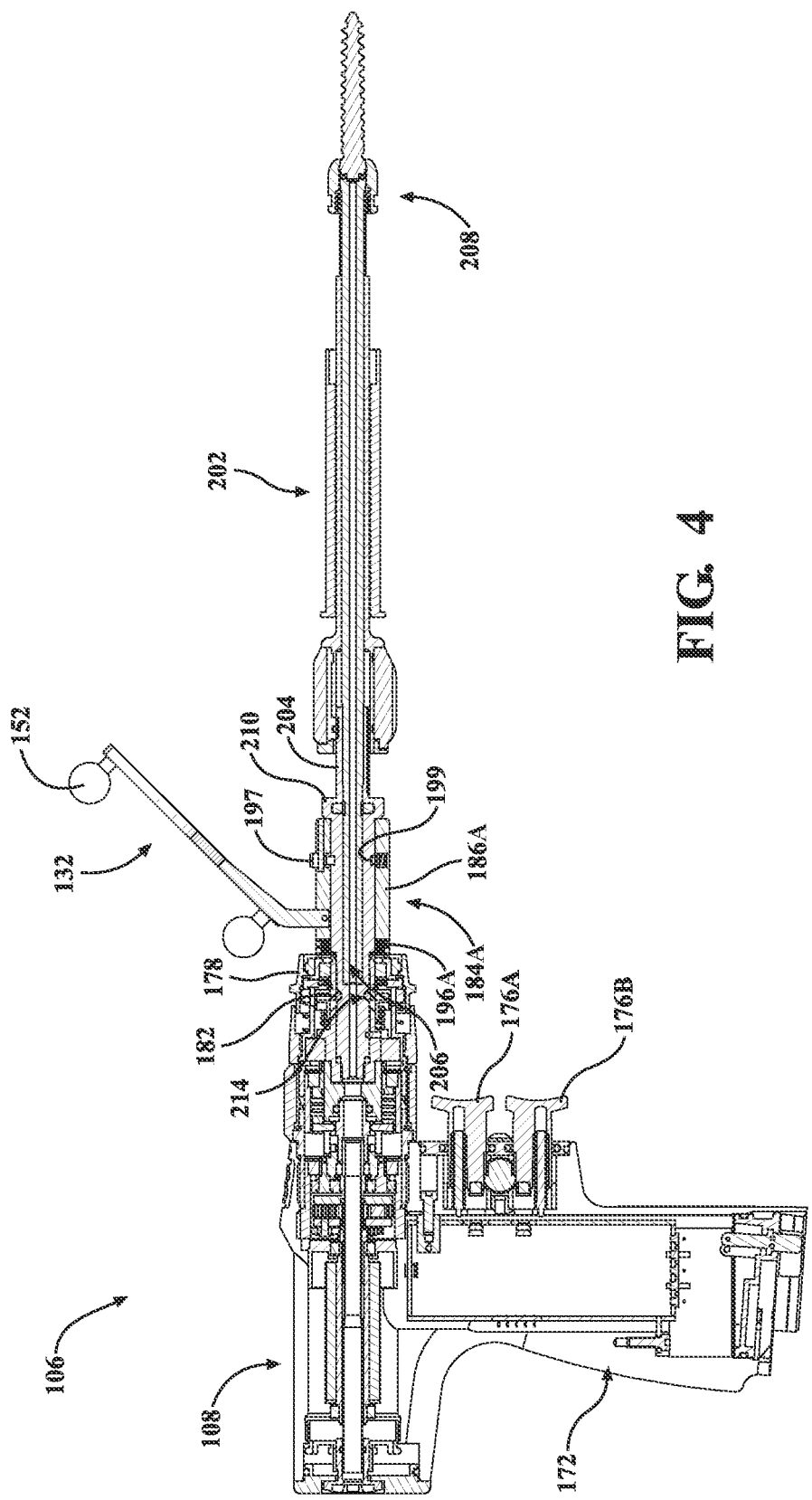
FIG. 4 is sectional view of the surgical instrument including the rotational adapter supporting a tracker for navigating the surgical instrument of FIGS. 2-3.

Referring to FIGS. 2-4, an exemplary configuration of a surgical instrument 106, such as a powered surgical handpiece 108, is illustrated. In the representative embodiment illustrated herein, the surgical handpiece 108 generally comprises a housing 170 including a grip portion 172. The surgical handpiece 108 further comprises a motor 174 disposed within the housing 170, and one or more triggers 176A, 176B configured to selectively actuating the motor 174. The surgical handpiece 108 may be powered by a battery (not shown) that is removably coupled to the handpiece, or may employ a cord for connecting the surgical handpiece 108 to a control box or electrical outlet (not shown) to supply power to the motor 174. When activated, the motor 174 is configured to actuate an end effector 202, 302.

The surgical handpiece 108 may further comprise a receiver 178 configured to receive an end effector 202, 302. As illustrated in FIGS. 2-4, the end effector 202, 302 may be realized as a screwdriver for inserting an implant in the patient. However, it is also contemplated that the end effector 202, 302 may comprise a drill bit, a tap, a reamer, or any similar surgical instrument working member that is commonly coupled to a surgical handpiece 108 and configured to manipulate biological tissue. The receiver 178 may comprise a coupling mechanism 180 to removably couple the end effector 202, 302 to the surgical handpiece 108. The coupling mechanism 180 may comprise a clamp, traditionally referred to as a chuck or drill chuck, configured to provide symmetrical pressure about an exterior surface of the end effector 202, 302 that that is coupled to the surgical handpiece 108. For example, the surgical handpiece 108, such as a surgical drill, may comprise a chuck for removably coupling an end effector 202, 302, such as a drill bit, reamer, or driver, to the surgical handpiece 108. In some versions, as illustrated in FIG. 4, the receiver 178 may comprise a quick-release or quick-connect chuck including opening keyed to the shape of the end effector 202, 302 and a retention feature 182 adapted to matingly engage a retainer 214, 314 of the end effector to couple the end effector to the surgical handpiece 108.

In some embodiments, the powered surgical handpiece 108 may include a first trigger 176A and a second trigger 176B. The motor 174 may be configured to actuate the receiver 178 in a first direction, such as rotating clockwise, when the first trigger 176A is manipulated by the user; and to actuate the receiver 178 in a second direction, such as rotating counterclockwise, when the second trigger 176B is manipulated by the user. However, it will be appreciated that other configurations are contemplated, and the powered surgical handpiece 108 may be of various styles, types, and configurations without departing from the scope of the present disclosure.

Figure 5:
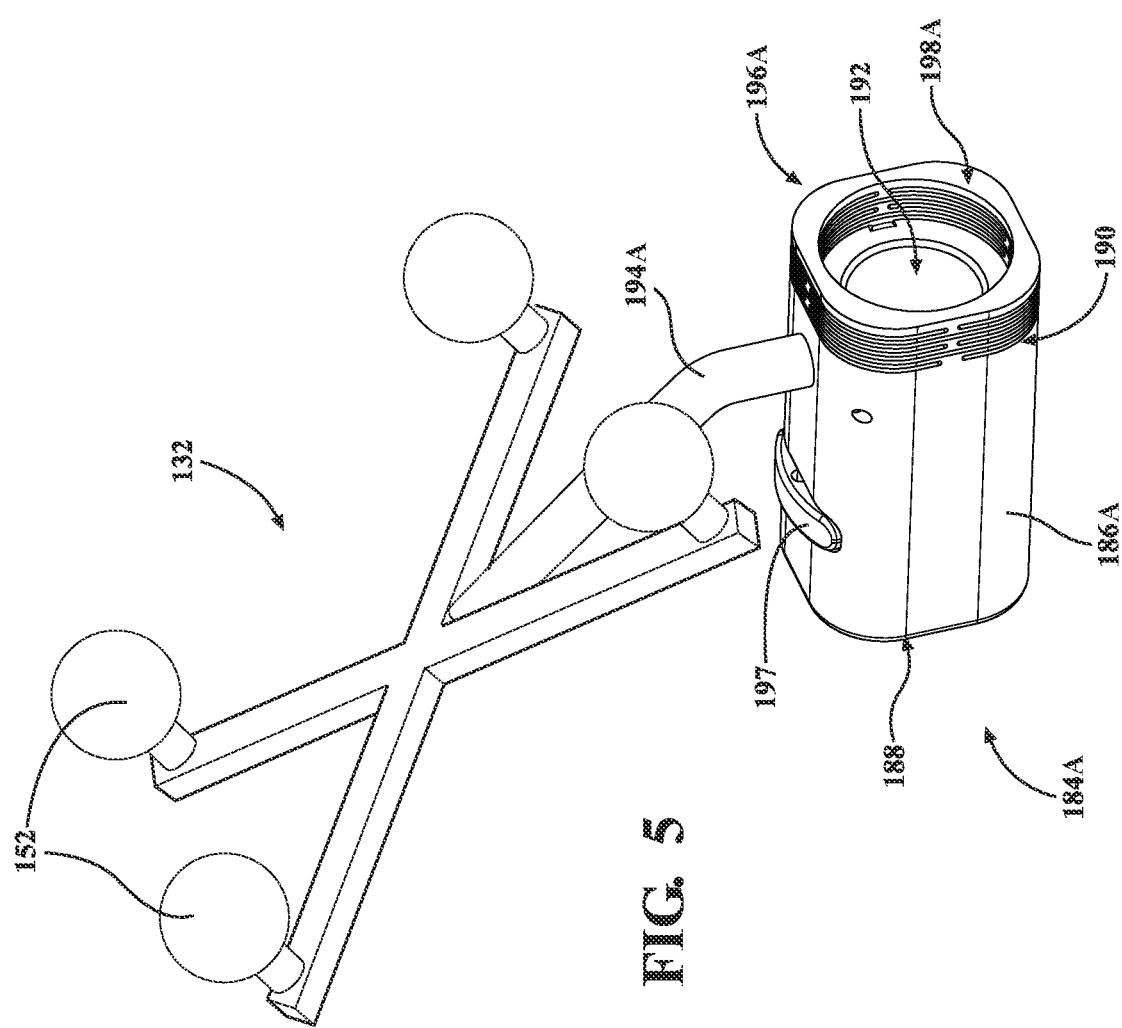
FIG. 5 is a perspective view of an exemplary rotational adapter illustrated as coupled to the surgical instrument of FIGS. 2-5.

As noted above, during a surgical procedure, an instrument tracker 132 including a marker 152 (also referred to herein as a tracking element) may be coupled to the surgical instrument 106 to allow the navigation system 102 to determine the position and/or orientation of the surgical instrument 106. Referring to FIG. 5, an exemplary configuration of an adapter 184A for coupling an instrument tracker 132 to one or more types of surgical instruments 106 is illustrated. The adapter 184A generally includes a base 186A having a distal end 188 and an opposing proximal end 190. The base 186A may also define an aperture 192 that extends through the adapter 184A and is configured to receive a portion of the end effector 202, 302. For example, as will be described in more detail below, the surgical instrument 106 comprises an end effector 202, 302 including a shaft 204, 304 extending between a distal portion 208, 308 for manipulating tissue and proximal portion 206, 306 defining a retainer 214, 314 for removably attaching the end effector 202, 302 to the surgical handpiece 108. The end effector 202, 302 also includes a stop 210, 310 arranged between the proximal portion 206, 306 and the distal portion 208, 308 of the shaft 204, 304. The aperture in the base 186A of the adapter 184A is defined to receive the shaft 204, 304 of the proximal portion of the end effector 202, 302. The adapter 184A may also include a mount 194A coupled to the base for releasably securing the tracker to the adapter. A biasing element 196A disposed on the base 186A of the adapter 184A includes an abutment interface 198A for engaging the surgical handpiece 108 and is configured to urge the base 186A away from the surgical handpiece 108. The biasing element 196A is compressed in response to attachment of the retainer 214, 314 to the surgical handpiece 108 with abutment occurring between the base 186A and the stop 210, 310 of the end effector 202, 302 to limit movement of the adapter 184A relative to the end effector 202, 302.

The biasing element 196A extends from at least one of the distal end 188 or the proximal end 190 of the base 186A. In the representative embodiments illustrated herein, the biasing element 196A is shown extending from the proximal end 190 of the base 186A. However, it is also contemplated that the biasing element 196A may also extend from the distal end 188 of the base 186A, and/or that one biasing element 196A could extend from the distal end 188 of the base 186A while another biasing element 196A could extend from the proximal end 190 of the base 186A. Other configurations are contemplated. The biasing element 196A may comprise a spring, wire coil, or similar mechanism capable of storing potential energy that can be used to provide a biasing force when compressed. For example, as illustrated in FIG. 5, the biasing element 196A may comprise a spring-like element created from a metallic material that is wire cut to create slits that allow the biasing element 196A to compress when a force is applied and decompress when the force is removed from the biasing element 196A. It is further contemplated that biasing element 196A may comprise a spring defined by a plurality of wave elements including a distal wave element and a proximal wave element. The wave elements of the spring may be configured such that the distal wave element comprises a first thickness, and the proximal wave element comprises a second thickness, or vice versa. The spring may be further configured such that the second thickness is larger than the first thickness. This configuration of the biasing element 196A may be utilized to create a variable increment of increase as the biasing element 196A is compressed. For example, the thicker wave element may provide a greater biasing force when compressed relative to the thinner wave element. In such a configuration, as the biasing element 196A is compressed, the thinner wave element (i.e. weaker) will compress first creating an initial and/or weaker biasing force until the thinner wave element has been compressed to a point that a sufficient biasing force has been created by the thinner wave element to begin engaging/compressing the thicker wave element (i.e. stronger). As the thicker wave element is compressed, the biasing force created by the biasing element 196A will increase at a greater increment per unit of distance that the biasing element 196A is compressed relative to the biasing force created initially when the thinner wave element of the biasing element 196A was primarily being compressed.

The biasing element 196A may also comprise or otherwise define an abutment interface 198A. The abutment interface 198A may be realized as a thicker or reinforced portion of the biasing element 196A. The abutment interface 198A is the portion of biasing element 196A that is furthest from the base 186A. As illustrated in the figures, when the biasing element 196A extend from the proximal end 190 of the base 186A, the abutment interface 198A is configured to engage the surgical instrument 106. However, in the configuration described above where the biasing element 196A may extend from the distal end 188 of the base 186A, the abutment interface 198A would be configured to engage a stop 210, 310 on the end effector, which will be described in greater detail below.

The biasing element 196A may define an aperture 192 that is a continuation of the aperture 192 defined by the base 186A. In some embodiments, the aperture 192 defined by the biasing element 196A may comprise a first diameter D1, and the aperture 192 defined by the base 186A may comprise a second diameter D2. As illustrated in FIG. 5, in some embodiments, the adapter 184A may be configured such that the first diameter D1 is greater than the second diameter D2. It may be advantageous for the aperture 192 defined by the biasing element 196A to have a larger first diameter D1 than the second diameter D2 of the aperture 192 defined by the base 186A to provide additional clearance between the interior surface of the biasing element 196A and the end effector 202, 302. However, it is also contemplated that first diameter D1 may be the same as the second diameter D2. It is further contemplated, that depending on the configuration of the end effector 202, 302, the first diameter D1 may be smaller than the second diameter D2. This configuration would require the end effector 202, 302 to have a tapered shaft, with the portion of the end effector 202, 302 that is encircled by the biasing element 196A similarly having a smaller diameter than the portion of the end effector 202, 302 that is encircled by the base 186A.

The adapter 184A may also comprise the mount 194 extending from the base 186A. The mount 194A may comprise a coupler (not shown), such as a quick connect adapter, configured to removably couple the instrument tracker 132 to the adapter 184A. In some versions, the coupler may comprise a threaded, a quarter turn, a snap fit, or similar connector for removably coupling the instrument tracker 132 to the adapter 184A. While not described in detail herein, in some embodiments, the mount 194A or another portion of the adapter 184A may comprise or otherwise be realized as a coupler similar to as is described in U.S. Pat. No. 7,725,162, entitled "Surgery System," the disclosure of which is incorporated by reference in its entirety. Other configurations are contemplated.

The adapter 184A may also comprise a coupler 197. The coupler 197 may be disposed on and/or defined by the base 186A and configured to removably secure the adapter 184A to the end effector. The coupler 197 may comprise sliding mechanism configured to selectively engage a correspond coupling feature on the end effector 202, 302, which is defined as a recess 212, 312 in the proximal portion 206 of the shaft 204. For example, as illustrated in FIG. 4 (also shown in FIG. 7B which will be discussed in more detail below), the coupler 197 may comprise a sliding mechanism including a detent 199 configured to engage an annular recess 212, 312 in the shaft 204, 304 of the end effector 202, 302 when the adapter 184A is coupled to the end effector 202, 302. In operation, the coupler 197 may comprise a detent 199 shaped to allow the user to slide the adapter 184A onto the shaft 204, 304 of the end effector 202, 302. For example, the detent 199 may include a sloped surface that allows the detent 199 to be slid over the shaft 204, 304 of the end effector 202, 302 when attaching the adapter 184A to the end effector 202, 302. Once the adapter 184A has been slid sufficiently far enough onto the shaft 204, 304 of the end effector 202, 302, the detent 199 becomes seated in the recess 212, 312 of the end effector 202, 302 securing the adapter 184A to the end effector 202, 302. In order to detach the adapter 184A from the end effector 202, 302, the user may manipulate the coupler 197 to disengage the detent 199 from the recess 212, 312 of the end effector 202, 302, allowing the user to slide the adapter 184A off the shaft 204, 304 of the end effector 202, 302. It will be appreciated that this configuration prevents the adapter 184A from sliding off the end effector 202, 302 when the end effector 202, 302 is separated from the surgical handpiece 108, which promotes significantly improved handling during the process of attaching and detaching the end effector 202, 302 to/from the surgical handpiece 108, as the user does not have to worry about positioning the adapter 184A relative to the surgical handpiece 108 while attaching the end effector to the surgical handpiece 108.

Referring to FIG. 6A, a partially exploded view of the adapter 184A and a first end effector 202 is illustrated. The first end effector 202 includes distal portion 208 for manipulating tissue and proximal portion 206 defining a retainer 214 for removably attaching the first end effector 202 to the surgical handpiece 108. As described above, the first end effector 202 may comprise a drill bit, a reamer, or similar cutting tool. The first end effector 202 may also comprise a screwdriver or a similar tool for inserting and/or placing a medical implant. Other configurations are contemplated.

The first end effector 202 may further comprise a retainer 214. The retainer 214 may comprise an annular recess in the proximal portion 206 of the first end effector 202. For example, as illustrated in FIG. 6A, and also referring back to FIG. 4, the retainer 214 is realized with a V-shaped recess defined in the proximal portion 206 of the first end effector. As described above, the retainer 214 is configured to cooperate with the coupling mechanism 180 of the receiver 178 on the surgical instrument 106 to removably secure the first end effector 202 to the surgical instrument 106. While the retainer is illustrated as a recessing have a V-shaped profile throughout the drawings, it is contemplated that the recess may be defined in alternate shapes that cooperate with the coupling mechanism 180 of the receiver 178 or the surgical instrument 106 described above. For example, the retainer 214 may comprise a recess defined in the shaft 204 having a square-shaped profile, with the opposing surfaces of the recess arranged to be generally parallel to one another.

The first end effector 202 may also comprise a stop 210 arranged between the proximal portion 206 and the distal portion 208. Referring to FIG. 6A, the stop 210 comprises an annular body disposed on the shaft 204 of the first end effector 202. The stop 210 may be formed as part of the shaft 204 and configured as a protrusion that encircle and extends outwardly from an outer surface of the shaft 204. In some versions, the stop 210 may be configured as a separate component that is attached to the shaft 204 of the first end effector. For example, the stop 210 may comprise a bearing or washer that is coupled to the shaft 204 of the first end effector 202. The stop 210 may be press-fitted onto the shaft 204. Attentively, the stop 210 may be coupled to the shaft via a weld, epoxy, or similar adhesive. It will be appreciated that the stop 210 could be defined by various components and/or structural features of the surgical instrument 106. Other configurations are contemplated.

The stop 210 is positioned a defined location between the proximal portion 206 and the distal portion 208 of the first end effector 202 and is configured to abut the adapter 184A. For example, the stop 210 may be positioned on the shaft 204 of the first end effector 202 at a known distance from the retainer 214. The distance that the stop 210 is spaced from the retainer 214 may be based on the length of the combination of the base 186A and biasing element 196A of the adapter 184A. The known distance between the stop 210 and the retainer 214 may be selected to compress the biasing element 196A a known distance when the first end effector 202 is coupled to the surgical instrument 106. The distance that the biasing element 196A is compressed may be determined based on geometric and/or material properties of the biasing element 196A, wherein the distance the biasing element 196A is compressed is configured to generate a predetermined amount of friction between the adapter 184A and the combination of the stop 210 and the receiver 178 of the surgical instrument 106. How the amount of friction force is achieved will be described in greater detail below. In one exemplary configuration, the distance between the stop 210 and the retainer 214 is configured such that the biasing element 196A compresses to a distance (or by an amount) that generates a predetermined amount of friction between the adapter 184A and the combination of the stop 210 and the receiver 178, where the predetermined amount of friction is sufficient to limit rotation of the adapter 184A relative to the surgical instrument 106. As will be appreciated by the subsequent description below, the predetermined amount of friction, created by the adapter 184A being compressed between the receiver 178 and the stop 210, may limit or otherwise prevent "free" rotation of the adapter 184A relative to the surgical instrument 106 absent the application of an additional force being applied to the adapter 184A. By contrast, when the adapter 184A is attached to the first end effector 202, but the first end effector 202 is detached from the surgical handpiece 108, the receiver 178 is not present, in combination with the stop 210, to compress the adapter 184A. In this arrangement, the first end effector 202 being detached from the surgical handpiece 108, the adapter 184A may spin freely about the first end effector 202 and/or relative to the stop 210.

The stop 210 may also be configured to position the adapter 184A at a known distance from the distal portion 208 of the first end effector 202. Here, it will be appreciated that positioning the adapter 184A at a known distance from the distal portion 208 of the first end effector 202 can allow the navigation system 102 to precisely and accurately determine the position and/or orientation of the distal portion 208 of the first end effector 202 relative to the surgical site ST and/or target object. For example, the navigation system 102 may be configured to determine the position and/or orientation of the distal portion 208 of the first end effector 202 using the detected position of the tracker 132 that is coupled to the adapter 184A and the known position of the adapter 184A relative to the distal portion 208.

The first end effector 202 may also comprise a recess 212, as described above, that is configured to receive the detent 199 of the coupler 197 on the adapter 184A when the adapter 184A is attached to the first end effector 202. The recess 212 on the proximal portion 206 of the first end effector 202 may be configured to removably attach the adapter 184A to the first end effector 202. As described above, the biasing element 196A may be compressed between the receiver of the surgical instrument 106 and the stop 210 on the first end effector 202. Therefore, the size and shape of the recess 212 defined in the outer surface of the proximal portion 206 of the first end effector 202 must allow for sufficient lateral movement of the detent 199 within the recess 212 to allow the biasing element 196A to compress and causing the adapter 184A to abut the stop 210. Furthermore, the shape of the recess 212, in combination with the detent 199, are configured to allow the adapter 184A to be rotated about the first end effector 202 and/or relative to the stop 210 or surgical handpiece 108.

In the representative embodiment depicted in the FIG. 6A, the recess 212 is an annular recess defined in the shaft 204 of the first end effector 202 and configured to receive the detent of the adapter 184A, as illustrated in FIG. 4. The recess 212 encircles the shaft 204 such that once the detent 199 is positioned within the recess 212, the adapter 184A may be rotated about the shaft 204 and the detent 199 remains in the recess 212 securing the adapter 184A to the first end effector 202. While the illustrated embodiments depicts the recess 212 completely encircling the shaft 204 of the first end effector, it is contemplated that the recess 212 may be configured as a groove or differently-shaped formation that only partially encircles the shaft 204. In operation, this configuration prevents the adapter from being fully rotated 360 degrees about the shaft 204 while still permitting the adapter 184A to be rotated about a portion of the shaft 204, which may be sufficient to maintain visibility between the tracker 132 and the navigation system 102. For example, when using a surgical handpiece 108 of the type illustrated in FIG. 2, it may only sometimes be necessary to rotate the adapter 184A about certain types of end effector s202, 302, and may generally remain positioned on the underside of the end effector 202, 302 adjacent the grip portion 172. In this scenario, it may be sufficient that the end effector 202, 302 employ a recess 212, 312 that only partially encircles the end effector 202, 302, arranged such as to permit coupling the end effector 202, 302 to the surgical handpiece 108 so that the recess 212, 312 is positioned on the top of the end effector 202, 302 relative to the surgical handpiece 108. However, it will be appreciated that other configurations are contemplated.

Figure 6B:
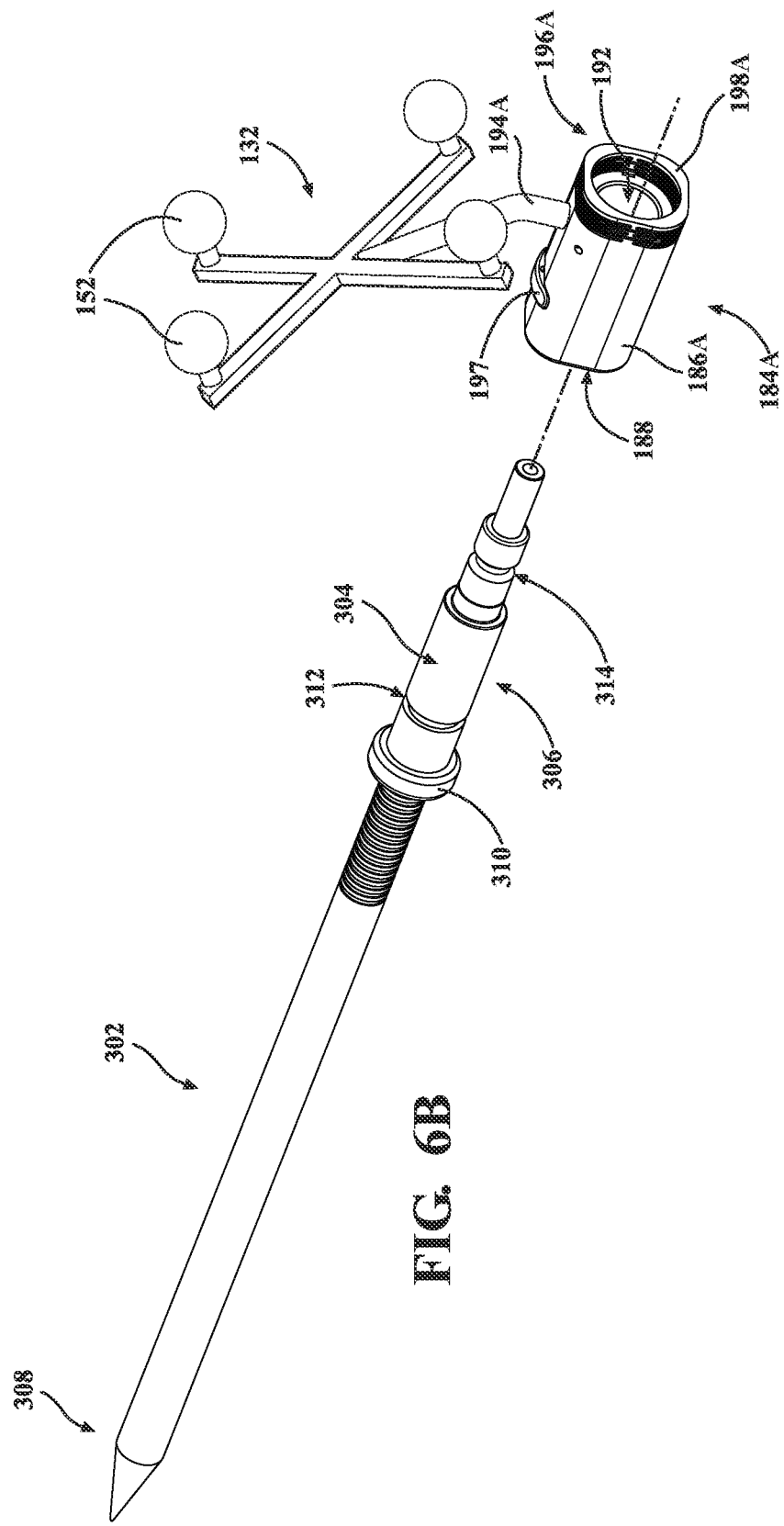
FIG. 6B is a partially-exploded perspective view of the rotation adapter of the surgical of FIGS. 2-5 with a calibration tool.

Referring to FIG. 6B, a partially exploded view of the adapter 184A and a second end effector 302 is illustrated. Those having ordinary skill in the art will appreciate that the same adapter 184A may be utilized to attach the instrument tracker 132 to multiple end effectors 202, 302 and/or to end effectors 202, 302 of different types, styles, configurations, and the like. In some embodiments, the second end effector 302 may comprise or otherwise be realized as a calibration body 302 configured to function as a pointer or similar instrument to calibrate the position of the instrument tracker 132 with regard to the adapter 184A, and/or to facilitate registration of various components of the navigation system 102. Other configurations are contemplated.

The second end effector 302 may include, define, or otherwise utilize components, structural features, and the like that are substantially similar (or even identical) to those described above in connection with the first end effector 202 (see FIG. 6A). For example, the second end effector 302 may include a distal portion 308 for touching off on a one or more locations as part of a calibration procedure, and a proximal portion 306 defining a retainer 314 for removably attaching the second end effector 302 to the surgical handpiece 108. Here too, it will be appreciated that the retainer 314 of the second end effector 302 may have the similar characteristics and/or functionality as the retainer 314 of the first end effector 202 described above. For example, in operation, the retainer 314 of the second end effector 302 may be utilized to removably couple the second end effector 302 to the surgical instrument 106. The surgical instrument 106 may then be manipulated by the user to touch the distal portion 308 of the second end effector 302 to points at known locations to allow the navigation system 102 to calibrate the position of the tracker 132 relative to the adapter 184A. It is also contemplated that the second end effector 302 may be utilized to calibrate the position of the tracker 132 relative to the adapter 184A without coupling the second end effector 302 to the surgical instrument 106. For example, the adapter 184A may be coupled to the second end effector 302, and the user may manipulate the second end effector 302 directly to touch the distal portion 308 of the second end effector 302 to points at known locations to allow the navigation system 102 to calibrate the position of the tracker 132 relative to the adapter 184A. Other configurations are contemplated.

The second end effector 302 may also comprise a recess 312 configured to receive the detent 199 of the coupler 197 on the ad adapter 184A when the adapter 184A is attached to the second end effector 302. However, described above, it is contemplated that the second end effector 302 does not require coupling of the second end effector 302 the surgical instrument 106 for the purpose of calibrating the position of the tracker 132 relative to the adapter 184A. Without the surgical instrument 106, there is no combination of the receiver 178 and the stop 310 to compress the biasing element 196A and cause the adapter 184A to abut the stop 310. Furthermore, during calibration, it will be appreciated that the adapter 184A needs to be positioned at a specific distance from the distal portion 308 of the second end effector 302 in order for the navigation system to accurately determine the position of the tracker relative to the adapter 184A. One way of accomplishing this is to utilize the position, the size, and/or the shape of the recess 312 of the second end effector 302 to locate the adapter 184A relative to the distal portion 308 of the second end effector 302. For example, the position where the recess 312 is defined in the shaft 304 of the second end effector 302 may to cause the adapter 184A to abut the stop 310 when the detent 199 is disposed in the recess 312. The width of the recess 312 in the shaft 304 may also be configured to snugly receive the detent 199, such as to prevent lateral movement along the length of the second end effector 302 when the detent 199 is disposed in the recess 312.

The shape of the recess 312 may also be configured to correspond to the shape of the detent 199, such that the combination of the detent 199 and recess 312 urge the adapter 184A toward the stop 310, causing the adapter 184A to abut the stop 310 when the detent 199 is disposed in the recess 312. For example, the recess 312 and the detent 199 may comprise opposing sloped surfaces configured to urge the adapter toward the stop 310 when the detent 199 is disposed in the recess 312. Other configurations are contemplated.

As illustrated in the FIG. 6B, the recess 312 is an annular recess defined in the shaft 304 of the first end effector 202 and configured to receive the detent 199 of the adapter 184A. As noted above, the recess 312 encircles the shaft 304 such that once the detent 199 is positioned within the recess 312, the adapter 184A may be rotated about the shaft 304 and the detent 199 remains in the recess 312 securing the adapter 184A to the first end effector 202. Here too, while the recess 312 that encircles the shaft 304 of the first end effector 202 in the illustrated embodiments, it is contemplated that the recess 312 may be realized as a groove or other formation that only partially encircles the shaft 304. The recess 312 may also be configured as a single indent configured to receive the detent 199. Here, it will be appreciated that employing a partial recess or an indent would facilitate preventing the adapter from being fully rotated 360 degrees about the shaft 304. However, the recess 312 would nevertheless function to attach the adapter 184A to the second end effector 302. Here, in some embodiments, such as where second end effector 302 is configured as a calibration body for the purpose of calibrating the position of the tracker 132 to the adapter 184A, it may not be necessary to be able to rotate the adapter 184A about the second end effector 302. For the purpose of calibration, for example, the position of the adapter 184A on the second end effector 302 may be more important than being able to rotate the adapter 184A about the second end effector 302. In such a scenario, the partial recess and/or the single indent would serve the purpose of attaching the adapter 184A to the second end effector 302 at a specific location on the second end effector 302.

In operation, a method of calibrating an adapter 184 with a navigation system 102, may comprise coupling an adapter 184, including a tracker 132, to the calibration body 302. The navigation system 102 may then observe the calibration body 302 as the calibration body 302 is touched to a number of known locations. The known location may be a point on an object such as a calibration block (not shown) including a tracker 132. In some versions, the known location may include touching a known point on the patient that was identified using a patient tracker 132 and/or patient image data ID. This will allow the surgical navigation system to calibrate a position of tracker 132 relative to the adapter 184. The adapter 184, including the tracker 132, may then be removed from the calibration body 302. The adapter 184 and tracker 132 may then be coupled to an end effector 202, and the end effector 202 may be coupled to a surgical handpiece 108. Coupling the end effector 202 to the surgical handpiece 108 causes a biasing element 196A of the adapter 184 to compress and urge the adapter 184 away from the surgical handpiece 108 and toward a stop 210 of the end effector 202. The compression of the adapter 184 between the surgical handpiece 108 and the stop 210 will create a predetermined amount of friction limiting rotational movement of the adapter 184 relative to the end effector 202. Here, it will be appreciated that coupling the end effector 202 to the surgical handpiece 108, which causes the biasing element 196A to position the adapter 184 adjacent the stop 210 of the end effector 202, also results in the tracker 132 of the adapter 184 being positioned at a known position relative to a distal tip of the end effector 202.

The method may also comprise identifying the pose of the end effector 202 based on the calibrated position of the tracker 132 relative to the adapter 184 and a known position of the adapter 184 relative to the end effector 202. The method may also comprise applying and external force to the adapter 184 to rotate the tracker 132 about the end effector 202 so that the tracker 132 remains in view of the surgical navigation system 102.

Referring to FIGS. 7A and 7B, a partial sectional view of the end effector 202, 302 coupled to the receiver 178 of the of the surgical handpiece 108 is illustrated. As described above, the adapter 184A is coupled to the end effector 202, 302 by sliding the adapter 184A onto the proximal portion of the end effector 202, 302. The detent 199 of the coupler 197 on the adapter 184A is seated in the recess 212, 312 defined in the shaft 204, 304 of the end effector 202, 302 to secure the adapter 184A to the end effector 202, 302. Prior to attaching the end effector 202, 302 to the surgical handpiece 108, the end effector 202, 302 and adapter 184A are configured such that the adapter 184A may spin freely about the shaft 204, 304 of the end effector 202, 302.

The end effector 202, 302 may then be attached to the surgical handpiece 108 by inserting the proximal portion 206, 306 of the end effector 202, 302 into the receiver 178 to engage the coupling mechanism 180 of the receiver 178 with the retainer 214, 314 of the end effector 202, 302. As proximal portion 206, 306 of the end effector 202, 302 is inserted into the receiver 178, the abutment interface 198A defined by the biasing element 196A will engage the receiver 178, with the biasing element 196A urging the adapter 184A away from the receiver 178 and causing the adapter 184A to abut the stop 210, 310 of the end effector 202, 302. Once the adapter 184A abuts the stop 210, 310, the biasing element 196A compresses as the proximal portion 206, 306 of the end effector 202, 302 is inserted further into the receiver 178 until the coupling mechanism 180 engages the retainer 214, 314, thereby securing the end effector 202, 302 to the surgical handpiece 108. As described above, when the biasing element 196A is compressed by the receiver 178 urging the adapter against the stop 210, 310, a predetermined amount of friction will be generated between the receiver 178 and the biasing element 196A, as well as between the base 186 of the adapter 184A and the stop 210, 310. The adapter 184A, including the base 186 and the biasing element 196A, may be configured such that the predetermined amount of friction generated by compressing the biasing element 196A is great enough to limit free rotation (and/or even prevent free rotation) of the adapter 184A relative to the surgical handpiece 108. Upon detaching the end effector 202, 302 from the surgical handpiece 108, the biasing element 196A decompresses, and the adapter 184A will once again be able to spin freely about the shaft 204, 304 of the end effector 202, 302.

Figure 8B:
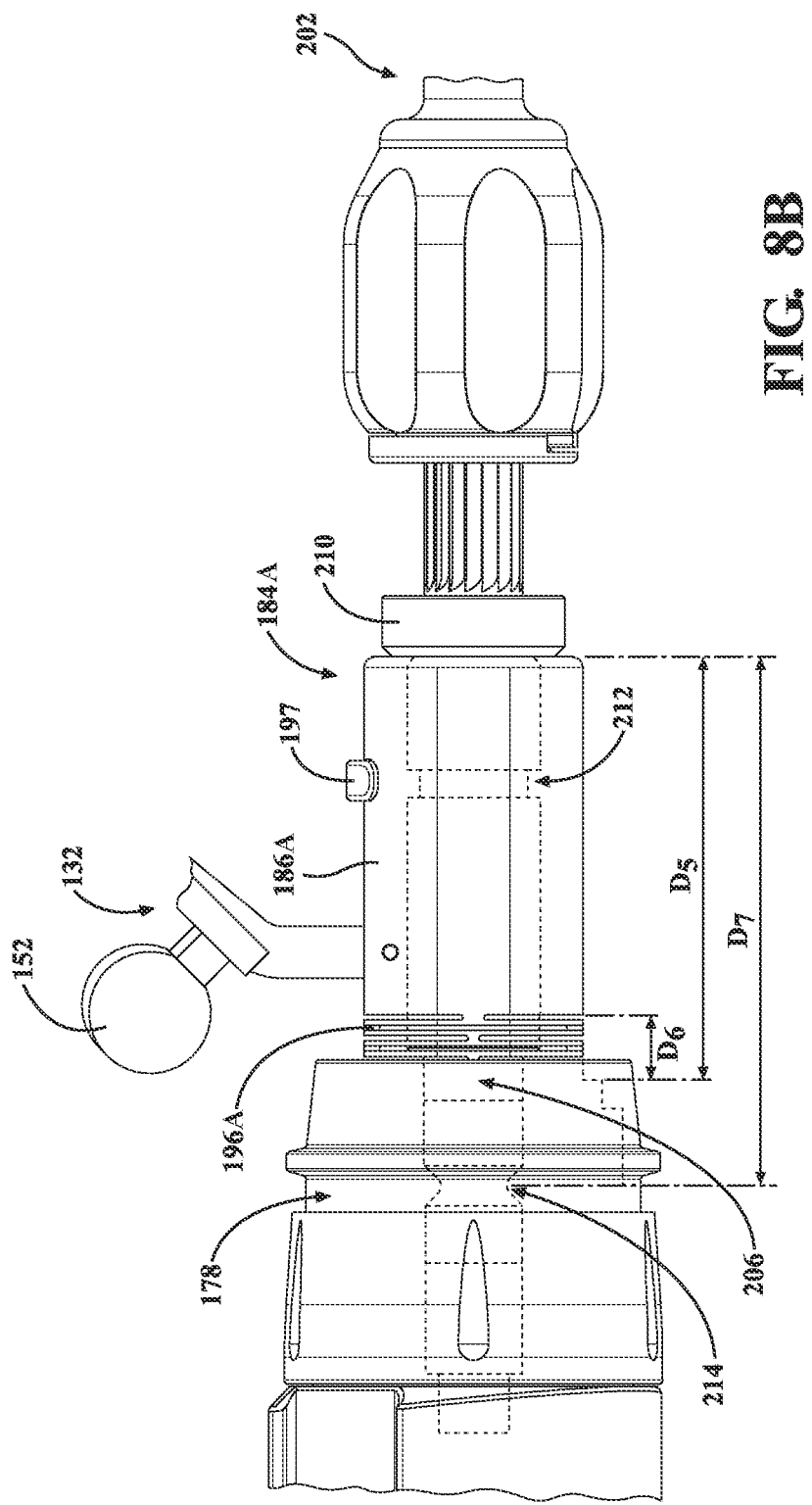
FIG. 8B is a side view of the rotational adapter coupled to the surgical instrument of FIGS. 2-5, the rotational adapter illustrated in a compressed state when coupled the surgical instrument.

Referring to FIGS. 8A and 8B, a side view of the adapter 184A is shown illustrating the biasing element 196A in a decompressed state and in a compressed state. FIG. 8A illustrates the adapter 184A disconnected from the end effector 202, 302 and in the decompressed state. In the decompressed state, the adapter 184A has an overall length spanning a decompressed length D3, with the biasing element 196A spanning a decompressed length D4. FIG. 8B illustrates the adapter 184A attached to the end effector 202, 302, with the end effector 202, 302 coupled to the receiver 178 of the surgical handpiece 108. As described above, coupling the end effector 202, 302 to the receiver 178 causes the biasing element 196A to compress, placing it in the compressed state. In the compressed state, the adapter 184A has a compressed length spanning a distance D5, with the biasing element 196A having a compressed length spanning a distance D6. The compressed length D5 of the adapter 184A and the compressed length D6 of the biasing element 196A are shorter than decompressed length D3 of the adapter 184A and the decompressed length D4 of the biasing element 196A. It will be appreciated that the terms "distance" and "length" may be used interchangeably herein unless otherwise noted.

The distance the biasing element 196A is compressed the end effector 202, 302 coupled to the receiver 178 of the surgical handpiece 108 may be determined by the structural features of the end effector 202, 302. Specifically, the distance the biasing element 196A is compressed is based on the distance D7 between the stop 210, 310 and the retainer 214, 314 of the end effector 202, 302. As illustrated in FIG. 8B, the location of the retainer 214, 314 determines the amount of the proximal portion 206, 306 of the end effector 202, 302 is inserted into the receiver 178. The amount of the proximal portion 206, 306 that is inserted into the receiver 178 in combination with the location of the stop 210, 310 on the end effector dictates the distance between the receiver 178 and the stop 210, 310, and the distance between the receiver 178 and the stop 210, 310 determines the distance the biasing element 196A is compressed. The distance that the biasing element 196A is compressed, in combination with the mechanical properties of the biasing element, determine the amount of frictional that will be generated between the receiver 178 and the biasing element 196A, as well as between the base 186 of the adapter 184A and the stop 210, 310. Thus, assuming the adapter 184A remains constant, the predetermined amount of friction created to limit the rotation of the adapter 184A about the end effector 202, 302 may be varied from one end effector to the next by manipulating the distance D7 between the stop 210, 310 and the retainer 214, 314. For example, increasing the distance D7 between the stop 210, 310 and the retainer 214, 314 will reduce the distance the biasing element 196A is compressed, resulting in a lesser amount of friction being created between the receiver 178 and the biasing element 196A, as well as between the base 186 of the adapter 184A and the stop 210, 310. Meaning it would require less force to rotate the adapter 184A relative to the surgical handpiece 108. In some versions, decreasing the distance D7 between the stop 210, 310 and the retainer 214, 314 will increase the distance the biasing element 196A is compressed, resulting in a greater amount of friction being created between the receiver 178 and the biasing element 196A, as well as between the base 186 of the adapter 184A and the stop 210, 310. Meaning it would require a greater force to rotate the adapter 184A relative to the surgical handpiece 108.

Referring to FIGS. 9-11B, an exemplary configuration of a surgical instrument 106, such as a manual surgical tool 110, is illustrated. The manual surgical tool 110 may comprises many of the same or similar components as the surgical handpiece 108 described above. Similar components between the surgical handpiece 108 and the manual surgical tool 110 are identified by the same base reference number, increase by increments of 100. In the representative embodiment illustrated herein, the manual surgical tool 110 generally comprises a body 171 including a grip portion 173. The surgical handpiece 108 further comprises a ratchet mechanism 175 disposed forward of the grip portion 173 and configured to provide selective directional rotation of the manual surgical tool 110.

Similar to the surgical handpiece 108 described above, the manual surgical tool 110 may further comprise a receiver 178 configured to receive an end effector 202, 302. As illustrated in FIGS. 9-11A, the end effector 202, 302 may be realized as a screwdriver for inserting an implant in the patient. However, it is also contemplated that the end effector 202, 302 may comprise a drill bit, a tap, a reamer, or any similar surgical instrument working member that is commonly coupled to a manual surgical tool 110 and configured to manipulate biological tissue. The receiver 178 may comprise a coupling mechanism 180 to removably couple the end effector 202, 302 to the surgical handpiece 108. The coupling mechanism 180 may comprise a clamp, traditionally referred to as a chuck, configured to provide symmetrical pressure about an exterior surface of the end effector 202, 302 that that is coupled to the surgical handpiece 108. Here, for example, the manual surgical tool 110 may comprise a chuck 179 for removably coupling an end effector 202, 302. In some versions, as illustrated in FIG. 10, the receiver 178 may comprise a quick-release or quick-connect chuck including opening keyed to the shape of the end effector 202, 302 and a retention feature 182 adapted to matingly engage a retainer 214, 314 of the end effector to couple the end effector to the manual surgical tool 110. Other configurations are contemplated.

Here too, an adapter 184A may be utilized to attach a tracker 132 to the manual surgical tool 110 as is described above with regard to the surgical handpiece. The adapter 184A be coupled to the end effector 202, 302 of the manual surgical tool 110 and configured to function in a substantially similar manner to as is described above.

Referring to FIGS. 11A and 11B, a sectional view of the manual surgical tool 110 is illustrated. As described above, a predetermined amount of friction is created between the receiver 178 and the biasing element 196A, as well as between the base 186 of the adapter 184A and the stop 210, 310, when the end effector 202, 302 is attached to the manual surgical tool 110. It will be appreciated that the amount of friction may vary from one end effector 202, 302 to the next, as well as from one surgical instrument 106 to the next. For example, the components of the end effector 202, 302 may be arranged to create a greater amount of friction with the adapter 184A when the end effector 202, 302 is used with a powered surgical handpiece 108 as compared to when used with a manual surgical tool 110. However, other configurations are contemplated.

Referring to FIG. 11B an exemplary configuration of the end effector 202, 302 including a stop 210, 310 spaced apart from the retainer 214, 314 by a distance D8. As described above, the amount of friction created to limit the rotation of the adapter 184A about the end effector 202, 302 may be varied by manipulating the distance between the stop 210, 310 and the retainer 214, 314. For example, increasing the distance between the stop 210, 310 and the retainer 214, 314 will reduce the distance the biasing element 196A is compressed, resulting in a lesser amount of friction being created between the receiver 178 and the biasing element 196A, as well as between the base 186 of the adapter 184A and the stop 210, 310. In some versions, decreasing the distance between the stop 210, 310 and the retainer 214, 314 will increase the distance the biasing element 196A is compressed, resulting in a greater amount of friction being created between the receiver 178 and the biasing element 196A, as well as between the base 186 of the adapter 184A and the stop 210, 310.

FIG. 11B shows the end effector 202, 302 with the stop 210, 310 spaced a distance D8 from the retainer 214, 314. This results in the adapter 184A has a compressed length spanning a distance D9, with the biasing element 196A having a compressed length of D10. If for example, if it is desired that the manual surgical tool 110 requires a lesser amount of friction to limit and/or prevent the rotation of the adapter 184A about the end effector 202, 302 than the surgical handpiece 108 described above in FIG. 8B, the end effector 202, 302 may be configured such that the distance D9 results in a compressed length D9 of the adapter 184A that is less than the compressed length D5 of the adapter 184A. In some versions, if it is desired that the manual surgical tool 110 requires a greater amount of friction to limit and/or prevent the rotation of the adapter 184A about the end effector 202, 302 than the surgical handpiece 108 described above in FIG. 8B, the end effector 202, 302 may be configured such that the distance D9 results in a compressed length D9 of the adapter 184A that is greater than the compressed length D5 of the adapter 184A.

Figure 13:
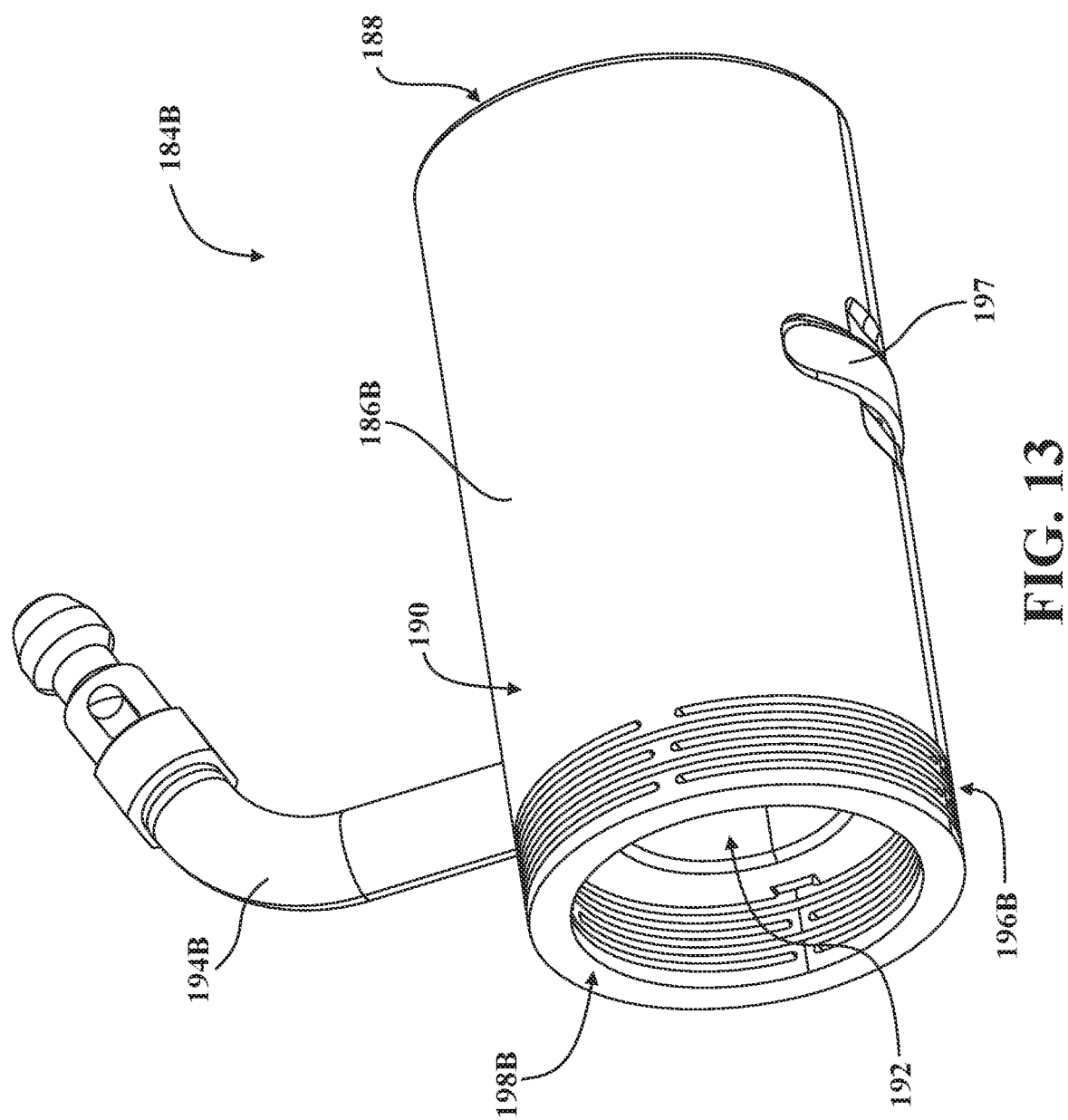
FIG. 13 is a perspective view of the second exemplary configuration of the rotational adapter of FIG. 12.
Figure 14:
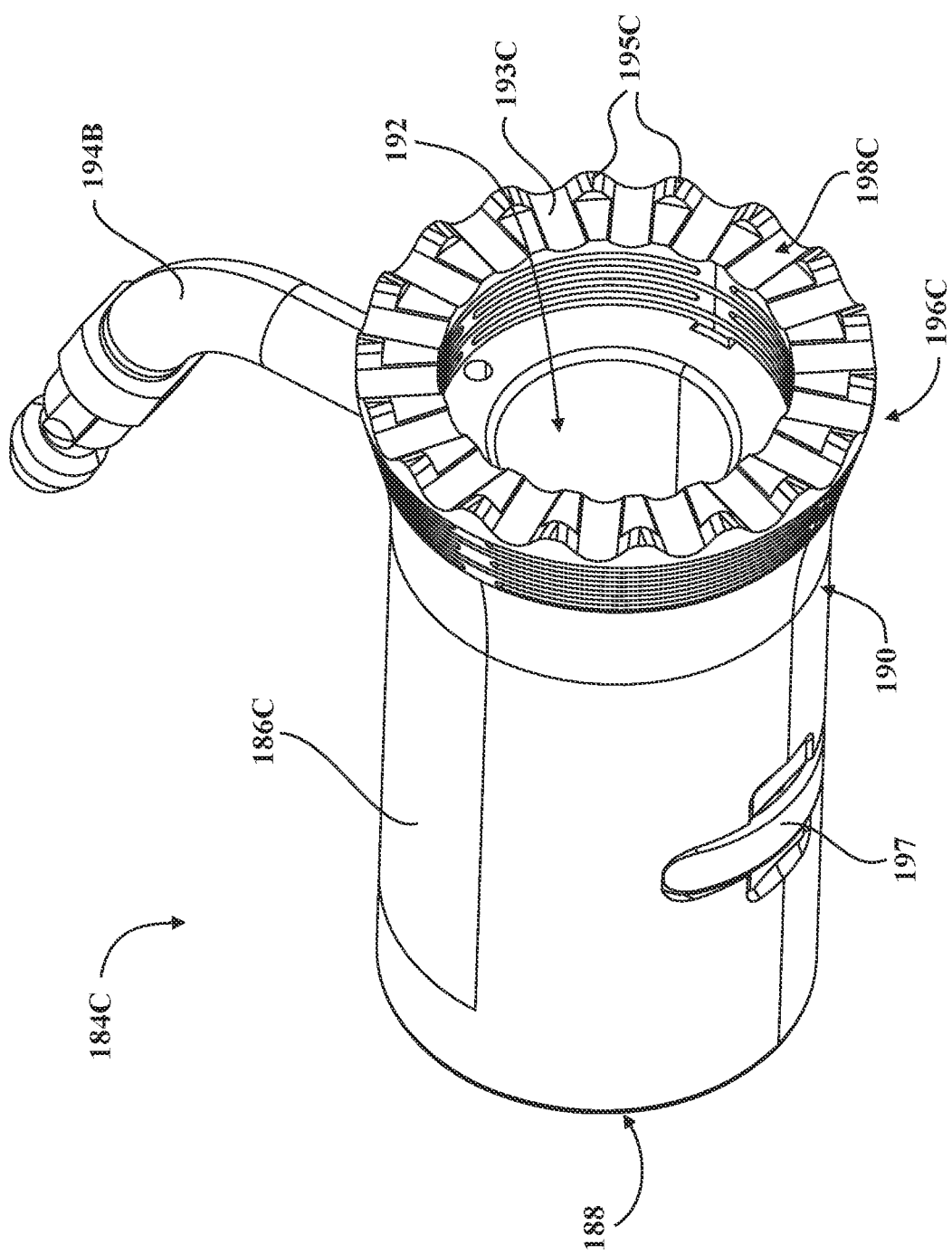
FIG. 14 is a rear perspective view of a third exemplary configuration of a rotational adapter for coupling to a surgical instrument.
Figure 15:
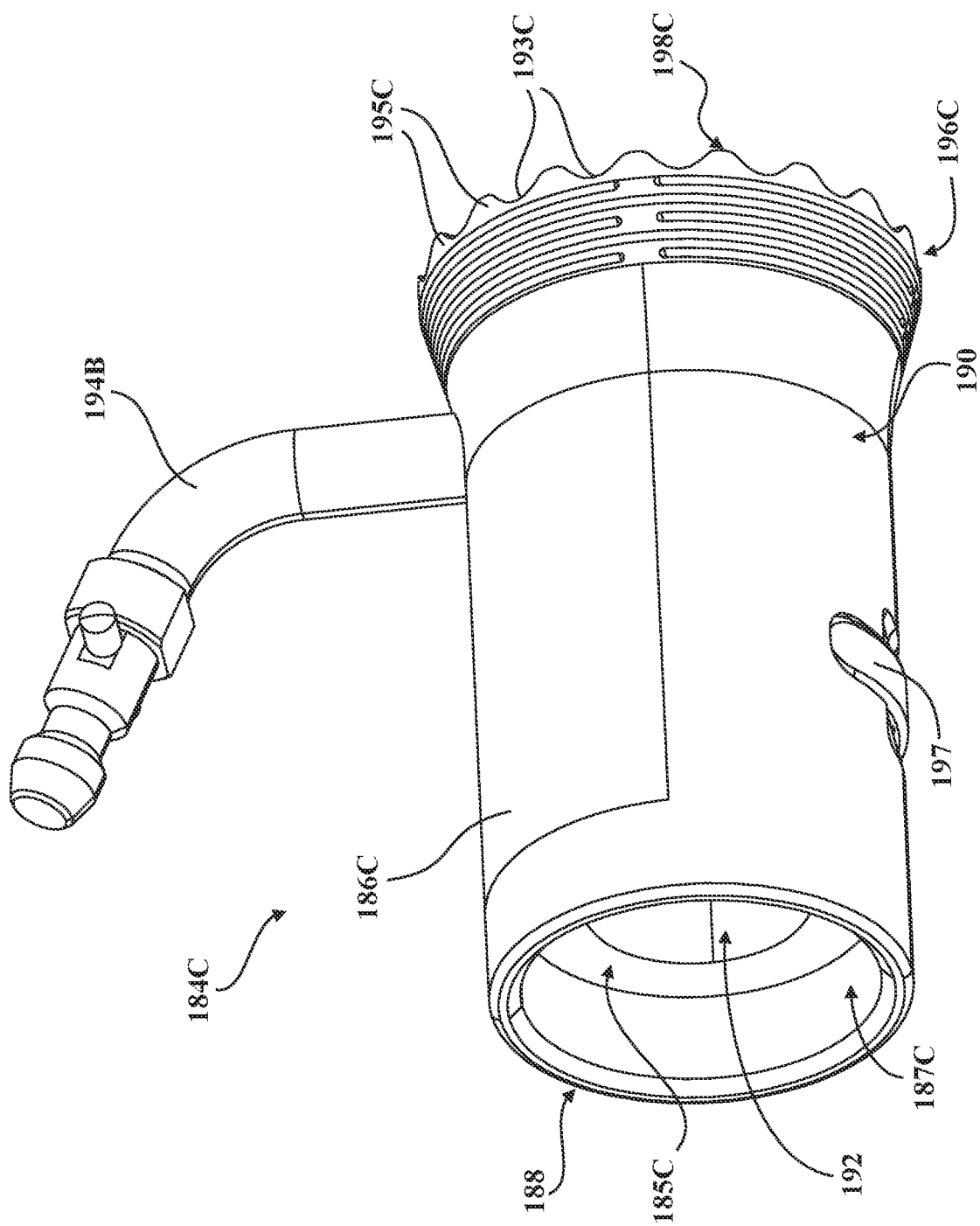
FIG. 15 is a front perspective view of the third exemplary configuration of the rotational adapter of FIG. 14.

Referring to FIGS. 12 and 13, another exemplary configuration of an adapter 184B for coupling an instrument tracker 132 to one or more types of surgical instruments 106 is illustrated. It should be understood, that components of the adapter 184B including the same references number and/or base reference number may comprise the same characteristics and/or function in the same manner as the adapter 184A described above. Similar to the adapter 184A described above, the adapter 184B illustrated in FIGS. 12 and 13 generally includes a base 186B having a distal end 188 and an opposing proximal end 190. The base 186B may also define an aperture 192 that extends through the adapter 184B and is configured to receive a portion of one of exemplary end effectors 202, 302 described above. For example, the surgical instrument 106 comprises an end effector 202, 302 including a shaft 204, 304 extending between a distal portion 208, 308 for manipulating tissue and proximal portion 206, 306 defining a retainer 214, 314 for removably attaching the end effector 202, 302 to the surgical handpiece 108. The end effector 202, 302 also includes a stop 210, 310 arranged between the proximal portion 206, 306 and the distal portion 208, 308 of the shaft 204, 304. The aperture in the base 186B of the adapter 184A is defined to receive the shaft 204, 304 of the proximal portion of the end effector 202, 302. The adapter 184B may also include a mount 194B coupled to the base for releasably securing the tracker to the adapter. An exemplary configuration of a mount 194B for coupling an instrument tracker 132 to a surgical instrument is illustrated and described in U.S. Pat. No. 10,537,395, entitled "Navigation tracker with kinematic connector assembly," the disclosure of which is hereby incorporated by reference in its entirety A biasing element 196B disposed on the base 186B of the adapter 184B includes an abutment interface 198B for engaging the surgical handpiece 108 and is configured to urge the base 186B away from the surgical handpiece 108. The biasing element 196B is compressed in response to attachment of the retainer 214, 314 to the surgical handpiece 108 with abutment occurring between the base 186A and the stop 210, 310 of the end effector 202, 302 to limit movement of the adapter 184A relative to the end effector 202, 302. While the base 186A of the adapter 184A described above may comprise base 186A having a generally square or rectangular shaped cross-section as viewed perpendicular to the longitudinal axis of the aperture 192, the adapter 184B illustrated in FIGS. 12 and 13 comprises a base 186B defining a generally circular shaped cross-section as viewed perpendicular to the longitudinal axis of the aperture 192. The cross-sectional shapes of the base 186A, 186B of the adapter(s) 184A, 184B illustrated in FIGS. 2-13 are only intended to be exemplary, and it should be understood that additional shapes and/or configurations of the adapter(s) 184A, 184B are contemplated herein.

The biasing element 196B may extend from at least one of the distal end 188 or the proximal end 190 of the base 186B. In the representative embodiments illustrated herein, the biasing element 196B is shown extending from the proximal end 190 of the base 186A. However, it is also contemplated that the biasing element 196B may also extend from the distal end 188 of the base 186B, and/or that one biasing element 196B could extend from the distal end 188 of the base 186B while another biasing element 196B could extend from the proximal end 190 of the base 186B. Other configurations are contemplated. The biasing element 196B may comprise a spring, wire coil, or similar mechanism capable of storing potential energy that can be used to provide a biasing force when compressed and operate in the same fashion as is described above. The biasing element 196B may also comprise or otherwise define an abutment interface 198B. The abutment interface 198B may be realized as a thicker or reinforced portion of the biasing element 196A. The abutment interface 198B is the portion of biasing element 196B that is furthest from the base 186B. As illustrated in the figures, when the biasing element 196B extend from the proximal end 190 of the base 186B, the abutment interface 198B is configured to engage the surgical instrument 106. However, in the configuration described above where the biasing element 196B may extend from the distal end 188 of the base 186B, the abutment interface 198B would be configured to engage a stop 210, 310 on the end effector, which will be described in greater detail below.

The adapter 184B may also comprise the mount 194 extending from the base 186B. The mount 194B may comprise a coupler, such as a quick connect adapter, configured to removably couple the instrument tracker 132 to the adapter 184B. An exemplary coupler of the mount 194B is described in U.S. Pat. No. 7,725,162, entitled "Surgery System," previously referenced. In some versions, the coupler may comprise a threaded, a quarter turn, a snap fit, or similar connector for removably coupling the instrument tracker 132 to the adapter 184B. While not described in detail herein, in some embodiments, the mount 194B or another portion of the adapter 184B may comprise or otherwise be realized as a coupler similar to as is described in U.S. Pat. No. 7,725,162, entitled "Surgery System," previously referenced. Other configurations are contemplated.

Any remaining or undescribed features of the adapter 184B illustrated in FIGS. 12 and 13 may include any and/or all characteristics and/or features of the adapter 184A described above and referenced in FIGS. 1-11B.

Referring to FIGS. 14 to 19B, another exemplary configuration of an adapter 184C for coupling an instrument tracker 132 to one or more types of surgical instruments 106 is illustrated. It should be understood, that components of the adapter 184C including the same references number and/or base reference number may comprise the same characteristics and/or function in the same manner as either of the adapter(s) 184A, 184B described above. Similar to the adapter 184A, 184B described above, the adapter 184C illustrated in FIGS. 14 to 19B may generally include a base 186C having a distal end 188 and an opposing proximal end 190. The base 186C may also define an aperture 192 that extends through the adapter 184C and is configured to receive a portion of one of exemplary end effectors 202, 302 described above. For example, the surgical instrument 106 comprises an end effector 202, 302 including a shaft 204, 304 extending between a distal portion 208, 308 for manipulating tissue and proximal portion 206, 306 defining a retainer 214, 314 for removably attaching the end effector 202, 302 to the surgical handpiece 108. The end effector 202, 302 also includes a stop 210, 310 arranged between the proximal portion 206, 306 and the distal portion 208, 308 of the shaft 204, 304. The aperture in the base 186B of the adapter 184C is defined to receive the shaft 204, 304 of the proximal portion of the end effector 202, 302. The adapter 184C may also include a mount 194B coupled to the base for releasably securing the instrument tracker 132 to the adapter 184C.

The distal end 188 of the base 186C maybe formed to define an abutment surface 185C. The abutment surface 185C may be configured to abut the stop 210, 310 of the end effector 202, 302. The distal end 188 of the base 186C maybe also be formed to further define a projection 187C extending from the abutment surface 185C. The projection 187C may comprise an annular ring that extends from the abutment surface 185C and further extends the aperture 192 defined by the base 186C. The portion of the aperture 192 defined by the projection 187C may have a larger diameter than the diameter of the portion of the aperture 192 defined by the base 186C. Furthermore, the portion of the aperture 192 defined by the projection 187C may have an inner diameter that is larger than the outermost diameter of the stop 210, 310 of the end effector 202, 302. This may allow the projection 187C to extend over at least a portion of the stop 210, 310 of the end effector 202, 302 when the adapter 184C is coupled to the end effector 202, 302.

Referring to 14 to 16B, the adapter 184C may also include a biasing element 196C disposed on the base 186AC of the adapter 184C. The biasing element 196C may include an abutment interface 198C for engaging the surgical handpiece 108 and is configured to urge the base 186C away from the surgical handpiece 108. The biasing element 196C is compressed in response to attachment of the retainer 214, 314 to the surgical handpiece 108 with abutment occurring between the base 186C and the stop 210, 310 of the end effector 202, 302 to limit movement of the adapter 184C relative to the end effector 202, 302. As illustrated in FIGS. 14 to 16B, the adapter 184C may comprises a base 186C defining a generally circular shaped cross-section as viewed perpendicular to the longitudinal axis of the aperture 192. However, it should be understood that additional shapes and/or configurations of the adapter(s) 184A, 184B, 184C are contemplated herein.

The biasing element 196C may extend from at least one of the distal end 188 or the proximal end 190 of the base 186C. In the representative embodiments illustrated herein, the biasing element 196C is shown extending from the proximal end 190 of the base 186C. However, it is also contemplated that the biasing element 196C may also extend from the distal end 188 of the base 186C, and/or that one biasing element 196C could extend from the distal end 188 of the base 186C while another biasing element 196C could extend from the proximal end 190 of the base 186C. Other configurations are contemplated. The biasing element 196C may comprise a spring, wire coil, or similar mechanism capable of storing potential energy that can be used to provide a biasing force when compressed and operate in the same fashion as is described above. The biasing element 196C may also comprise or otherwise define an abutment interface 198B. The abutment interface 198C may be realized as a thicker or reinforced portion of the biasing element 196C. The abutment interface 198C is the portion of biasing element 196C that is furthest from the base 186C. As illustrated in the figures, when the biasing element 196C extend from the proximal end 190 of the base 186C, the abutment interface 198C is configured to engage the surgical instrument 106. However, in the configuration described above where the biasing element 196C may extend from the distal end 188 of the base 186C, the abutment interface 198C would be configured to engage a stop 210, 310 on the end effector, which will be described in greater detail below.

Figure 16A:
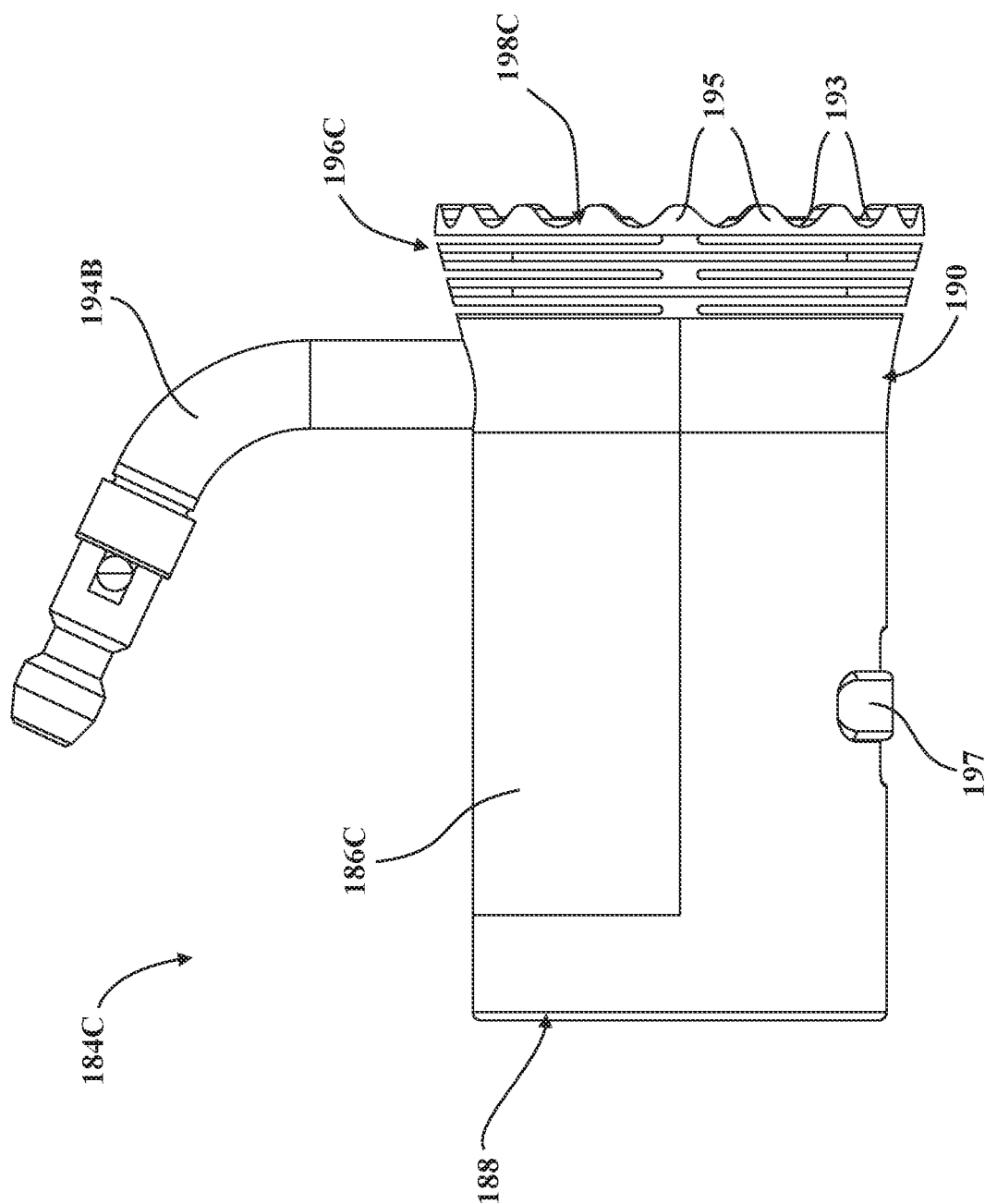
FIG. 16A is a side perspective view of the third exemplary configuration of the rotational adapter of FIGS. 14 and 15.

The abutment interface 198C of the biasing element 196C may further comprise one or more protrusions 195C. The protrusion(s) 195C may extend distally or away from the base 186C in a direction that is generally perpendicular to the surface of the abutment interface 198C. The protrusions 195C may be spaced about the abutment interface 198C creating an alternating pattern of the protrusions 195C and a recess 193C as you move annularly around the surface of the abutment interface 198C of the biasing element 196C. For example, as illustrated in FIGS. 16A and 16B, the protrusions 195C extend distally from the surface of the abutment interface 198C relative to the base 186C of the adapter. While the biasing element is illustrated as extending from the proximal end 190 of the base 186C, as described above, and is configured to engage the surgical handpiece 108. Here too, it is also contemplated that the biasing element 196C may extend from the distal end 188 of the base 186C and be configured to engage the stop 210, 310 of the end effector 202, 302. In such a configuration, the biasing element 196C, including the abutment interface 198C and/or protrusions 195C and recesses 193C, may be size to engage and/or interact with the stop 210, 310 of the end effector 202, 302.

Figure 17:
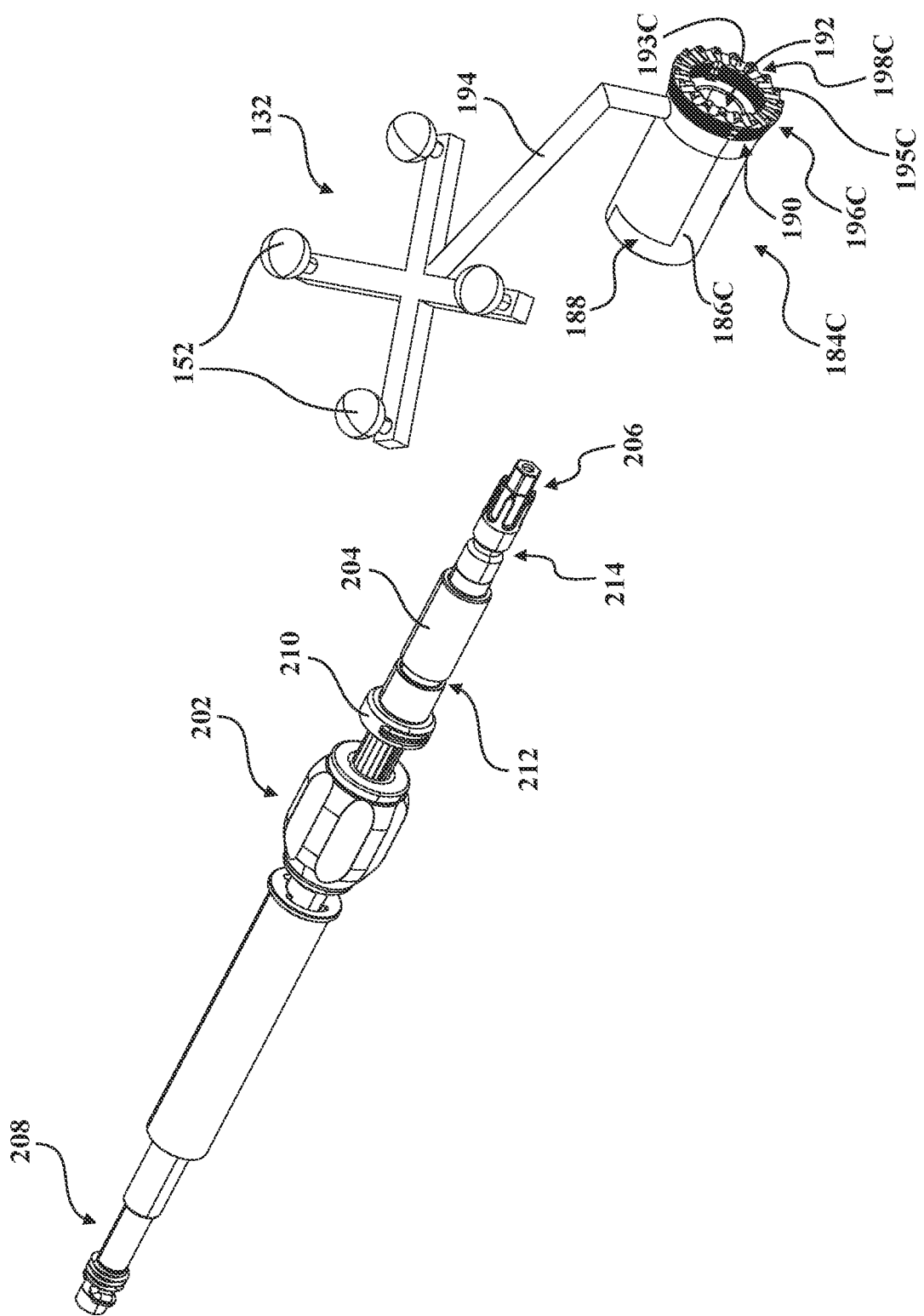
FIG. 17 is a partially-exploded perspective view of an end effector and the third configuration of the rotation adapter of FIGS. 14-16B.
Figure 18A:
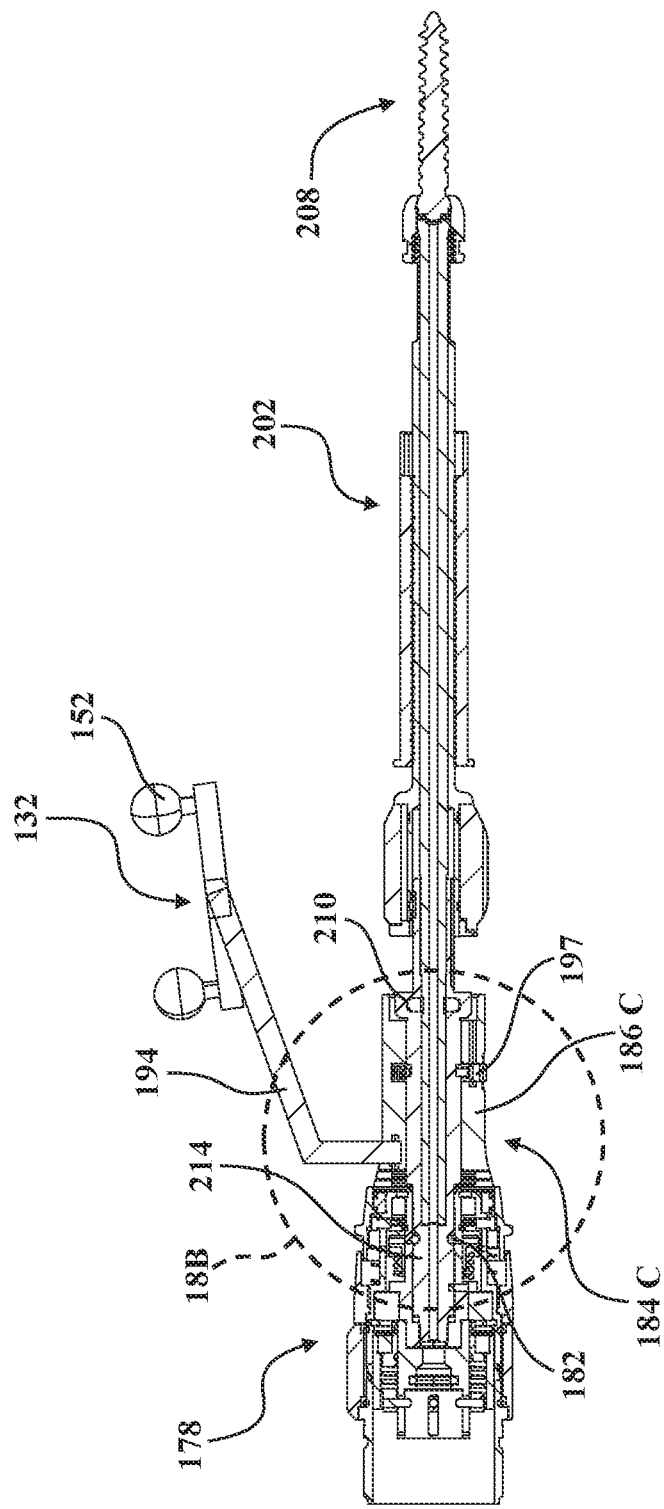
FIG. 18A is a sectional view of the third configuration of the rotational adapter of FIGS. 14-17 supporting a tracker and coupled to an end effector of a surgical instrument.
Figure 18B:
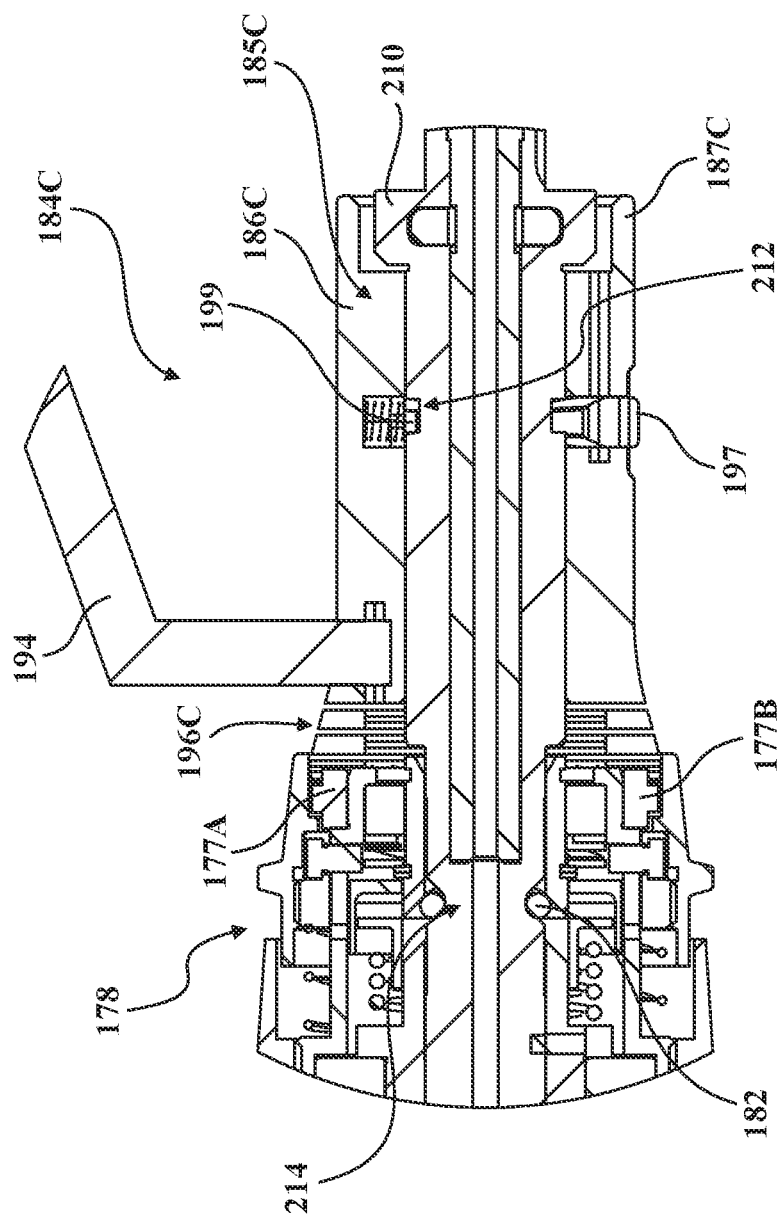
FIG. 18B is a partial sectional view of the third configuration of the rotational adapter of FIGS. 14-17 supporting a tracker and coupled to an end effector of a surgical instrument.

FIGS. 17 to 18B illustrate the adapter 184C for use with and/or coupled to an end effector 202, such as the end effector(s) 202, 302 shown and described above. The end effector 202 may include, define, or otherwise utilize components, structural features, and the like that are substantially similar (or even identical) to those described above in connection with the end effector 202, 302 (see FIGS. 2-4 and 6A-7B). For example, the end effector 202 may include a distal portion 208 for driving a surgical implant or for touching off on a one or more locations as part of a calibration procedure, and a proximal portion 206 defining a retainer 214 for removably attaching the end effector 202 to the surgical handpiece 108. Here too, it will be appreciated that the retainer 214 of the end effector 202 may have the similar characteristics and/or functionality as the retainer 214, 314 of the end effector 202, 302 described above. For example, in operation, the retainer 214 of the end effector 202 may be utilized to removably couple the end effector 202 to the surgical instrument 106. While the adapter 184C is only shown with one end effector 202, it is contemplated that the adapter 184C may be configured to be coupled to any number of end effectors 202, 302, as described above with regard to adapter 184A, 184B.

FIGS. 18A and 18B illustrate a partial sectional view of the end effector 202, including the adapter 184C, coupled to the receiver 178 of the of the surgical handpiece 108. As described above, the adapter 184C is coupled to the end effector 202, 302 by sliding the adapter 184C onto the proximal portion of the end effector 202, 302. The detent 199 of the coupler 197 on the adapter 184C is seated in the recess 212, 312 defined in the shaft 204, 304 of the end effector 202, 302 to secure the adapter 184C to the end effector 202, 302. Prior to attaching the end effector 202, 302 to the surgical handpiece 108, the end effector 202, 302 and adapter 184C are configured such that the adapter 184C may spin freely about the shaft 204, 304 of the end effector 202, 302.

The end effector 202, 302 may then be attached to the surgical handpiece 108 by inserting the proximal portion 206, 306 of the end effector 202, 302 into the receiver 178 to engage the coupling mechanism 180 of the receiver 178 with the retainer 214, 314 of the end effector 202, 302. As proximal portion 206, 306 of the end effector 202, 302 is inserted into the receiver 178, the abutment interface 198C defined by the biasing element 196C will engage the receiver 178, with the biasing element 196C urging the adapter 184C away from the receiver 178 and causing the adapter 184C to abut the stop 210, 310 of the end effector 202, 302. Once the adapter 184C abuts the stop 210, 310, the biasing element 196C compresses as the proximal portion 206, 306 of the end effector 202, 302 is inserted further into the receiver 178 until the coupling mechanism 180 engages the retainer 214, 314, thereby securing the end effector 202, 302 to the surgical handpiece 108.

As described above, when the biasing element 196A is compressed by the receiver 178 urging the adapter against the stop 210, 310, a predetermined amount of friction will be generated between the receiver 178 and the biasing element 196C, as well as between the base 186C of the adapter 184C and the stop 210, 310. The adapter 184C, including the base 186 and the biasing element 196C, may be configured such that the predetermined amount of friction generated by compressing the biasing element 196C is great enough to limit free rotation (and/or even prevent free rotation) of the adapter 184C relative to the surgical handpiece 108. Upon detaching the end effector 202, 302 from the surgical handpiece 108, the biasing element 196C decompresses, and the adapter 184C will once again be able to spin freely about the shaft 204, 304 of the end effector 202, 302.

Referring to FIGS. 18A to 19B, it is contemplated that the receiver 178 of the surgical handpiece 108 may further comprise a detent 177A, 177B. The detent 177A, 177B may be positioned and/or oriented on the receiver 178 of the surgical handpiece 108 to engage the abutment interface 198C of the biasing element 196C of the adapter 184C. More specifically, the detent 177A, 177B may be positioned and/or oriented on the receiver 178 to engage the protrusions 195C and recesses 193C of the abutment interface 198C. The receiver 178 may be configured to include a single detent or a plurality of detents 177A, 177B spaced about the receiver and configured to engage the abutment interface 198C of the adapter 184C. For example, as illustrated in FIG. 18B, the receiver 178 comprises a first detent 177A and a second detent 177B, which may be disposed on opposing sides of the receiver 178. While not illustrated in the figures, it is further contemplated that the receiver 178 may including a plurality of detents 177 spaced about the receiver.

Figure 19A:
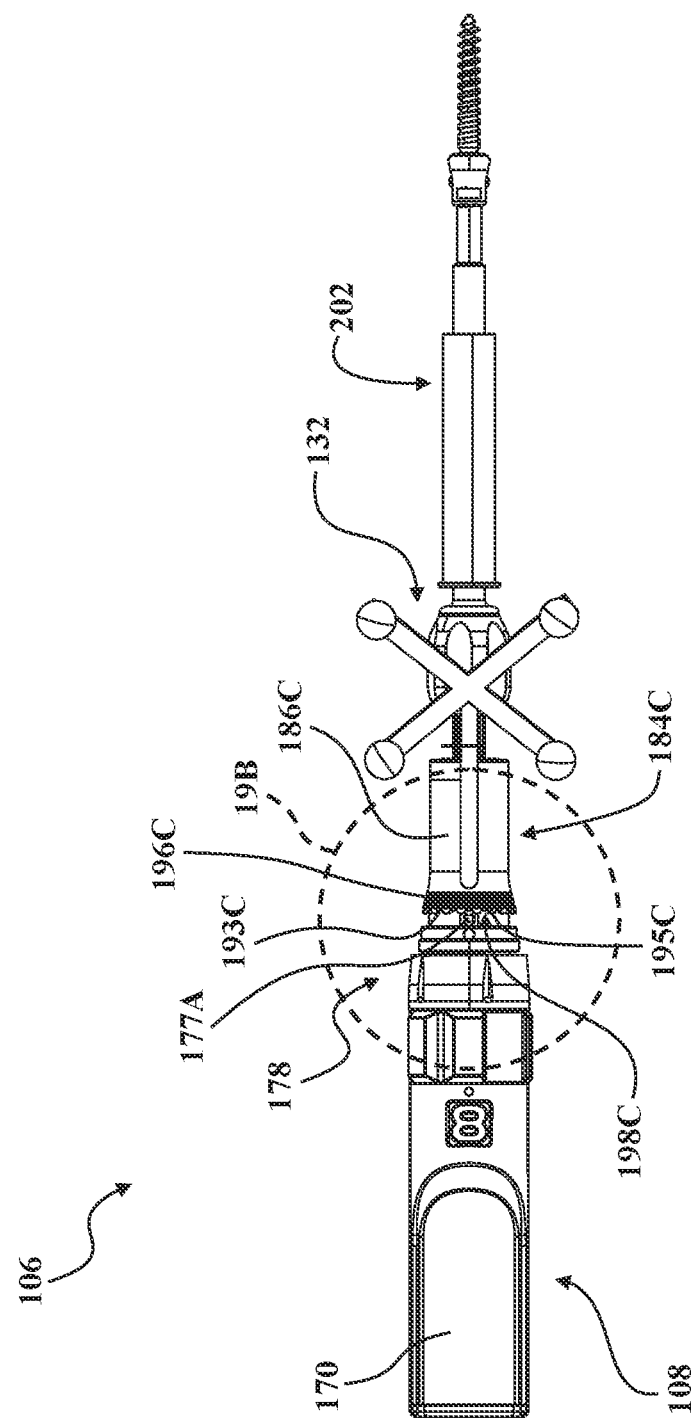
FIG. 19A is a top view of the third configuration of the rotational adapter of FIGS. 14-17 supporting a tracker and coupled to an end effector of a surgical instrument, a portion of the receiver of the surgical instrument is hidden to illustrate the interaction between the rotational adapter and the receiver of the surgical instrument.
Figure 19B:
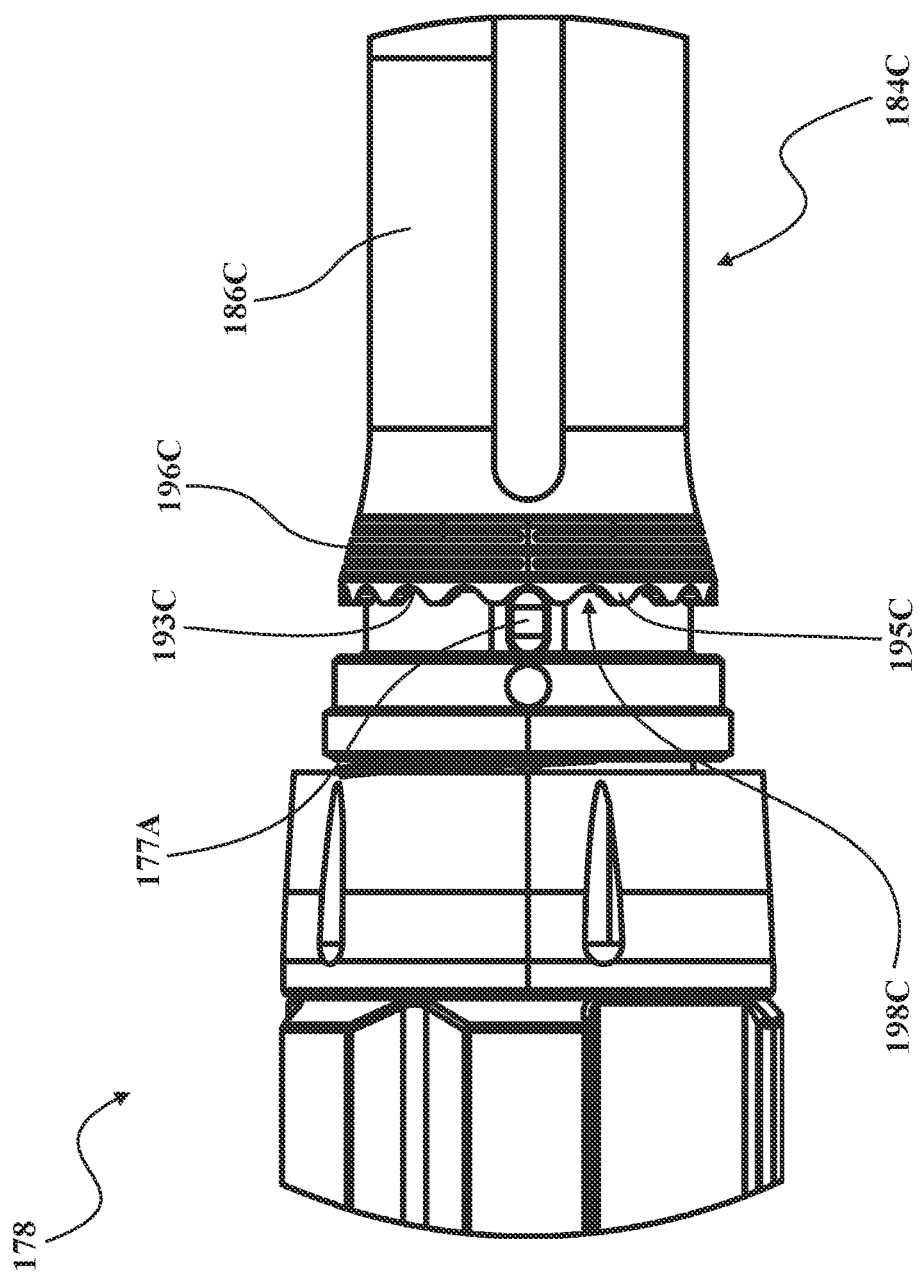
FIG. 19B is an enhanced top view of FIG. 19A illustrating the third configuration of the rotational adapter of FIGS. 14-17 supporting a tracker and coupled to an end effector of a surgical instrument, a portion of the receiver of the surgical instrument is hidden to illustrate the interaction between the rotational adapter and the receiver of the surgical instrument.

As illustrated in FIG. 19B, the detent 177 may comprise a generally oval or rounded shape that may be wedged into the recess(es) 193C and/or between two adjacent protrusions 195C defined by the abutment interface 198C. While not illustrated in the figures, it is further contemplated that the detent 177 may have a generally triangular shape or similar pointed/rounded shape that allows for the detent 177 to be inserted and/or wedged into the recess(es) 193C and/or between two adjacent protrusions 195C defined by the abutment interface 198C.

In operation, the adapter 184C including the abutment interface 198C defining the protrusions 195C and recesses 193C is coupled to the end effector 202, 302 by sliding the adapter 184C onto the proximal portion of the end effector 202, 302 in the same manner as described above. The detent 199 of the coupler 197 on the adapter 184C is seated in the recess 212, 312 defined in the shaft 204, 304 of the end effector 202, 302 to secure the adapter 184C to the end effector 202, 302. Prior to attaching the end effector 202, 302 to the surgical handpiece 108, the end effector 202, 302 and adapter 184C are configured such that the adapter 184C may spin freely about the shaft 204, 304 of the end effector 202, 302. The end effector 202, 302 may then be attached to the surgical handpiece 108 by inserting the proximal portion 206, 306 of the end effector 202, 302 into the receiver 178 to engage the coupling mechanism 180 of the receiver 178 with the retainer 214, 314 of the end effector 202, 302, as illustrated in FIGS. 18A and 18B.

As proximal portion 206, 306 of the end effector 202, 302 is inserted into the receiver 178, the abutment interface 198C, including the protrusions 195C and recesses 193C, defined by the biasing element 196C will engage the receiver 178. More specifically, the protrusions 195C and recesses 193C may be configured to engage the detent 177A, 177B, as illustrated in FIGS. 19A and 19B. As the biasing element 196C urges the adapter 184C away from the receiver 178, the base 186C of the adapter 184C, such as the abutment surface 185C, will abut the stop 210, 310 of the end effector 202, 302. Once the abutment surface 185C engages the stop 210, 310, as the end effector 202, 302 is inserted further into the receiver 178 to engage the coupling mechanism 180 of the receiver 178 with the retainer 214, 314 of the end effector 202, 302, the abutment interface 198C of the biasing element 196C will be urged toward the detent 177A, 177B. As the abutment interface 198C, including the protrusions 195C and recesses 193C, engages the detent 177A, 177B, the biasing element 196C will be compressed creating a biasing force urging the base 186C and the abutment interface 198C away from one another causing a force to be exerted on the detent 177A, 177B by the abutment interface 198C. The shape of the protrusions 195C and recesses 193C of the abutment interface 198C and the force created by the biasing element 196C in combination with the shape and positioning of the detent 177A, 177B on the receiver 178, the detent 177A, 177B will be wedged into the recess 193C defined by between two adjacent protrusions 195C, as illustrated in FIG. 19B. The force of the biasing element urging the abutment interface 198C toward the detent 177A, 177B should be sufficient to prevent the detent 177A, 177B from becoming dislodged from within the recess 193C, and allowing the adapter 184C to be rotated relative to the receiver absent a force being applied to the adapter 184C to rotate it relative to the receiver 178.

Furthermore, the force of the biasing element 196C urging the abutment interface 198C toward the detent 177A, 177B should not be so great that the adapter 184C cannot be rotated by the application of additional force to by the user to rotate the adapter. When the user wants to rotate the adapter 184C relative to the receiver 178, the user may apply a force to the adapter 184C. As the user applies the force, the detent 177A, 177B will slide along the abutment interface 198C. As the detent 177A, 177B slides along the abutment interface 198C, the detent 177A, 177B will engage one of the adjacent protrusions 195C. The force applied by the user will cause the abutment interface 198C to overcome the biasing force of the biasing element 196C, causing the biasing element 196C to compress further as the detent travels over the adjacent protrusion 195C, and moves to the next recess 193C. The combination of the abutment interface 198C including the protrusions 195C and recesses 193C and the detent 177A, 177B are intended to create a rachet-like mechanism that prevents the adapter 184C from freely rotating about the shaft of the end effector 202, 302 when the end effector 202, 302 is coupled to the receiver 178 surgical handpiece 108 without the application of additional force to the adapter 184C by the user, while still allowing the adapter 184C to be rotated or repositioned about the shaft of the end effector 202, 302 relative to the receiver 178 by the user when as needed to avoid the instrument tracker 132 from being out of view of the navigation system 102.

It should be understood that any and/or all of various features of the various configurations of the adapter 184A, 184B, 184C described above may be re-arranged and/or selectively incorporated with the features of any of the other adapter 184A, 184B, 184C.

Clauses directed to alternative configurations:

I. A surgical instrument assembly for removably coupling a tracker to a surgical handpiece, the surgical instrument assembly comprising:
    an end effector including:
        a shaft extending between a distal portion for manipulating tissue and proximal portion defining a retainer for removably attaching the end effector to the surgical handpiece; and
        a stop arranged between the proximal portion and the distal portion; and an adapter including:
        a base defining a proximal end and opposing distal end with the distal end arranged to abut the stop of the end effector;
        an aperture defined extending through base to receive the shaft of the end effector therethrough;
        a mount coupled to the base for releasably securing the tracker to the adapter; and
        a biasing element extends from one of the proximal end and the distal end of the base to an abutment interface arranged for engaging the surgical handpiece, with the biasing element configured to compress in response to attachment of the retainer to the surgical handpiece with abutment occurring between the distal end of the base and the stop of the end effector to limit movement of the adapter relative to the end effector.

II. The surgical instrument assembly of clause I, wherein the stop is spaced a defined distance from the retainer.

III. The surgical instrument assembly of clause I or II, wherein the biasing element extends from the proximal end and is configured to urge the base away from the surgical handpiece.

IV. The surgical instrument assembly of any one of clauses I to III, wherein retainer and the stop of the end effector are spaced along the shaft of the end effector such that the surgical handpiece engages the biasing element of the adapter and the stop engages the base of the adapter in response to coupling the end effector to the surgical handpiece with the biasing element urging the base against the stop creating a friction force between the adapter, the stop, and the surgical handpiece to limit free rotation of the base relative to the surgical handpiece in absence of an applied external force.

V. The surgical instrument assembly of any one of clauses I to IV, wherein the base further comprises a coupler configured to removably secure the adapter to the proximal portion of the shaft of the end effector.

VI. The surgical instrument assembly of clause V, wherein the coupler comprises a detent configured to selectively engage a recess defined in an outer surface of the shaft of the end effector to removably secure the adapter to the end effector.

VII. The surgical instrument assembly of clause V, wherein the coupler for removably securing the adapter to the shaft of the end effector is arranged to permit rotation of the end effector relative to the base.

VIII. The surgical instrument assembly of any one of clauses I to VII, wherein the biasing element defines an element aperture positioned relative to the aperture of the base to define a continuous aperture through the adapter configured to receive the proximal portion of the shaft.

IX. The surgical instrument assembly of clause VIII, wherein the element aperture of the biasing element comprises a first diameter; and wherein the aperture defined by the base comprises a second diameter smaller than the first diameter.

X. The surgical instrument assembly of any one of clauses I to IX, wherein the biasing element applies a compressive force between the base and the surgical instrument when the adapter is coupled to the end effector with the abutment interface of the biasing element engaging the surgical handpiece.

XI. The surgical instrument assembly of any one of clauses I to XI, wherein the abutment interface comprises one or more protrusions configured to mate with a reciprocal feature on the surgical handpiece when the adapter is coupled to the end effector.

XII. The surgical instrument assembly of any one of clauses I to XI, wherein the base is axially movable relative to the stop of the end effector between:
  an engaged position where the abutment interface of the biasing element engages the surgical handpiece, with the biasing element compressed to create a frictional force between the base of the adapter and the stop of the end effector to limit free rotation of the base relative to the surgical handpiece in an absence of an applied external force; and
  a free position where the abutment interface disengages the surgical handpiece, with the biasing element decompressed to permit free rotation of the base relative to the stop.

XIII. The surgical instrument assembly of any one of clauses I to XII, wherein the biasing element comprises a spring.

XIV. The surgical instrument assembly of any one of clauses I to XII, wherein the biasing element comprises a spring defined by a plurality of wave elements including a distal wave element and a proximal wave element;
  wherein the distal wave element comprises a first thickness, and the proximal wave element comprises a second thickness larger than the first thickness.

XV. The surgical instrument assembly of clause XIV, wherein the proximal wave element defines the abutment interface of the biasing element.

XVI. The surgical instrument assembly of any one of clauses I to XII, wherein the biasing element comprises a compressive material including a plurality of slits.

XVII. The surgical instrument assembly of any one of clauses I to XVI, further comprising a calibration body having a known length and identifiable by a surgical navigation system; and
  wherein the calibration body defines an adapter interface configured to removably secure the adapter to the calibration body.

XVIII. The surgical instrument assembly of clause XVII, wherein the adapter interface of the calibration body includes a calibration stop.

XIX. The surgical instrument assembly of clause XVII, wherein the aperture formed through the adapter is configured to receive the calibration interface of the calibration body; and
  wherein the calibration interface defines a calibration retainer configured to couple the distal end of the adapter adjacent the calibration stop to position the adapter at a known distance from a distal end of the calibration body.

XX. The surgical instrument assembly of clause XVII, wherein the end effector is a first end effector and comprises a twist drill, and the assembly further comprising a second end effector, the second end effector being a screwdriver.

XXI. The surgical instrument assembly of clause XX, wherein the first end effector, the second effector, and the calibration body have the same length.

XXII. The surgical instrument assembly of any one of clauses I to XXI, wherein the abutment interface comprises one or more protrusions arranged for engaging a detent on the surgical handpiece.

XXIII. An adapter for use with an end effector including a stop and a retainer for coupling the end effector to a surgical handpiece, the adapter comprising:
  a base comprising a proximal end and opposing distal end;
  a biasing element to urge the base away from the surgical handpiece, the biasing element extending from the proximal end of the base and defining an abutment interface arranged for engaging the surgical handpiece;
  a mount coupled to the base for releasably securing a tracker to the adapter; and
  a coupler disposed on the base and configured to removably secure the adapter to the end effector such that the end effector can rotate relative to the base and the biasing element;
  wherein the biasing element is configured to compress in response to attachment of the retainer to the surgical handpiece with abutment occurring between the distal end of the base and the stop of the end effector to limit movement of the adapter relative to the end effector.

XXIV. The adapter of clause XXIII, wherein compression of the biasing element creates a friction force between the adapter, the stop, and the surgical handpiece to limit free rotation of the base relative to the stop of the end effector in absence of an applied external force.

XXV. The adapter of clause XXIII or XIV, wherein the base and the biasing element define an aperture configured to receive a portion of the end effector.

XXVI. The adapter of any one of clauses XXIII to XXV, further comprising a tracker configured for removable attachment to the mount.

XXVII. The adapter of any one of clauses XXIII to XXVI, wherein the coupler is configured to removably secure the base to one of a first end effector and a second end effector.

XXVIII. The adapter of any one of clauses XXIII to XXVII, wherein the biasing element comprises a spring.

XXIX. The adapter of any one of clauses XXIII to XXVIII, wherein the biasing element comprises a spring defined by a plurality of wave elements including a distal wave element and a proximal wave element;
wherein the distal wave element comprises a first thickness and the proximal wave element comprises a second thickness larger than the first thickness.

XXX. The adapter of clause XXIX, wherein the proximal wave element defines the abutment interface of the biasing element.

XXXI. The adapter of any one of clauses XXIII to XXVII, wherein the biasing element comprises a compressive material including a plurality of slits.

XXXII. The adapter of any one of clauses XXIII to XXXI, wherein the abutment interface comprises one or more protrusions arranged for engaging a detent on the surgical handpiece.

XXXIII. A surgical instrument tracking system for use with a surgical handpiece, the surgical instrument tracking system comprising:
a first end effector including:
a first shaft extending between a distal portion for manipulating tissue and a proximal portion defining a first retainer for removably attaching the first end effector to the surgical handpiece; and
a first stop arranged between the proximal portion and the distal portion of the first end effector;
a second end effector including:
a second shaft extending between a distal portion and a proximal portion defining a second retainer for removably attaching the second end effector to the surgical handpiece; and
a second stop arranged between the proximal portion and the distal portion of the second end effector; and
an adapter configured to removably couple to one of the first end effector and the second end effector, the adapter including:
a base comprising a proximal end and opposing distal end;
a coupler disposed on the base and configured to removably coupled the adapter to the proximal portion of one of the first end effector or the second end effector; and
a biasing element to urge the base away from the surgical handpiece, the biasing element extending from the proximal end of the base and defining an abutment interface arranged for engaging the surgical handpiece;
wherein the biasing element is configured to compress in response to attachment of one of the first retainer or the second retainer to the surgical handpiece with abutment occurring between the distal end of the base and the first stop of the first end effector or the second stop of the second end effector to limit movement of the adapter relative to the first or second stop.

XXXIV. The surgical instrument tracking system of clause XXXIII, wherein the first retainer of the first end effector is configured such that the surgical handpiece will engage the abutment interface of the biasing element when the first end effector is coupled to the surgical handpiece causing the biasing element to urge the base against the first stop to position the adapter at a first known distance from the distal portion of the first end effector; and
wherein the second retainer of the second end effector is configured such that the surgical handpiece will engage the abutment interface of the biasing element of the adapter when the second end effector is coupled to the surgical handpiece causing the biasing element to urge the base against the second stop to position the adapter at a second known distance from the distal portion of the second end effector.

XXXV. The surgical instrument tracking system of clause XXXIII or XXIV, wherein the first stop is disposed on the first shaft at a defined distance from the first retainer; and
wherein the second stop is disposed on the second shaft at defined distance from the second retainer.

XXXVI. The surgical instrument tracking system of any one of clauses XXXIII to XXXV, wherein the biasing element comprises a spring.

XXXVII. The surgical instrument tracking system of any one of clauses XXXIII to XXXVI, wherein the biasing element comprises a spring defined by a plurality of wave elements including a distal wave element and a proximal wave element;
wherein the distal wave element comprises a first thickness and the proximal wave element comprises a second thickness larger than the first thickness.

XXXVIII. The surgical instrument tracking system of clause XXXVII, wherein the proximal wave element defines the abutment interface of the biasing element.

XXXIX. The surgical instrument tracking system of any one of clauses XXXIII to XXXV, wherein the biasing element comprises a compressive material including a plurality of slits.

XL. The surgical instrument tracking system of any one of clauses XXXIII to XXXIX, wherein the first retainer and the first stop of the first end effector are spaced along the first shaft such that the biasing element is compressed a first distance when the first end effector is coupled to the surgical handpiece; and
wherein the second retainer and the second stop of the second end effector are spaced along the second shaft such that the biasing element is compressed a second distance when the first end effector is coupled to the surgical handpiece.

XLI. The surgical instrument tracking system of clause XL, wherein the first distance is greater than the second distance.

XLII. The surgical instrument tracking system of clause XL, wherein the second distance is greater than the first distance.

XLIII. The surgical instrument tracking system of clause XL, wherein the first distance is equal to the second distance.

XLIV. The surgical instrument tracking system of any one of clauses XXXIII to XLIII, wherein the first end effector comprises a twist drill and the second end effector comprises a screwdriver.

XLV. The surgical instrument tracking system of any one of clauses XXXIII to XLIV, wherein the abutment interface comprises one or more protrusions arranged for engaging a detent on the surgical handpiece.

XLVI. A method of calibrating an adapter with a navigation system, the method comprising:
coupling an adapter including a tracker to a calibration body;
observing the calibration body with a surgical navigation system while the tracker is in view of the surgical navigation system to calibrate a position of tracker relative to the adapter;
removing the adapter from the calibration body;
coupling the adapter, including the tracker, to an end effector; and
coupling the end effector to a surgical handpiece causing a biasing element of the adapter to compress and urge the adapter away from the surgical handpiece and toward a stop of the end effector and creating a frictional force limiting rotational movement of the adapter relative to the end effector.

XLVII. The method of clause XLVI, wherein coupling the end effector to a surgical handpiece causes the biasing element to position the adapter adjacent the stop of the end effector so that the tracker of the adapter is positioned at a known position relative to a distal tip of the end effector.

XLVIII. The method of clause XLVI or XLVII, further comprising identifying the pose of the end effector based on the calibrated position of the tracker relative to the adapter and a known position of the adapter relative to the end effector.

XLIX. The method of clause XLVIII, further comprising applying and external force to the adapter to rotate the tracker about the end effector so that the tracker remains in view of the surgical navigation system.

L. The method of any one of clauses XLVI to XLIX, wherein the biasing element of the adapter comprises an abutment interface including one or more protrusions arranged for engaging a detent on the surgical handpiece, the one or more protrusions and the detent creating a frictional force limiting rotational movement of the adapter relative to the end effector; and
further comprising applying and external force to the adapter to rotate the tracker about the end effector so that the tracker remains in view of the surgical navigation system.

LI. A surgical instrument assembly for navigating a surgical end effector, the surgical instrument assembly comprising:
a surgical handpiece;
an end effector comprising:
a shaft extending between a distal portion for manipulating tissue and a proximal portion defining a retainer for removably attaching the end effector to a surgical handpiece; and
a stop arranged between the proximal portion and the distal portion;
an adapter including:
a base defining a distal end and an opposing proximal end with the distal end arranged to abut the stop of the end effector;
an aperture defined extending through base to receive the shaft of the end effector therethrough; and
a biasing element to urge the base away from the surgical handpiece, the biasing element extending from the proximal end of the base to an abutment interface arranged for engaging the surgical handpiece;
wherein the surgical handpiece is configured to engage the abutment interface of the biasing element when the end effector is coupled to the surgical handpiece and cause the biasing element to compress and urge the distal end of the base to abut the stop thereby positioning the base of the adapter at a known distance from the distal portion of the end effector.

LII. The surgical instrument assembly of clause LI, wherein the base is axially movable relative to the stop of the end effector between an engaged position when the abutment interface of the biasing element is engaged with the surgical handpiece and a free position when the abutment interface is separated from the surgical handpiece, such that:
the biasing element is compressed when the base is in the engaged position creating a frictional force between the base of the adapter and the stop of the end effector such that it requires an application of an external force to the base to rotate base relative to the surgical handpiece; and
the biasing element is decompressed when the base is in the free position allowing the base to rotate freely relative to the stop.

LIII. The surgical instrument assembly of clause LI or LII, wherein the abutment interface comprises one or more protrusions arranged for engaging a detent of the surgical handpiece;
wherein the base is axially movable relative to the stop of the end effector between an engaged position when the abutment interface of the biasing element is engaged with the detent of the surgical handpiece and a free position when the abutment interface is separated from the detent of the surgical handpiece, such that:
the biasing element is compressed when the base is in the engaged position creating a frictional force between the abutment interface of the biasing element and the detent of the surgical handpiece such that it requires an application of an external force to the base to rotate base relative to the surgical handpiece; and
the biasing element is decompressed when the base is in the free position allowing the base to rotate freely relative to the stop.

LIV. A surgical instrument assembly for removably coupling a tracker to a surgical handpiece, the surgical instrument assembly comprising:
a surgical handpiece;
an end effector comprising:
a shaft extending between a distal portion for manipulating biological tissue and a proximal portion defining a retainer for removably attaching the end effector to the surgical handpiece; and
a stop arranged between the proximal portion and the distal portion, the stop spaced a defined distance from the retainer; and
an adapter including:
a base a distal end and an opposing proximal end with the distal end arranged to abut the stop of the end effector;
an aperture defined extending through base to receive the shaft of the end effector therethrough; and
a biasing element positioned to urge the base distally relative to surgical handpiece;
wherein the surgical handpiece is configured to engage an abutment interface of the biasing element when the adapter is disposed on the end effector and the end effector is coupled to the surgical handpiece and the biasing element is configured to cause the base to abut the stop positioning the adapter at a known distance from the distal portion of the end effector.

LV. The surgical instrument assembly of clause LIV, wherein the base is axially movable relative to the stop of the end effector between an engaged position when the abutment interface of the biasing element is engaged with the surgical handpiece and a free position when the abutment interface is separated from the surgical handpiece, such that:

the biasing element is compressed when the base is in the engaged position creating a frictional force between the base of the adapter and the stop of the end effector such that it requires an application of an external force to the base to rotate the base relative to the stop; and the biasing element is decompressed when the base is in the free position allowing the base to rotate freely relative to the stop.

LVI. The surgical instrument assembly of clause LIV or LV, wherein the abutment interface comprises one or more protrusions arranged for engaging a detent of the surgical handpiece;

wherein the base is axially movable relative to the stop of the end effector between an engaged position when the abutment interface of the biasing element is engaged with the surgical handpiece and a free position when the one or more protrusions of the abutment interface are separated from the detent of the surgical handpiece, such that:

the biasing element is compressed when the base is in the engaged position creating a frictional force between the abutment interface of the biasing element and the detent of the surgical handpiece such that it requires an application of an external force to the base to rotate the base relative to the stop; and the biasing element is decompressed when the base is in the free position allowing the base to rotate freely relative to the stop.

LVII. An adapter for use with an end effector including a stop and a retainer for coupling the end effector to a surgical handpiece, the adapter comprising:

a base;

a biasing element to urge the base away from the surgical handpiece, the biasing element extending from a proximal end of the base to an abutment interface arranged for engaging the surgical handpiece;

a mount coupled to the base;

a coupler disposed on the base and configured to removably secure the adapter to the end effector such that the end effector can rotate freely relative to the base and biasing element; and wherein the biasing element is configured position the base adjacent the stop of the end effector when the abutment interface of the biasing element engages the surgical handpiece to position the adapter and mount at a known position on the end effector.

LVIII. The adapter of clause LVII, wherein the base is axially movable relative to the end effector between an engaged position when abutment interface is engaged with the surgical handpiece and a free position when the abutment interface is separated from the surgical handpiece, such that:

when the base is in the engaged position the biasing element is compressed creating a friction force between the adapter and the surgical handpiece such that an external force is required to rotate the base relative to the surgical handpiece; and when the base is in the free position the biasing element is decompressed allowing the base to rotate freely relative to the stop.

LIX. The adapter of clause LVII of LVIII, wherein the abutment interface comprises one or more protrusions arranged for engaging a detent on the surgical handpiece.

LX. A surgical instrument assembly for removably coupling a tracker to a surgical handpiece, the surgical instrument assembly comprising:

an end effector including:
  a shaft extending between a distal portion for manipulating tissue and proximal portion defining a retainer for removably attaching the end effector to the surgical handpiece; and
  a stop arranged between the proximal portion and the distal portion; and an adapter including:
  a base defining a proximal end and opposing distal end with the distal end arranged to abut the stop of the end effector;
  an aperture defined extending through base to receive the shaft of the end effector therethrough;
  a mount coupled to the base for releasably securing the tracker to the adapter; and
  a biasing element extending from one of the proximal end and the distal end of the base, the biasing element comprising an abutment interface including one or more protrusions arranged for engaging a detent of the surgical handpiece or the stop, with the biasing element configured to compress in response to attachment of the retainer to the surgical handpiece and causing the one or more protrusions to engage the detent to limit movement of the adapter relative to the end effector.

LXI. The surgical instrument assembly of clause LX, wherein retainer and the stop of the end effector are spaced along the shaft of the end effector such that the surgical handpiece engages the biasing element of the adapter and the stop engages the base of the adapter in response to coupling the end effector to the surgical handpiece with the abutment interface of the biasing element abutting the surgical handpiece and urging the base against the stop creating a friction force between the one or more protrusions of the abutment interface and the detent of the surgical handpiece to limit free rotation of the base relative to the surgical handpiece in absence of an applied external force.

LXII. The surgical instrument assembly of clause LX or LXI, wherein the base further comprises a coupler configured to removably secure the adapter to the proximal portion of the shaft of the end effector.

LXIII. The surgical instrument assembly of any one of clauses LX to LXII, wherein the base is axially movable relative to the stop of the end effector between:

an engaged position where the abutment interface of the biasing element engages the surgical handpiece, with the biasing element compressed to create a frictional force between the one or more protrusions of the biasing element and the detent of the surgical handpiece to limit free rotation of the base relative to the surgical handpiece in an absence of an applied external force; and a free position where the abutment interface disengages the surgical handpiece, with the biasing element decompressed to permit free rotation of the base relative to the stop.

LXIV. The surgical instrument assembly of any one of clauses LX to LXIII, wherein distal end of the base defines an abutment surface configured to abut the stop of the end effector and an annular projection that extends distally from the abutment surface and is configured to at least partially encircle the stop.

LXV. A surgical instrument assembly for removably coupling a tracker to a surgical handpiece, the surgical instrument assembly comprising:
a surgical handpiece including a detent;
an end effector comprising:
a shaft extending between a distal portion for manipulating biological tissue and a proximal portion defining a retainer for removably attaching the end effector to the surgical handpiece; and
a stop arranged between the proximal portion and the distal portion, the stop spaced a defined distance from the retainer; and
an adapter including:
a base a distal end and an opposing proximal end with the distal end arranged to abut the stop of the end effector;
an aperture defined extending through base to receive the shaft of the end effector therethrough; and
a biasing element including an abutment interface having one or more protrusions, the biasing element positioned to urge the base distally relative to surgical handpiece;
wherein the detent of the surgical handpiece is configured to engage the one or more protrusions of the abutment interface of the biasing element when the adapter is disposed on the end effector and the end effector is coupled to the surgical handpiece and the biasing element is configured to cause the base to abut the stop positioning the adapter at a known distance from the distal portion of the end effector.

LXVI. The surgical instrument assembly of clause LXV, wherein the one or more protrusions of the abutment interface are configured to limit movement of the adapter relative to the end effector when the end effector is coupled to the surgical handpiece.

LXVII. The surgical instrument assembly of clause LXV or LXVI, wherein retainer and the stop of the end effector are spaced along the shaft of the end effector such that the surgical handpiece engages the biasing element of the adapter and the stop engages the base of the adapter in response to coupling the end effector to the surgical handpiece with the abutment interface of the biasing element abutting the surgical handpiece and urging the base against the stop creating a friction force between the one or more protrusions of the abutment interface and the detent of the surgical handpiece to limit free rotation of the base relative to the surgical handpiece in absence of an applied external force.

LXVIII. The surgical instrument assembly of any one of clauses LXV to LXVII, wherein the base further comprises a coupler configured to removably secure the adapter to the proximal portion of the shaft of the end effector.

LXIX. The surgical instrument assembly of any one of clauses LXV to LXVIII, wherein the base is axially movable relative to the stop of the end effector between:
an engaged position where the abutment interface of the biasing element engages the surgical handpiece, with the biasing element compressed to create a frictional force between the one or more protrusions of the biasing element and the detent of the surgical handpiece to limit free rotation of the base relative to the surgical handpiece in an absence of an applied external force; and
a free position where the abutment interface disengages the surgical handpiece, with the biasing element decompressed to permit free rotation of the base relative to the stop.

LXX. The surgical instrument assembly of any one of clauses LXV to LXIX, wherein distal end of the base defines an abutment surface configured to abut the stop of the end effector and an annular projection that extends distally from the abutment surface and is configured to at least partially encircle the stop.

Those having ordinary skill in the art will appreciate that aspects of the embodiments described and illustrated herein can be interchanged or otherwise combined.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. An adapter for use with an end effector including a stop and a retainer for coupling the end effector to a surgical handpiece, the adapter comprising:
a base comprising a proximal end and opposing distal end;
a biasing element to urge the base away from the surgical handpiece, the biasing element extending from the proximal end of the base and defining an abutment interface arranged for engaging the surgical handpiece;
a mount coupled to the base for releasably securing a tracker to the adapter; and
a coupler disposed on the base and configured to removably secure the adapter to the end effector such that the end effector can rotate relative to the base and the biasing element;
wherein the biasing element is configured to compress in response to attachment of the retainer to the surgical handpiece with abutment occurring between the distal end of the base and the stop of the end effector to limit movement of the adapter relative to the end effector.

2. The adapter of claim 1, wherein compression of the biasing element creates a friction force between the adapter, the stop, and the surgical handpiece to limit free rotation of the base relative to the stop of the end effector in absence of an applied external force.

3. The adapter of claim 1, wherein the base and the biasing element define an aperture configured to receive a portion of the end effector.

4. The adapter of claim 1, further comprising a tracker configured for removable attachment to the mount.

5. The adapter of claim 1, wherein the coupler is configured to removably secure the base to one of a first end effector and a second end effector.

6. The adapter of claim 1, wherein the biasing element comprises a spring.

7. The adapter of claim 1, wherein the biasing element comprises a spring defined by a plurality of wave elements including a distal wave element and a proximal wave element;
wherein the distal wave element comprises a first thickness and the proximal wave element comprises a second thickness larger than the first thickness.

8. The adapter of claim 7, wherein the proximal wave element defines the abutment interface of the biasing element.

9. The adapter of claim 1, wherein the biasing element comprises a compressive material including a plurality of slits.

10. The adapter of claim 1, wherein the abutment interface comprises one or more protrusions arranged for engaging a detent on the surgical handpiece.

11. A surgical instrument tracking system for use with a surgical handpiece, the surgical instrument tracking system comprising:
  a first end effector including:
    a first shaft extending between a distal portion for manipulating tissue and a proximal portion defining a first retainer for removably attaching the first end effector to the surgical handpiece; and
    a first stop arranged between the proximal portion and the distal portion of the first end effector;
  a second end effector including:
    a second shaft extending between a distal portion and a proximal portion defining a second retainer for removably attaching the second end effector to the surgical handpiece; and
    a second stop arranged between the proximal portion and the distal portion of the second end effector; and
  an adapter configured to removably couple to one of the first end effector and the second end effector, the adapter including:
    a base comprising a proximal end and opposing distal end;
    a coupler disposed on the base and configured to removably coupled the adapter to the proximal portion of one of the first end effector or the second end effector; and
    a biasing element to urge the base away from the surgical handpiece, the biasing element extending from the proximal end of the base and defining an abutment interface arranged for engaging the surgical handpiece;
  wherein the biasing element is configured to compress in response to attachment of one of the first retainer or the second retainer to the surgical handpiece with abutment occurring between the distal end of the base and the first stop of the first end effector or the second stop of the second end effector to limit movement of the adapter relative to the first or second stop.

12. The surgical instrument tracking system of claim 11, wherein the first retainer of the first end effector is configured such that the surgical handpiece will engage the abutment interface of the biasing element when the first end effector is coupled to the surgical handpiece causing the biasing element to urge the base against the first stop to position the adapter at a first known distance from the distal portion of the first end effector; and
  wherein the second retainer of the second end effector is configured such that the surgical handpiece will engage the abutment interface of the biasing element of the adapter when the second end effector is coupled to the surgical handpiece causing the biasing element to urge the base against the second stop to position the adapter at a second known distance from the distal portion of the second end effector.

13. The surgical instrument tracking system of claim 11, wherein the first stop is disposed on the first shaft at a defined distance from the first retainer; and
  wherein the second stop is disposed on the second shaft at defined distance from the second retainer.

14. The surgical instrument tracking system of claim 11, wherein the biasing element comprises a spring.

15. The surgical instrument tracking system of claim 11, wherein the biasing element comprises a spring defined by a plurality of wave elements including a distal wave element and a proximal wave element;
  wherein the distal wave element comprises a first thickness and the proximal wave element comprises a second thickness larger than the first thickness.

16. The surgical instrument tracking system of claim 15, wherein the proximal wave element defines the abutment interface of the biasing element.

17. The surgical instrument tracking system of claim 11, wherein the biasing element comprises a compressive material including a plurality of slits.

18. The surgical instrument tracking system of claim 11, wherein the first retainer and the first stop of the first end effector are spaced along the first shaft such that the biasing element is compressed a first distance when the first end effector is coupled to the surgical handpiece; and
  wherein the second retainer and the second stop of the second end effector are spaced along the second shaft such that the biasing element is compressed a second distance when the first end effector is coupled to the surgical handpiece.

19. The surgical instrument tracking system of claim 18, wherein the first distance is greater than the second distance.

20. The surgical instrument tracking system of claim 18, wherein the second distance is greater than the first distance.

21. The surgical instrument tracking system of claim 18, wherein the first distance is equal to the second distance.

22. The surgical instrument tracking system of claim 11, wherein the first end effector comprises a twist drill and the second end effector comprises a screwdriver.

23. The surgical instrument tracking system of claim 11, wherein the abutment interface comprises one or more protrusions arranged for engaging a detent on the surgical handpiece.

* * * * *